United States Patent [19]
Fuller et al.

[11] Patent Number: 5,907,600
[45] Date of Patent: *May 25, 1999

[54] PRODUCT REGISTRATION SYSTEM

[75] Inventors: Robert M. Fuller, Redmond; Frederick A. Epler, Issaquah; Maxwell E. Manowski, Enumclaw, all of Wash.

[73] Assignee: Aspect Telecommunications Corporation, San Jose, Calif.

[*] Notice: This patent is subject to a terminal disclaimer.

[21] Appl. No.: 08/429,907

[22] Filed: Apr. 27, 1995

Related U.S. Application Data

[62] Division of application No. 08/249,453, May 26, 1994, Pat. No. 5,673,299, which is a division of application No. 07/480,242, Feb. 15, 1990, Pat. No. 5,375,161, which is a continuation-in-part of application No. 07/439,601, Nov. 21, 1989, abandoned, which is a continuation-in-part of application No. 06/841,931, Mar. 20, 1986, Pat. No. 4,893,335, which is a continuation-in-part of application No. 06/650,821, Sep. 14, 1984, abandoned.

[51] Int. Cl.$^6$ ............................................. H04M 11/00
[52] U.S. Cl. ..................... 379/106.01; 379/93.01; 379/93.12
[58] Field of Search ................... 379/106, 102, 379/104, 105, 91, 90, 110, 144, 92, 96, 93, 92.04, 93.02, 93.05, 93.12, 93.13, 102.01–102.04; 348/6, 7, 10, 12, 13; 455/3.1, 5.1, 6.1, 6.3

[56] References Cited

U.S. PATENT DOCUMENTS

| | | | |
|---|---|---|---|
| 3,676,603 | 7/1972 | Budrys et al. | 379/217 |
| 3,718,906 | 2/1973 | Lightner | 379/77 |
| 3,739,329 | 6/1973 | Lester | 379/201 |
| 3,800,283 | 3/1974 | Gropper | 379/91 |
| 3,854,013 | 12/1974 | Altenburger et al. | |
| 3,963,873 | 6/1976 | Pommerening et al. | |
| 3,997,731 | 12/1976 | Wilmot et al. | 379/201 |
| 4,054,756 | 10/1977 | Comella et al. | |
| 4,069,397 | 1/1978 | Hashimoto | 379/77 |

(List continued on next page.)

FOREIGN PATENT DOCUMENTS

| | | |
|---|---|---|
| 0046623 | of 0000 | European Pat. Off. |
| 0152908 | of 0000 | European Pat. Off. |
| 0216381 | of 0000 | European Pat. Off. |
| 0216515 | of 0000 | European Pat. Off. |
| 0330441 | of 0000 | European Pat. Off. |
| 2541020 | of 0000 | France |
| 2929961 | of 0000 | Germany |
| 3411206 | of 0000 | Germany |
| 2198910 | of 0000 | United Kingdom |
| 8304451 | of 0000 | WIPO |

OTHER PUBLICATIONS

N. Shapiro, "Chapter 3: Your First Phone Call", *The Small Computer Connection—Telecommunications for the Home and Office*, Micro Text, New York, 1983.

Applied Voice Technology product reference guide for "Call Xpress 200 and 400 Series", Feb. 1989.

Applied Voice Technology user guide for "Call Xpress", Nov. 1989.

"SR 19000 PBX Digital Private Branch Exchange Product Reference Guide"; Solid State Systems, Inc., Nov. 1987.

(NEC Corp.) Patent Abstracts of Japan, vol. 13, No. 435.
(NEC Corp.) Patent Abstracts of Japan, vol. 12, No. 414.
(Fujitsu Ltd.) Patent Abstracts of Japan, vol. 5, No. 70.
(Fujitsu KK) Patent Abstracts of Japan, vol. 7, No. 288.
IBM Technical Disclosure Bulletin vol. 26, No. 5, D. Zeheb "Secretarial Branch Exchange".

*Primary Examiner*—Stella Woo
*Attorney, Agent, or Firm*—Ladas & Parry

[57] ABSTRACT

A system for reporting to a central station identifying information associated with a product, such as a programmed apparatus. The apparatus has a port for connection to a telephone line. The apparatus may be programmed to render itself temporarily inoperable until certain identifying information has been acquired. After receipt of such identifying information, the system initiates a telephone call to the central station and reports the entered identifying information thereto.

108 Claims, 50 Drawing Sheets

U.S. PATENT DOCUMENTS

| | | |
|---|---|---|
| 4,150,255 | 4/1979 | Theis et al. . |
| 4,187,498 | 2/1980 | Creekmore ................................ 379/91 |
| 4,254,329 | 3/1981 | Gokey et al. . |
| 4,277,649 | 7/1981 | Sheinbein . |
| 4,278,844 | 7/1981 | Jones ........................................ 379/201 |
| 4,313,025 | 1/1982 | Grube, Jr. . |
| 4,313,035 | 1/1982 | Jordan et al. . |
| 4,326,123 | 4/1982 | Hosterman ............................... 379/144 |
| 4,361,851 | 11/1982 | Asip et al. ................................ 379/106 |
| 4,369,339 | 1/1983 | Castro et al. . |
| 4,420,656 | 12/1983 | Freeman .................................. 379/199 |
| 4,439,636 | 3/1984 | Newkirk et al. ........................ 379/144 |
| 4,456,790 | 6/1984 | Soyack . |
| 4,475,009 | 10/1984 | Rais et al. . |
| 4,485,300 | 11/1984 | Peirce ....................................... 379/91 |
| 4,578,540 | 3/1986 | Borg et al. . |
| 4,584,434 | 4/1986 | Hashimoto ............................... 179/100 |
| 4,587,379 | 5/1986 | Masuda .................................... 379/91 |
| 4,591,664 | 5/1986 | Freeman .................................. 379/212 |
| 4,595,983 | 6/1986 | Gehalo et al. ........................... 379/144 |
| 4,598,179 | 7/1986 | Clark et al. .............................. 379/200 |
| 4,608,458 | 8/1986 | Hasimoto ................................. 179/79 |
| 4,611,094 | 9/1986 | Asmuth et al. .......................... 379/201 |
| 4,611,096 | 9/1986 | Asmuth et al. . |
| 4,625,081 | 11/1986 | Lotito et al. . |
| 4,625,276 | 11/1986 | Benton et al. ........................... 379/144 |
| 4,630,108 | 12/1986 | Gomersall ................................ 348/13 |
| 4,642,425 | 2/1987 | Guinn, Jr. et al. . |
| 4,674,115 | 6/1987 | Kaleita et al. . |
| 4,680,785 | 7/1987 | Akiyama . |
| 4,685,055 | 8/1987 | Thomas .................................... 364/200 |
| 4,696,028 | 9/1987 | Morganstein et al. .................. 379/212 |
| 4,707,592 | 11/1987 | Ware ........................................ 379/91 |
| 4,734,858 | 3/1988 | Schlafly ................................... 379/105 |
| 4,740,788 | 4/1988 | Konneker . |
| 4,747,124 | 5/1988 | Ladd . |
| 4,748,655 | 5/1988 | Thrower et al. . |
| 4,752,951 | 6/1988 | Konneker . |
| 4,754,326 | 6/1988 | Kram et al. .............................. 379/96 |
| 4,860,347 | 8/1989 | Costello . |
| 4,878,240 | 10/1989 | Lin et al. . |
| 4,879,743 | 11/1989 | Burke et al. . |
| 4,893,329 | 1/1990 | O'Brien . |
| 4,893,335 | 1/1990 | Fuller ....................................... 379/57 |
| 4,918,725 | 4/1990 | Takahashi . |
| 4,922,490 | 5/1990 | Blakley .................................... 379/88 |
| 4,926,462 | 5/1990 | Ladd et al. . |
| 4,932,042 | 6/1990 | Baral et al. . |
| 4,935,958 | 6/1990 | Morganstein et al. .................. 379/201 |
| 4,942,598 | 7/1990 | Davis . |
| 4,955,047 | 9/1990 | Morganstein et al. . |
| 5,020,095 | 5/1991 | Morganstein et al. . |
| 5,027,384 | 6/1991 | Morganstein . |
| 5,029,196 | 7/1991 | Morganstein ............................ 379/211 |
| 5,033,079 | 7/1991 | Catron et al. . |
| 5,036,535 | 7/1991 | Gechter et al. .......................... 379/201 |
| 5,060,255 | 10/1991 | Brown . |
| 5,063,588 | 11/1991 | Patsiokas et al. . |
| 5,090,051 | 2/1992 | Muppidi et al. . |
| 5,109,405 | 4/1992 | Morganstein . |
| 5,151,929 | 9/1992 | Wolf ......................................... 379/57 |
| 5,161,181 | 11/1992 | Zwick ...................................... 379/88 |
| 5,193,110 | 3/1993 | Jones et al. . |
| 5,199,062 | 3/1993 | Von Meister et al. . |
| 5,206,900 | 4/1993 | Callele . |
| 5,222,120 | 6/1993 | McLeod et al. . |
| 5,222,125 | 6/1993 | Creswall et al. . |
| 5,260,986 | 11/1993 | Pershan . |
| 5,276,731 | 1/1994 | Arbel et al. . |
| 5,307,399 | 4/1994 | Dai et al. . |
| 5,315,636 | 5/1994 | Patel . |
| 5,327,489 | 7/1994 | Anderson et al. . |
| 5,384,831 | 1/1995 | Creswell et al. . |

FLOWCHART INDEX

MAIN TASKS

5    POWER START UP TASK
    6    ON HOOK TASK
    7    OFF HOOK TASK
    8    LOCAL DIALING TASK
    9    RETRY TASK
    10   LOCAL INTERCOM TASK
    11   CONVERSATION TASK
    12   HOLD TASK
    13   ANSWER MODE DETERMINATION TASK
    15   PAGE ALERT TASK
    16   NORMAL FORWARDING TASK
    17   WAIT FOR ACCESS CODE TASK
    18   PRIORITY CALLER TASK
    19   REMOTE TASK
    20   REMOTE DIAL TASK
    21   REMOTE 3-WAY CONVERSATION TASK
    22   REMOTE INTERCOM TASK
    23   SCREENED FORWARDING TASK

TIMER INTERRUPT SUBTASKS 24   500us TIMER INTERRUPT SERVICE ROUTINE
    25   SUPERVISORY TONE DETECTION SUBTASK
    26   LINE DISCONNECT DETECTION SUBTASK
    27   CIRCULATOR SUBTASK
    28   RING DETECTION SUBTASK
    29   SHIFT REGISTER SUBTASK
    30   DTMF DETECTION SUBTASK
    31   RETURN FROM TIMER INTERRUPT SUBTASK
    32   LOCAL TONE GENERATION SUBTASK
    33   UPDATE TIMERS SUBTASK
    34   DIAL PULSE AND HOOKSWITCH DETECTION SUBTASK
    35   KEY PARSING SUBTASK
    36   ABORT SUBTASK

HARDWARE INTERRUPT TASK

37   POWER FAIL INTERRUPT TASK

SUBROUTINES

38   DIALING SUBROUTINE

*Fig.4*

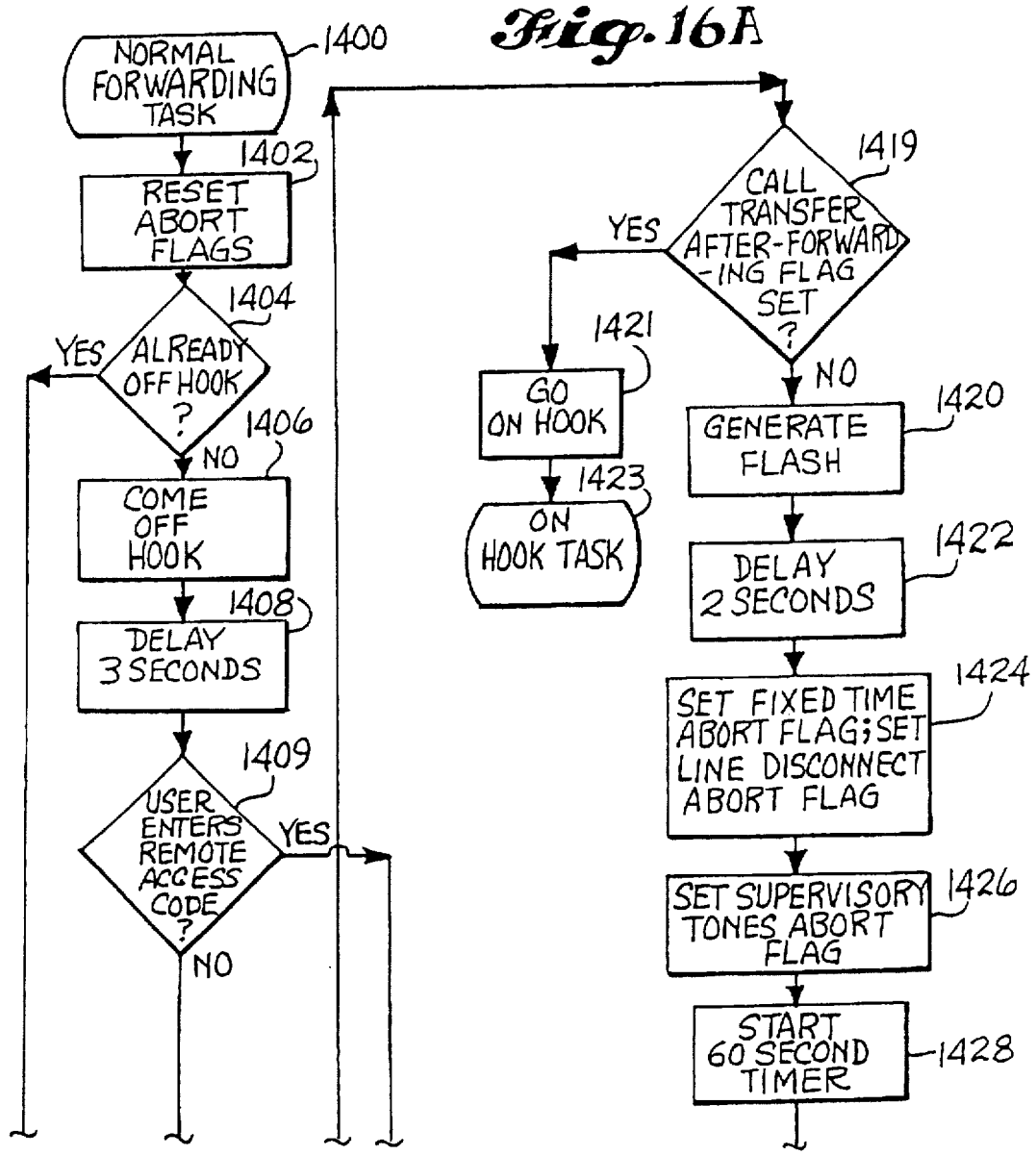

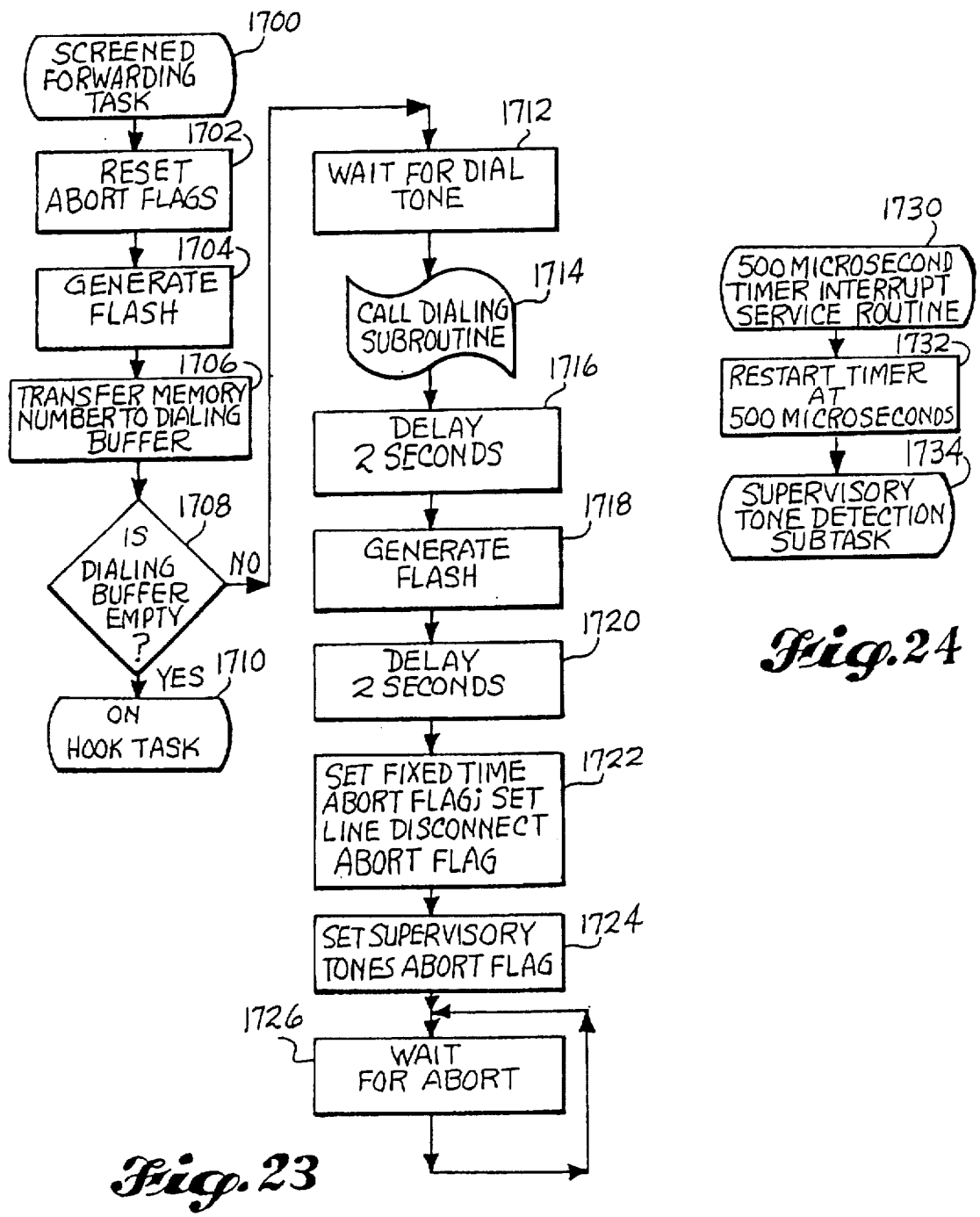

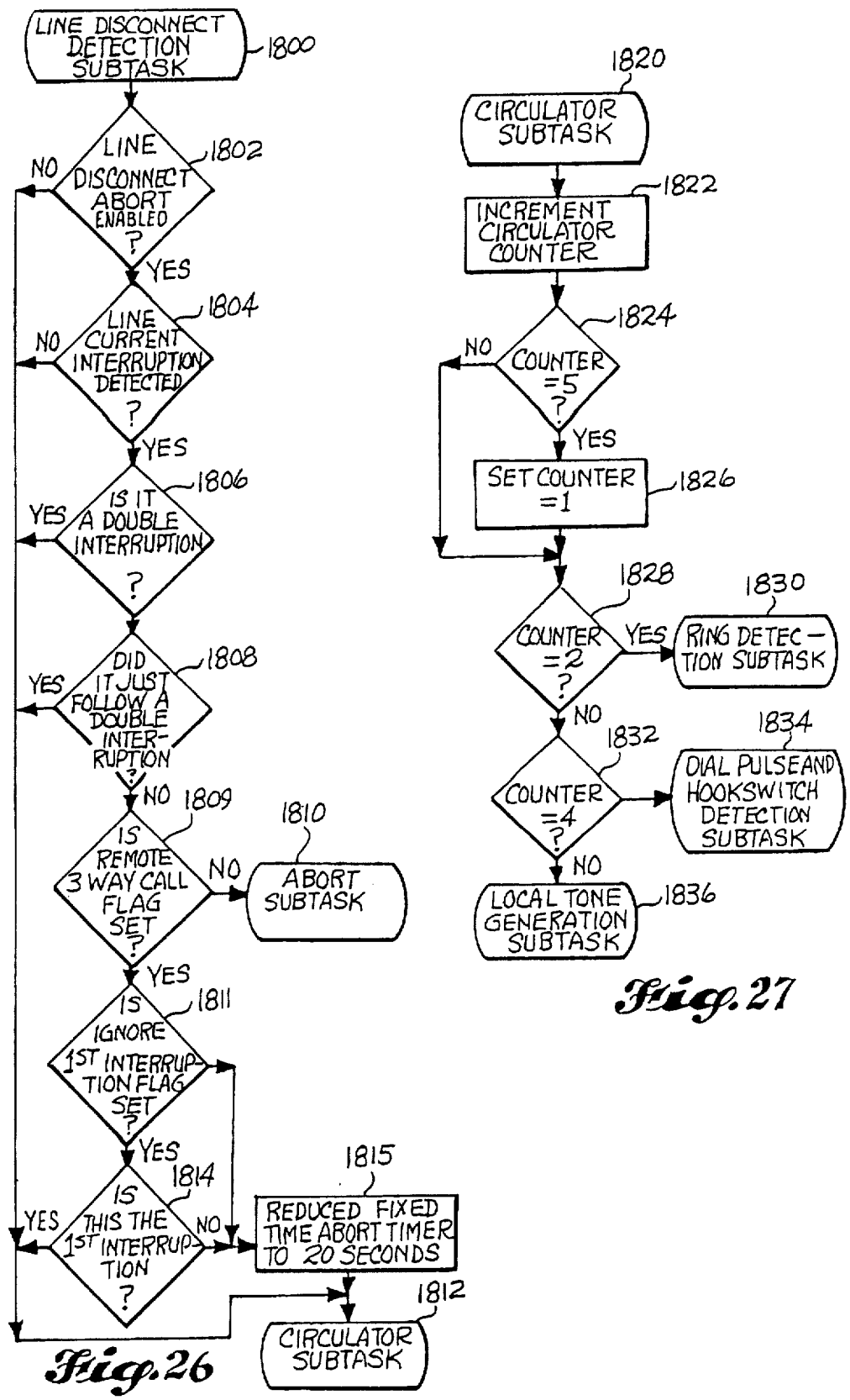

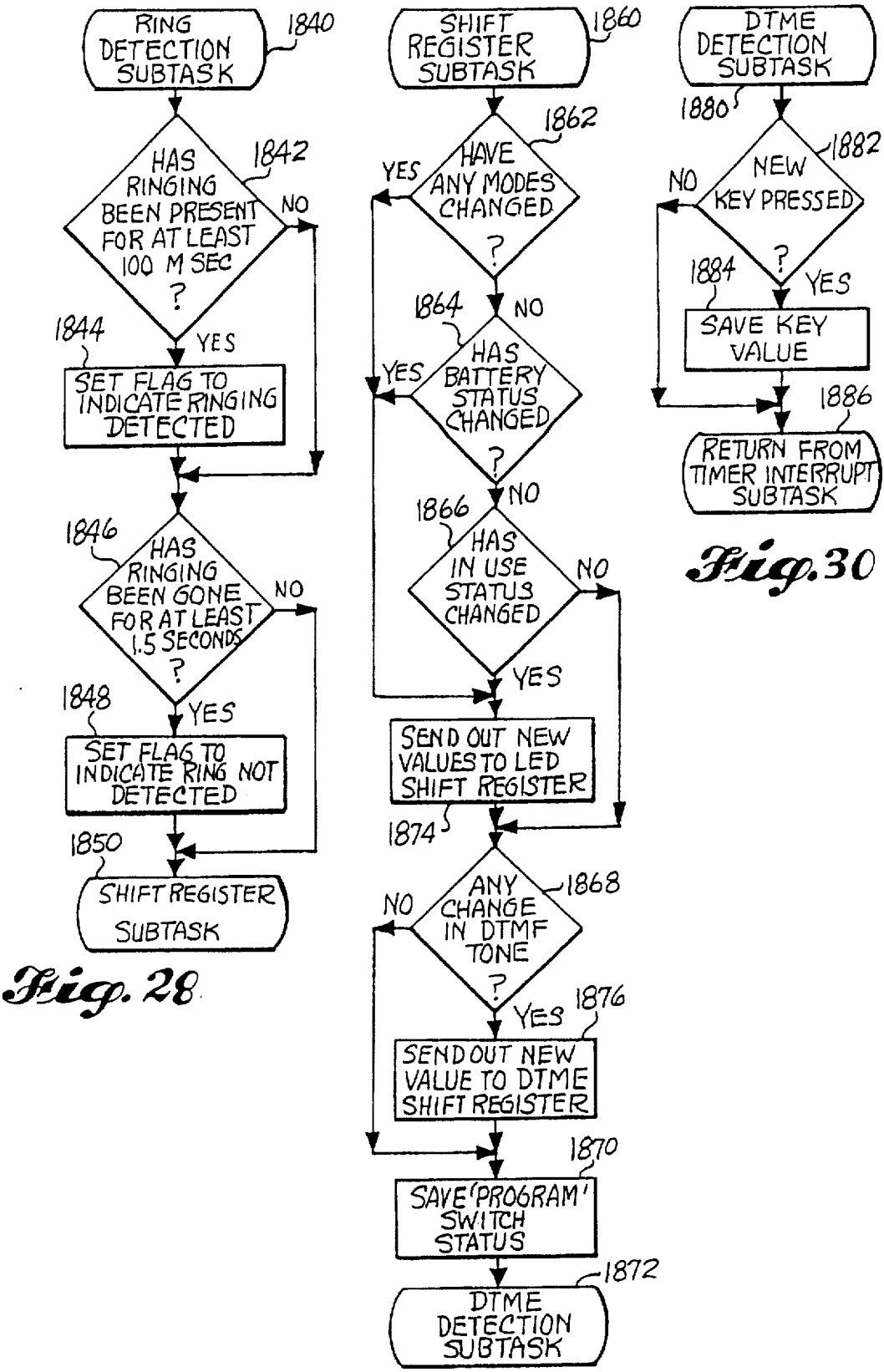

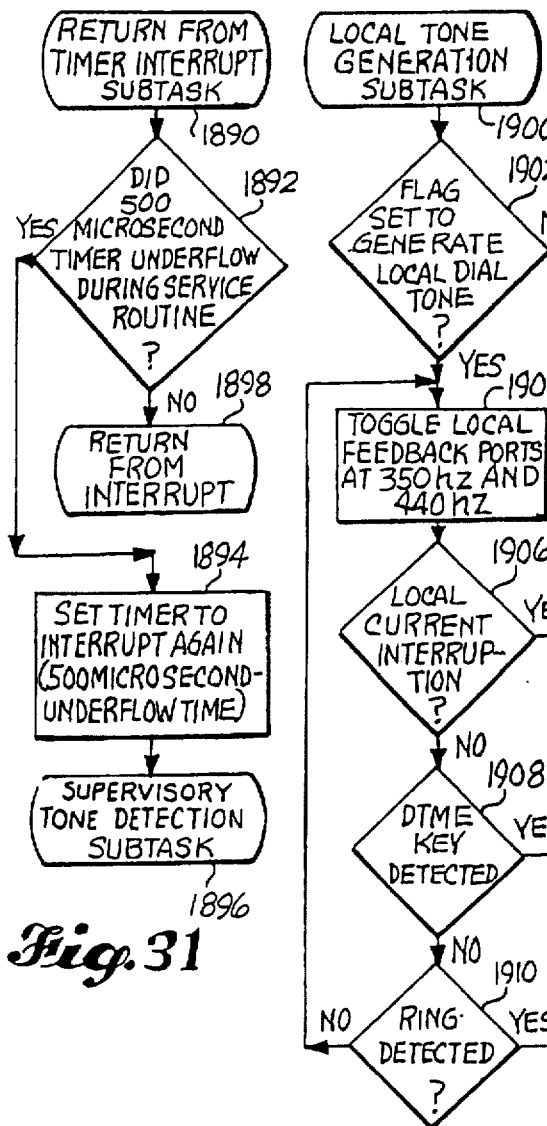
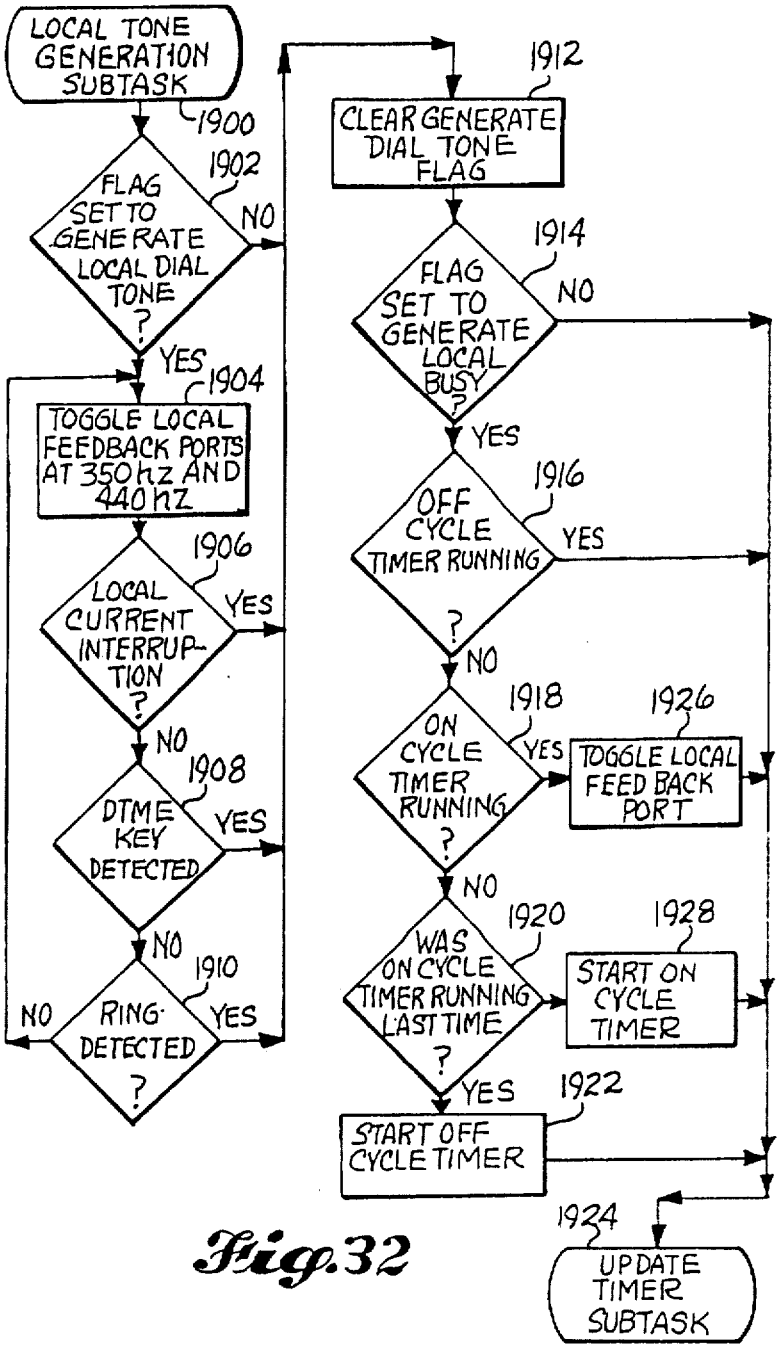
Fig. 31
Fig. 32

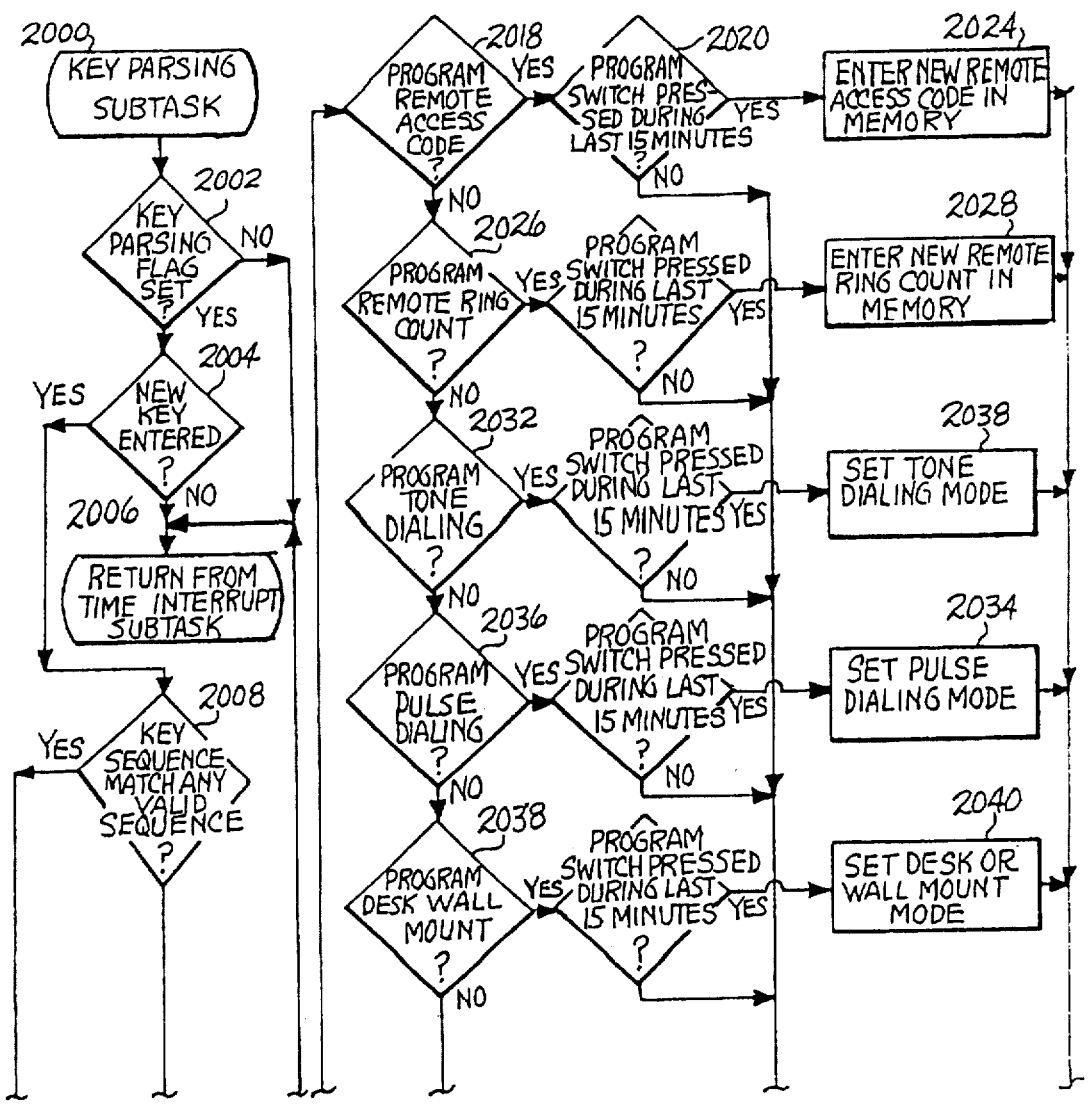
Fig. 35A1

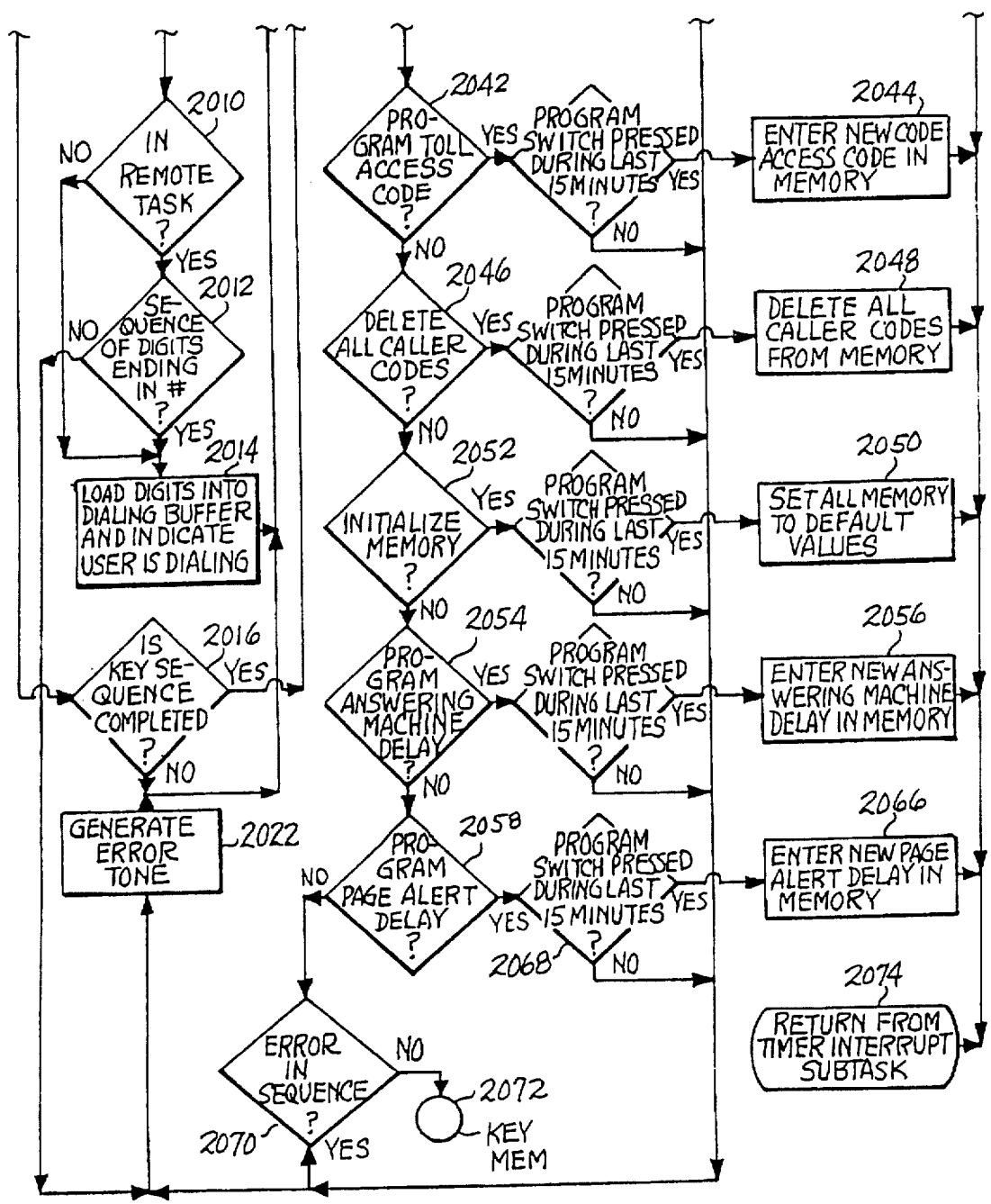
Fig. 35A2

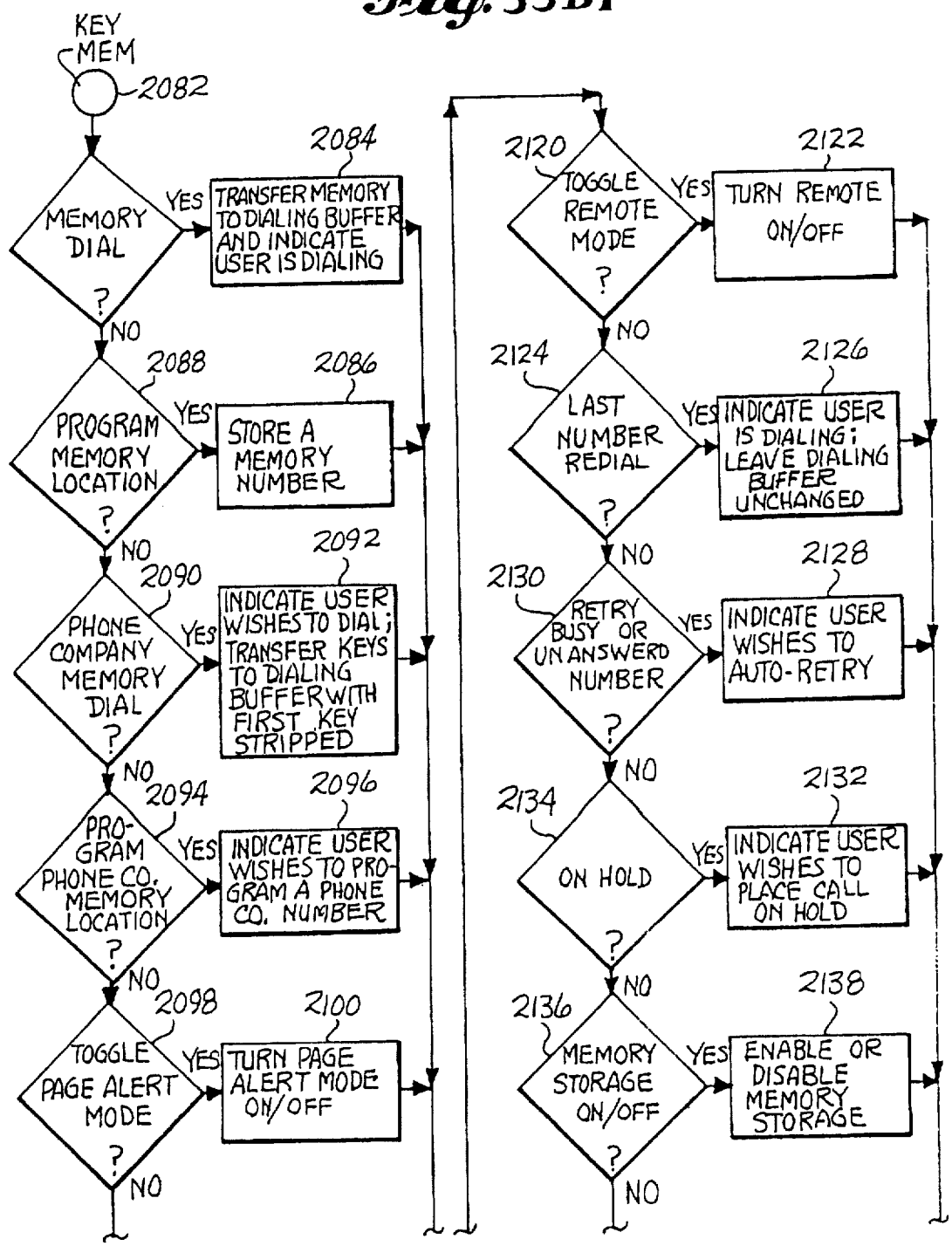
Fig. 35B1

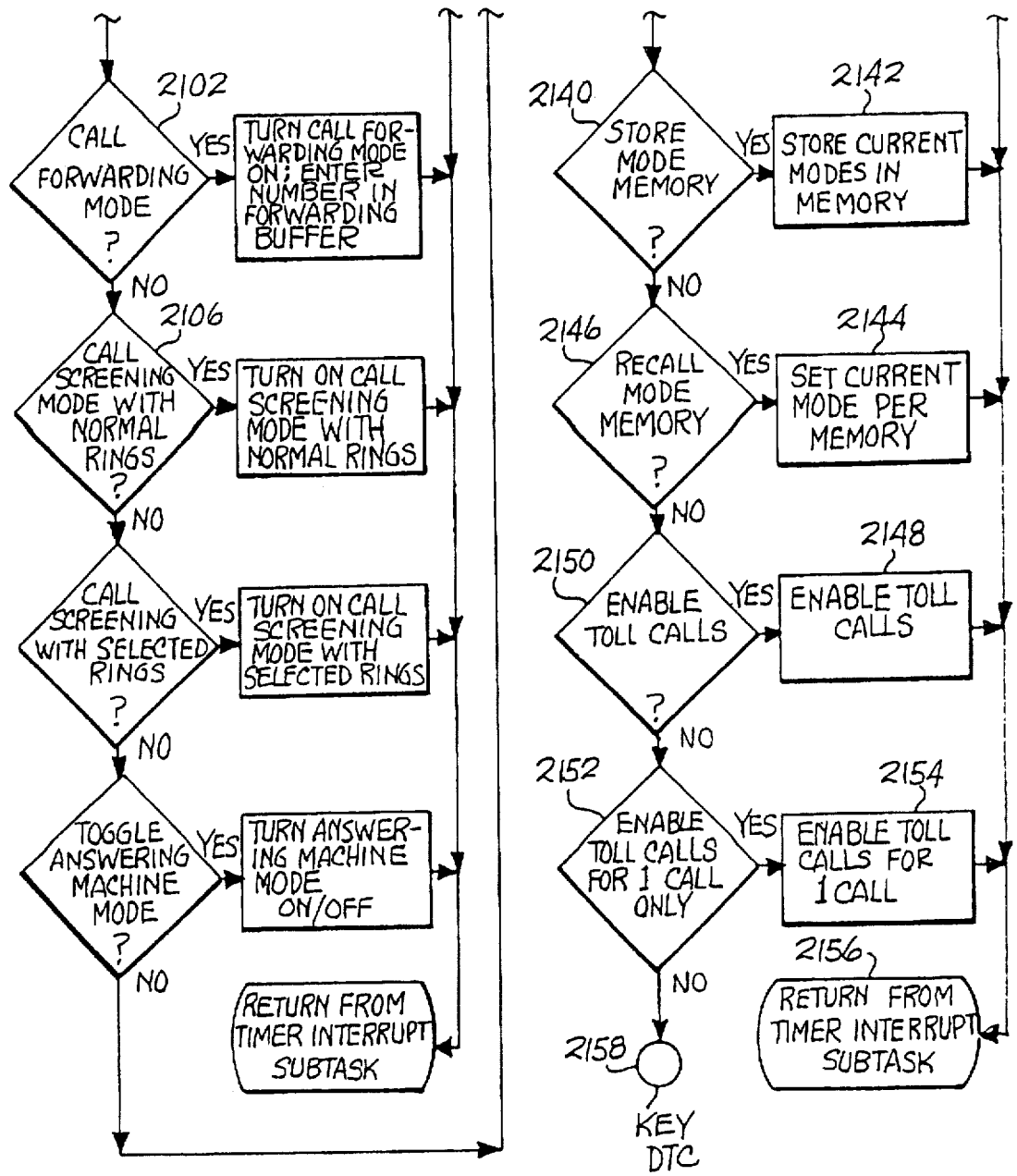
Fig. 35B2

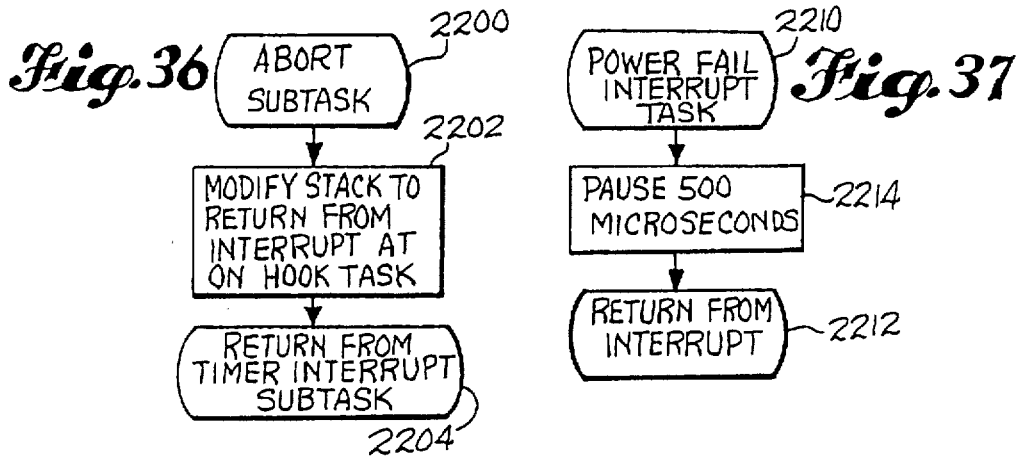
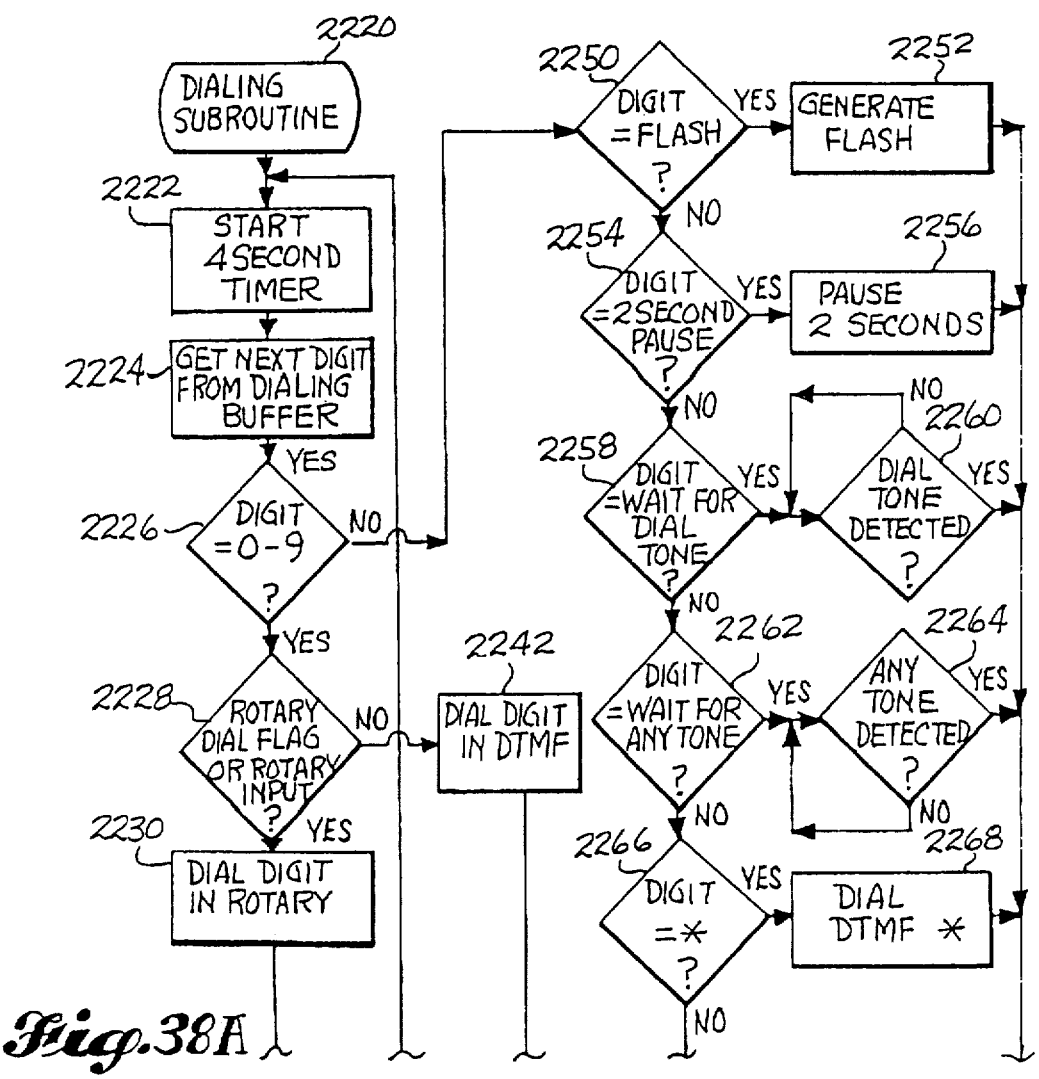

PRODUCT REGISTRATION SYSTEM

This is a division of U.S. application Ser. No. 08/249,453, filed May 26, 1994, (now U.S. Pat. No. 5,673,299) which application is, in turn, a divisional of U.S. application Ser. No. 07/480,242, filed Feb. 15, 1990 (now U.S. Pat. No. 5,375,161, issued Dec. 20, 1994), which is a continuation-in-part of U.S. application Ser. No. 07/439,601, filed Nov. 21, 1989 (now abandoned), which application is, in turn, a continuation-in-part of U.S. application Ser. No. 06/841,931, filed Mar. 20, 1986 (now U.S. Pat. No. 4,893,335, issued Jan. 9, 1990), which, in turn, is a continuation-in-part of U.S. application Ser. No. 06/650,821, filed Sep. 14, 1984 (now abandoned).

TECHNICAL FIELD

This invention relates to telephone equipment and, more particularly, to a control system for a telephone line that performs switching and supervisory functions to enhance the functions of telephone stations connected to the telephone line.

DESCRIPTION OF THE PRIOR ART

Single line telephone equipment commonly used in residences and small businesses is capable of providing relatively few functions. Such systems can universally place and receive telephone calls, and a few additional features have recently become available. One of these features is "three-way calling" in which a party can initiate a call with two other parties Three-way calling is initiated by placing one of the parties on temporary hold by flashing the hookswitch. Flashing the hookswitch also obtains a dial tone. The telephone number of the second party is then dialed and the hook switch is once again flashed to retrieve the first party.

Another feature that has recently become available to single line telephone subscribers is "call waiting" in which a party is advised by an audible signal on the line that a third party is attempting to place a call to the party. The original party can then be placed on hold while the call from the third party is answered. Finally, a "speed dialing" feature has recently become available by which a party can record in the telephone central office frequently called numbers and then automatically dial those numbers by pressing two keys on the telephone set.

At the present time, the above described features are the only features that are generally available to single line telephone parties. A large number of other features are generally available to users of multi-line PBX and key telephone systems. These users are generally medium to large businesses. In addition to the features described above as being available to single line telephone parties, PBX and key telephone systems generally provide a "redial" feature in which the previously dialed number can be automatically redialed by pressing a single button, "automatic callback" in which internal lines in a PBX installation that are busy when an internal call is placed are automatically redialed when the called station is no longer busy, "toll call restriction" in which all or some of the stations in a system are prevented from dialing long distance calls having numbers beginning with "1" or "0", "intercom" in which stations in an installation can talk to each other and "call forwarding" in which a call directed to one station in the system is automatically rerouted to another station in the system or to an external telephone number.

While the above described features available for PBX and key telephone systems are not generally available to single line telephone subscribers, unit are commercially available that can provide speed dialing and automatic call back features for single line telephone subscribers. However, these add-on units do not provide the other functions available in PBX and key telephone systems. Furthermore, there are a large number of useful features that are not even available in existing PBX and key telephone systems.

SUMMARY OF THE INVENTION

The present invention relates to improved techniques for reporting, to manufacturers, information about people (customers) who purchase the manufacturers' products. In the prior art it was not particularly easy for manufacturers (or anyone else, for that matter) to collect such information. Typically in the prior art, manufacturers would enclose a warranty registration card with a product they manufactured and just hoped that a large number of purchasers would take the time to fill out the cards and return them, via the mail, to the manufacturer.

In one aspect the present invention provides a method of obtaining a list of parties who have acquired a product comprising the steps of: allowing an acquiring party to enter identifying information after acquiring the product via a data input device operatively coupled with the product, the product having a CPU and a port for connection to a communications network; and contacting an address accessible via said communications network and transferring said identifying information via the port.

In another aspect, the present invention provides a system for collecting information regarding an acquiring party of a product, the information being heretofore unknown by a station and being collected at the station, the product, in cooperation with a CPU, (i) being responsive to entered information pertaining to the acquiring party; (ii) retrieving a previously stored network address of the station; (iii) communicating with the station via the network address, and (iv) transferring the entered information to the station.

In still another aspect the present invention provides a system for reporting to a central station identifying information associated with an apparatus and identifying previously unknown information relating to a user of the apparatus. The apparatus has a port for connection to a communications circuit, inhibit means for rendering the apparatus partially inoperable until at least some of the identifying information relating to the user has been entered into the apparatus, a memory for storing the identifying information relating to the user, and communication means for automatically causing the apparatus to contact the central station via the communications circuit and, after the central station has responded to the contact, outputting the identifying information relating to the user and the identifying information associated with the apparatus thereby informing the central station of the identifying information associated with the apparatus and the identifying previously unknown information relating to the user of the apparatus.

In yet another aspect, the present invention provides a method for initially registering with a central station a product previously acquired by a user thereof, the method comprising allowing the user to enter identifying information regarding the user by using a data entry device; contacting the central station via a communications network; transferring the identifying information to the central station via the communication network; and registering with the central station the identifying information regarding the user and initially associating same with said product.

In another aspect, the present invention provides a method of reporting to a central station receipt of a product acquired by a user thereof, the method comprising allowing the user to enter identifying information regarding the user by using a data entry device; and, after the user makes at least an initial use of the product, automatically contacting the central station via a communications network and transferring the identifying information to the central station via the communication network.

In yet another aspect, the present invention provides software of the type which runs on a processor which is operatively coupled with an interface to a communications network. The software (i)receives information which is provided concerning a party who acquired said software, (ii) generates data associating said party with said software, and (iii) transmits the generated data to a preprogrammed network address via the interface.

The present application incorporates the disclosure of U.S. Pat. No. 4,893,335, issued Jan. 9, 1990, into this patent.

BRIEF DESCRIPTION OF THE DRAWINGS

FIGS. 3a–3i form a schematic of the control system shown in block diagram form in FIG. 2.

FIGS. 4 through 38 are flow charts of the software controlling the operation of the central processing unit shown in FIGS. 2 and 3.

BEST MODE FOR CARRYING OUT THE INVENTION

Figure 1:
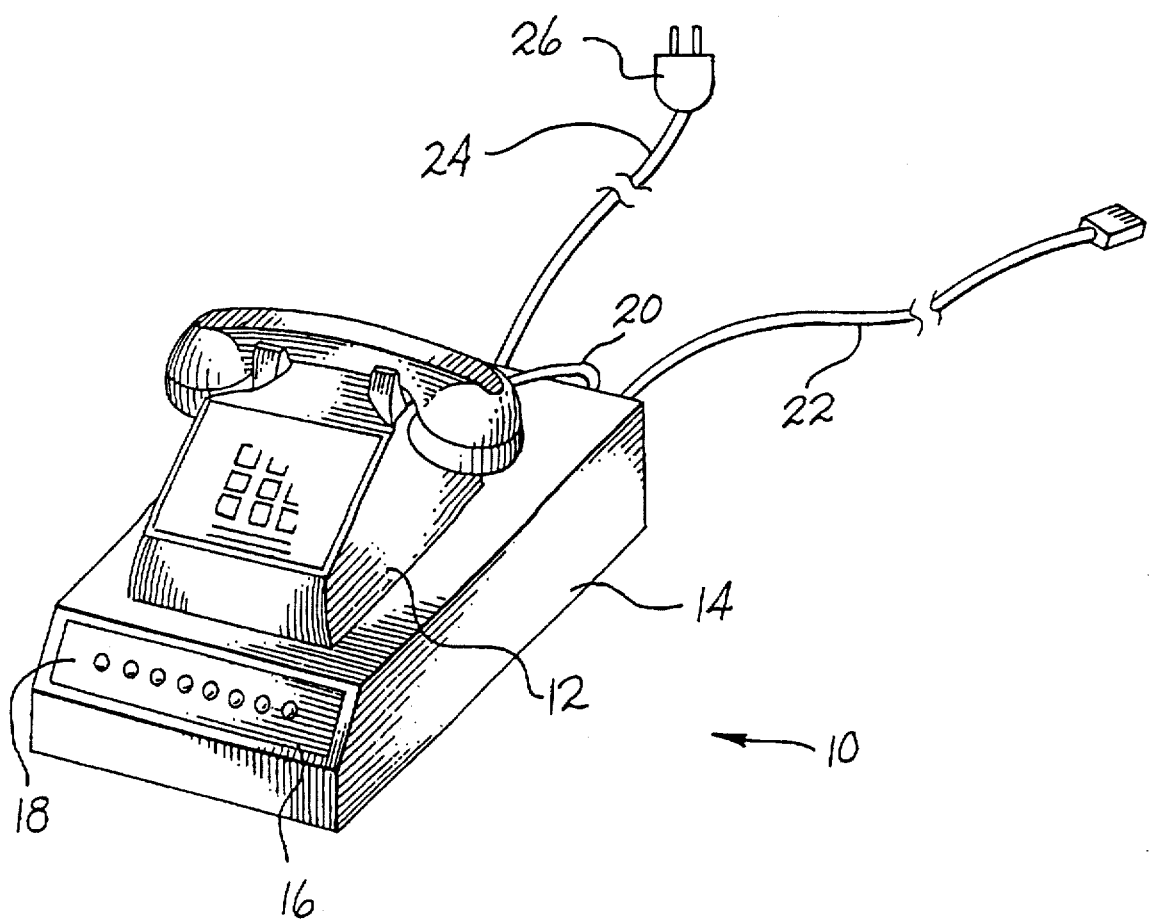
FIG. 1 is an isometric view of the control system installed with a conventional desk telephone.

The control system 10 is shown installed with a conventional desk telephone 12 in FIG. 1. The control system 10 is housed in a thin rectangular box 14 having an inclined panel 16 on which are mounted several spaced apart light emitting diodes, indicated generally at 18. The light emitting diodes 18 provide a visual indication of the operating mode or the condition of the system 10. The thin configuration of the box 14, coupled with its planar upper surface, provides a compact and inobtrusive base for the telephone 12. The control system 10 is connected to the telephone 12 through a conventional multilead conductor 20 and it is connected to a conventional telephone line through a similar multilead conductor 22. Power is supplied to the control system 10 through a conventional AC cord 24 and plug 26.

The control system 10 may be connected to any telephone line which encompasses a tip and ring type pair whether in a subscriber loop or trunk.

Figure 2:
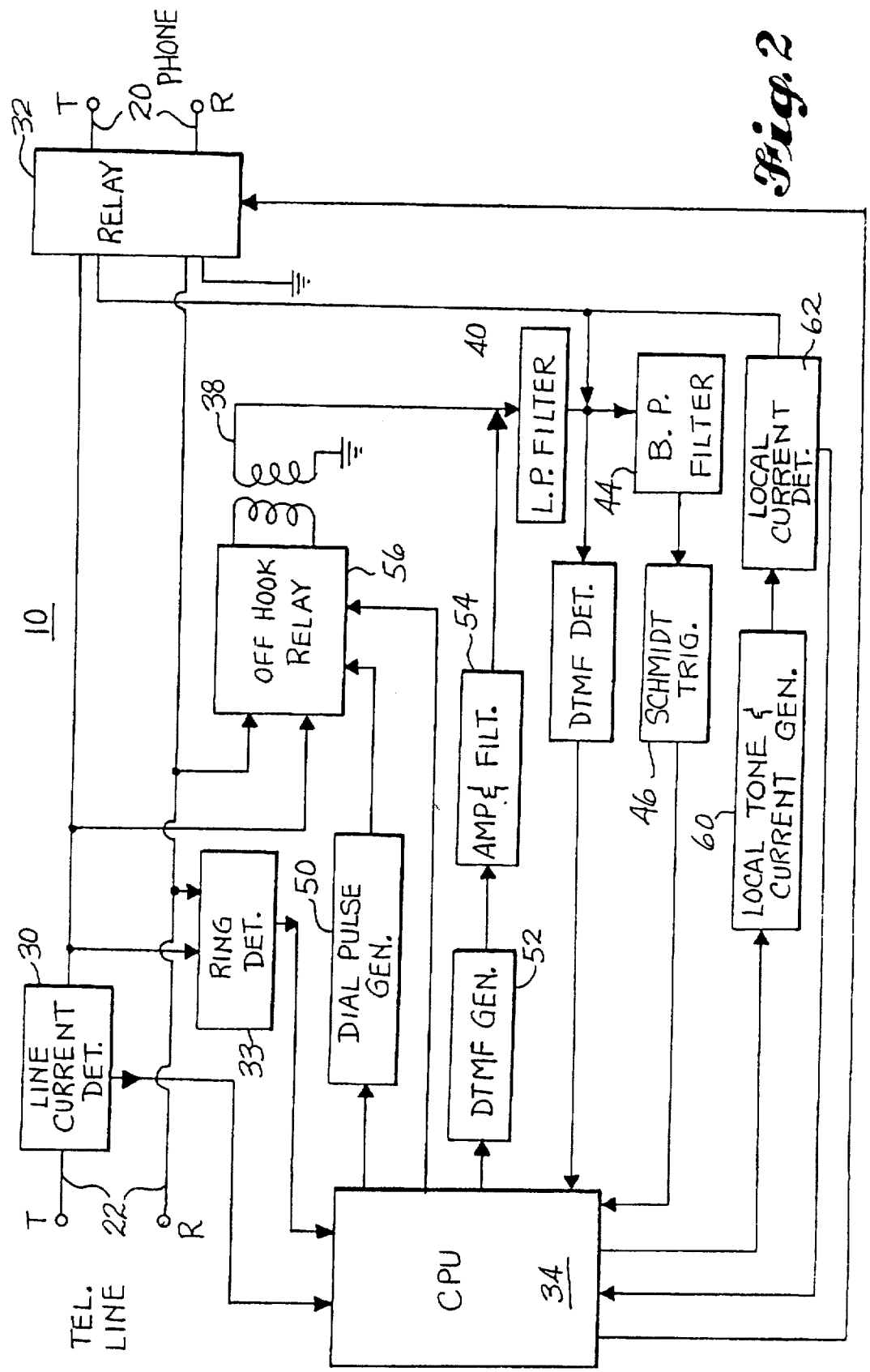
FIG. 2 is a block diagram of the control system of FIG. 1.
Figure 3A:
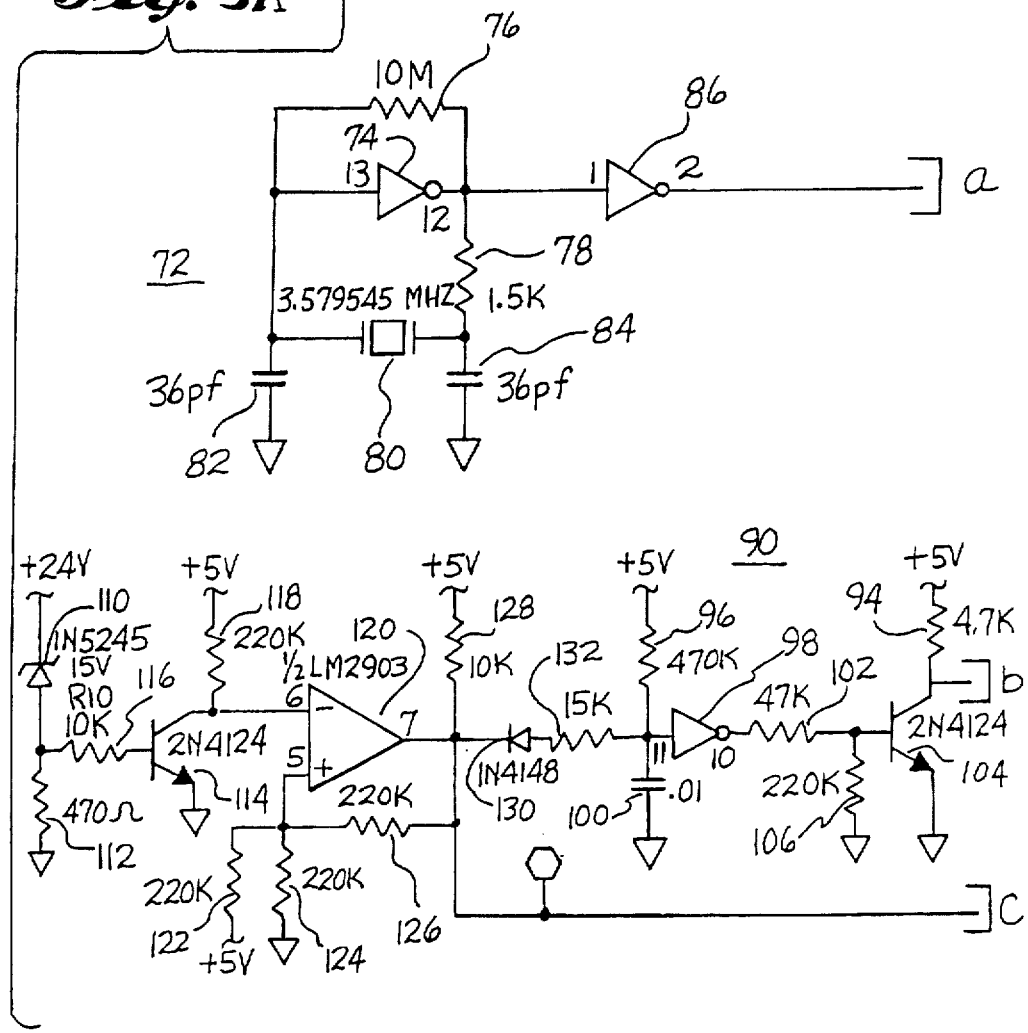
Figure 3B:
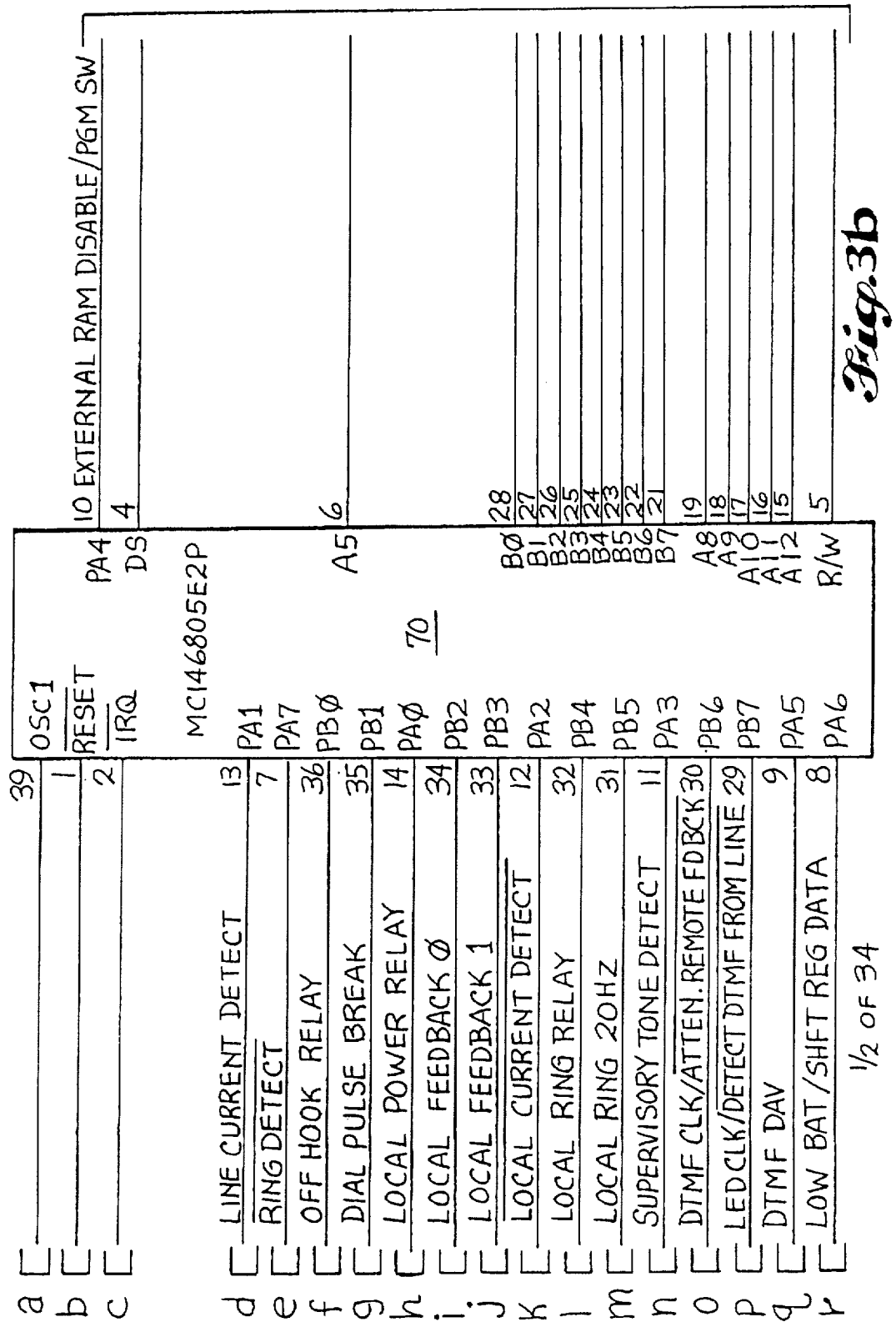
Figure 3C:
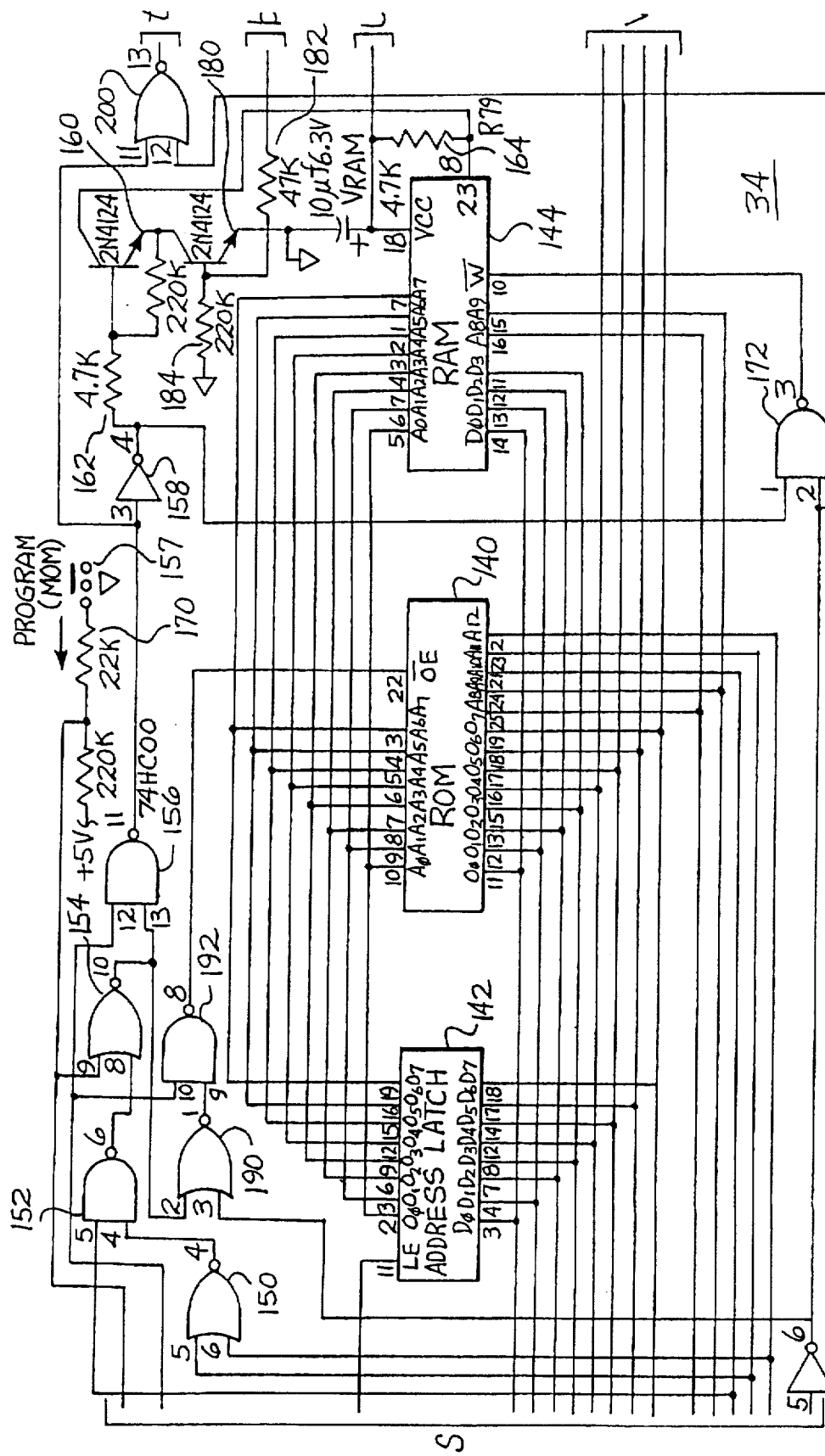
Figure 3D:
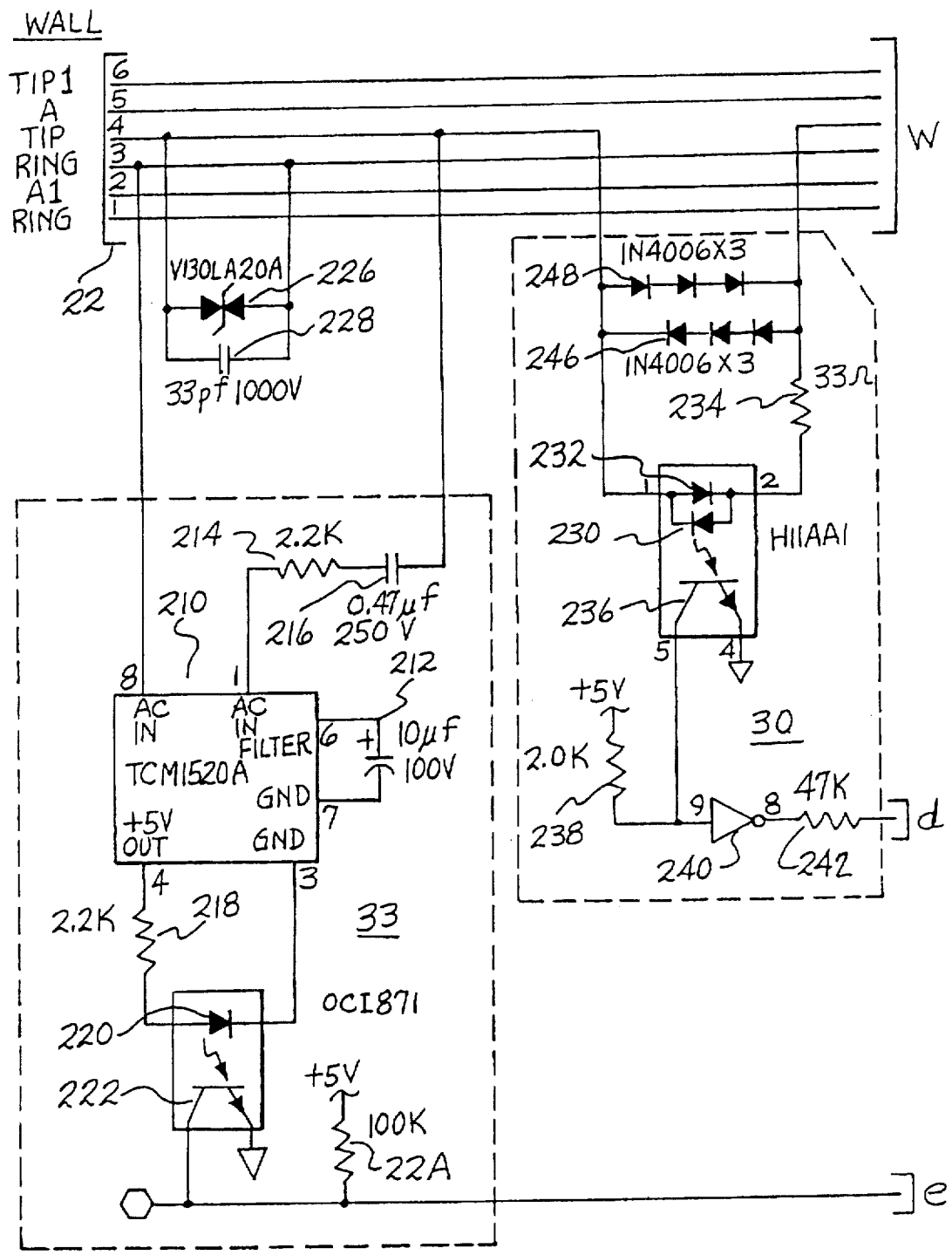
Figure 3E:
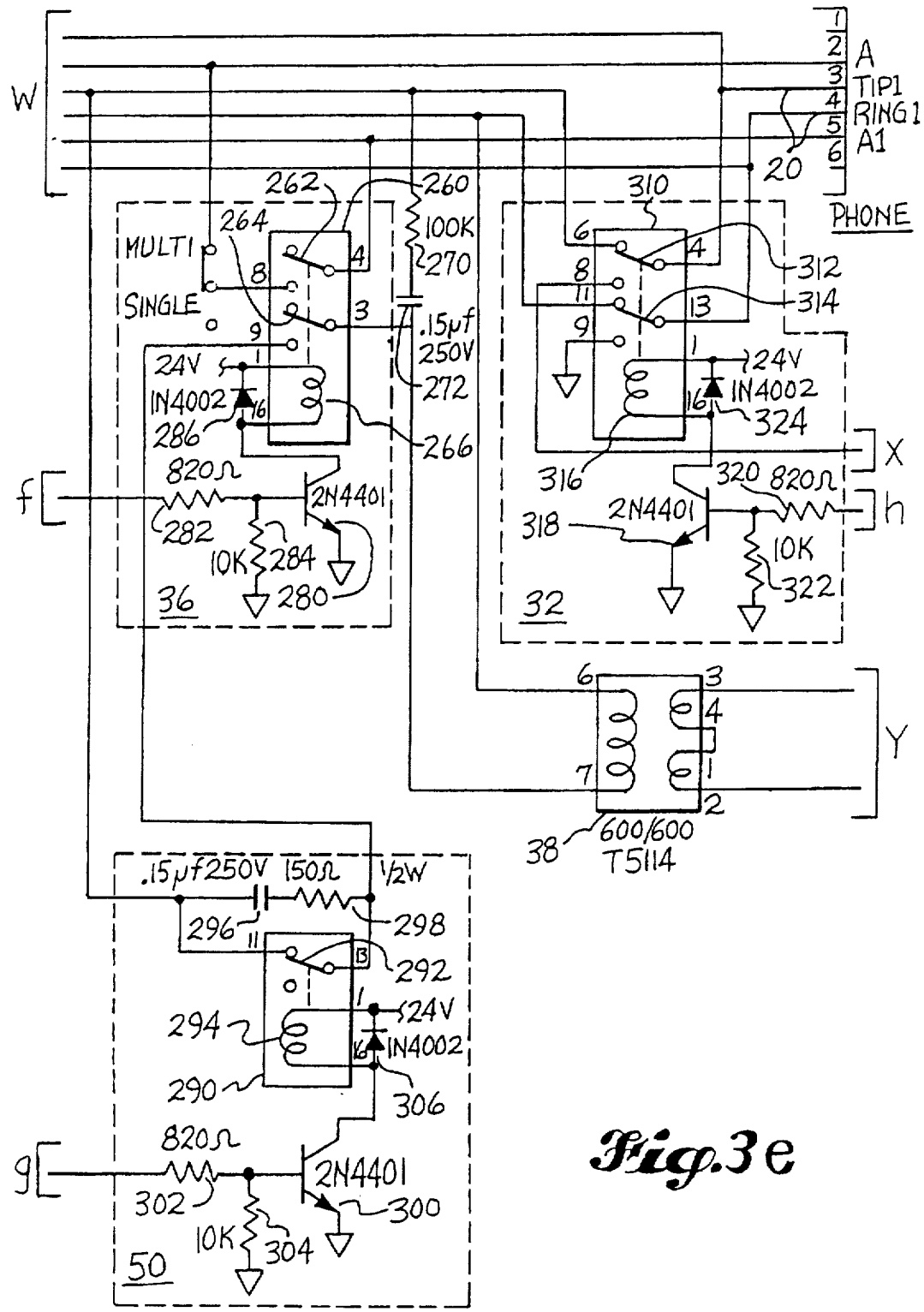
Figure 3F:
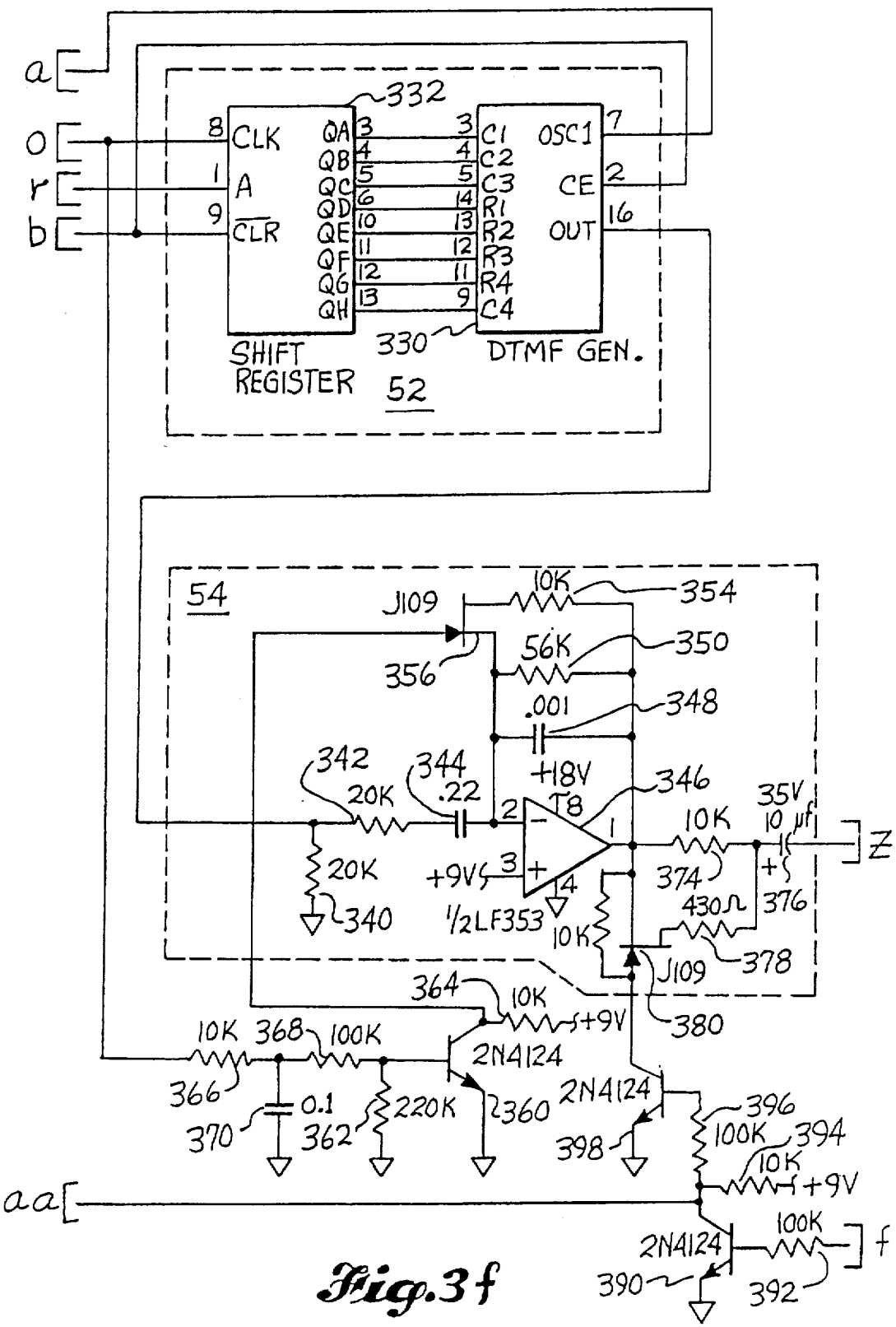
Figure 3G:
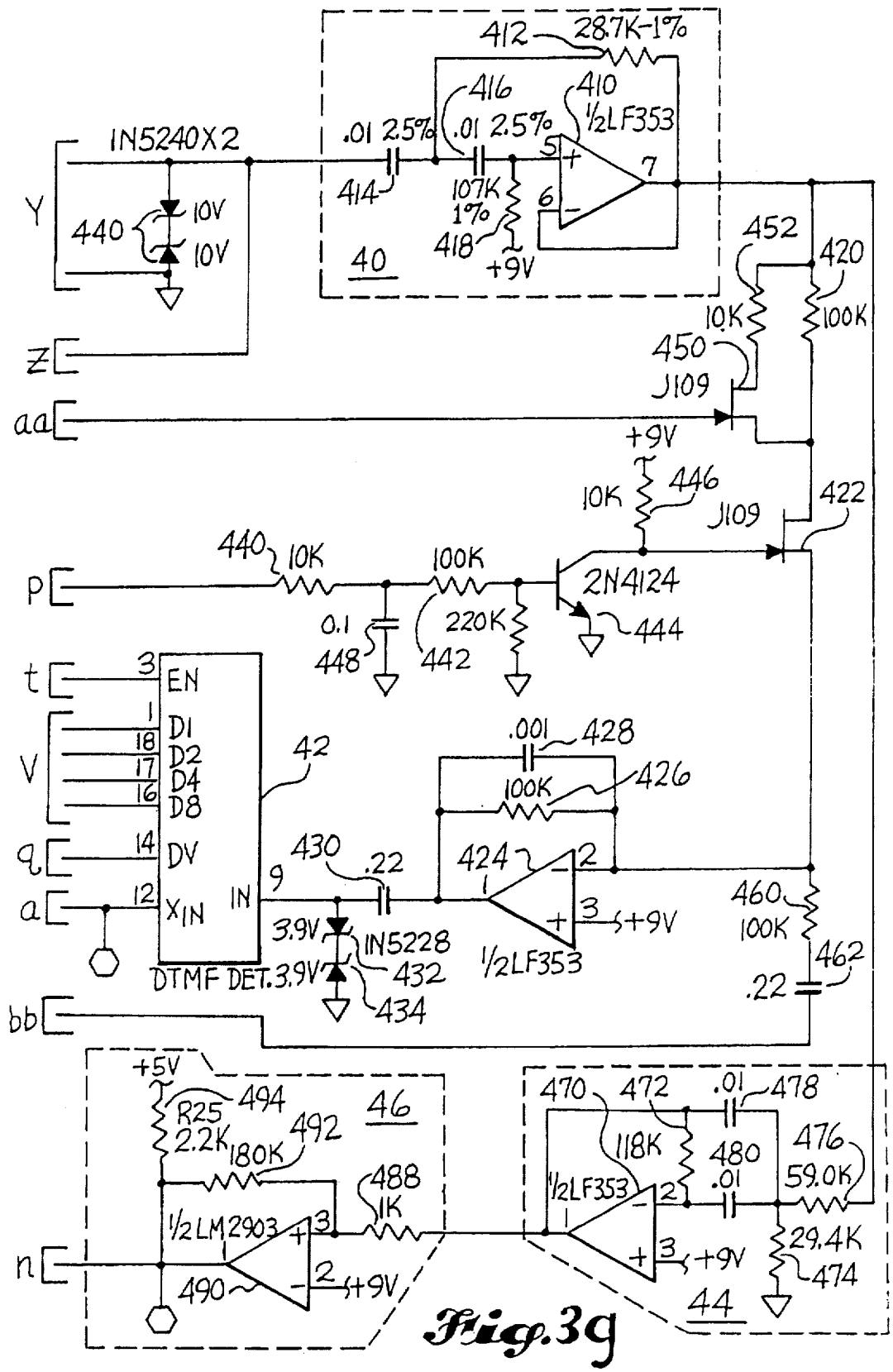
Figure 3H:
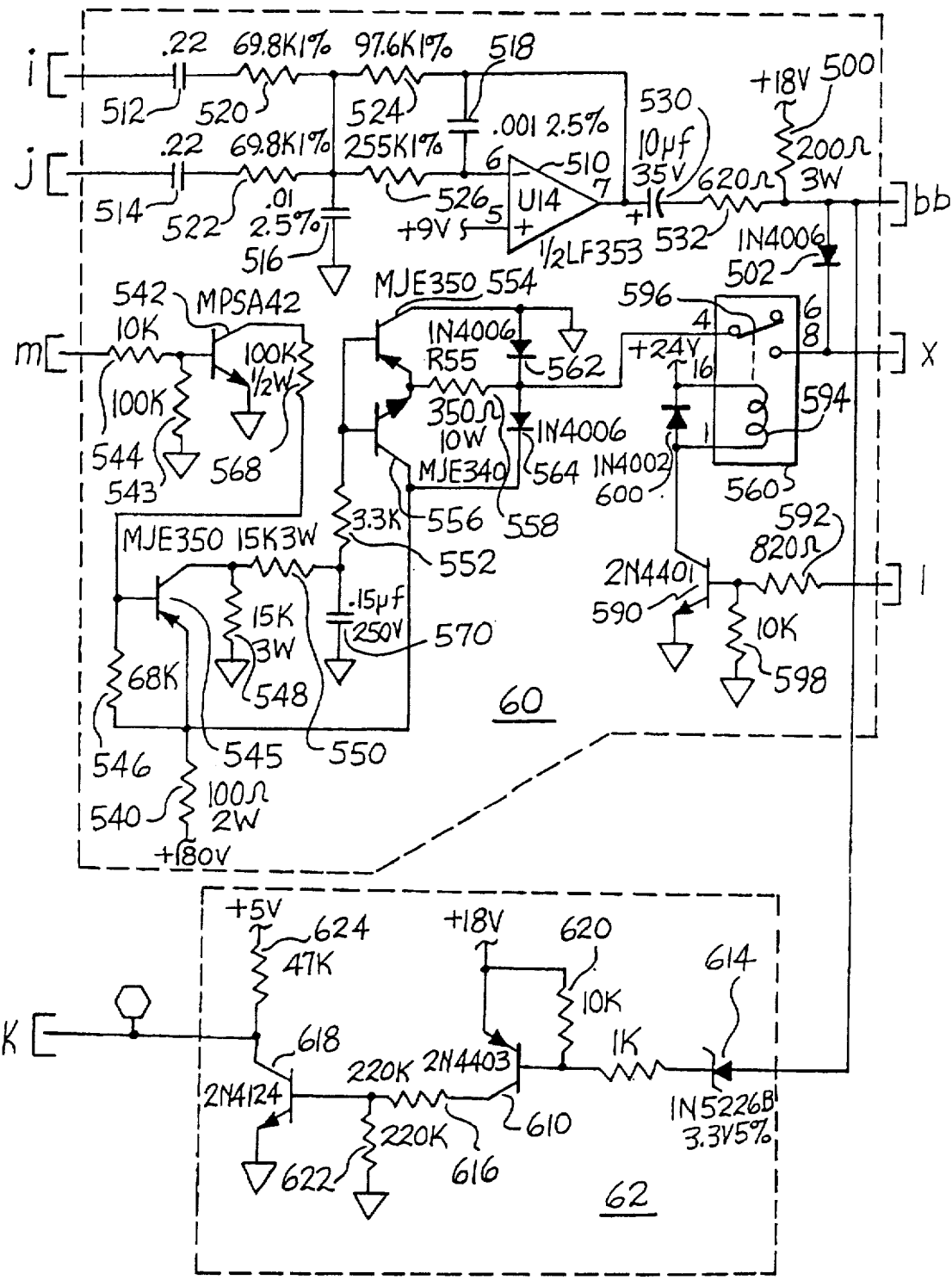

A block diagram of the control system 10 is illustrated in FIG. 2. The multiconductor line 22 (FIG. 1) is connected to a telephone line 22 shown in the upper left hand corner of FIG. 2 while the multiconductor line 20 (FIG. 1) connected to the telephone 12 is shown at the upper right hand corner of FIG. 2. The telephone line 22 is connected to the station line 20 through a line current detector 30 and a relay 32. The relay 32 is controlled by a central directly to the telephone line 22 through the line current detector 30 or to other portions of the circuitry.

The line current detector 30 measures the telephone line current in order to determine the status of the telephone line. When the line current is above a predetermined value, the line current detector 30 outputs a bit to an I/O port of the central processing unit 34.

A ring detector 33 also connected across the tip and ring lines of the telephone line detects a high voltage ring signal on those lines and outputs a logic level to an I/O port of the CPU 34. As explained in greater detail below, when a ringing signal is detected by the ring detector 33, the CPU 34 outputs a logic level from an I/O port to an off hook relay 36 that lowers the impedance between the tip and ring lines of the telephone line in order to simulate an off hook condition. Signals on the tip and ring lines are coupled to other portions of the circuitry through the off hook relay 36 and conventional audio transformer 38. These signals are received from either an external source through the telephone line 22 or through the station line 20 from the telephone 12 (FIG. 1) connected to the control system 10.

The audio signals at the output of the transformer 38 are applied to a low pass filter 40 and then to both a dual-tone multifrequency detector 42 and a band pass filter 44 The dual-tone multifrequency detector 42 decodes conventional dual tone multifrequency (DTMF) signals generated either externally or by the telephone 12. The detector 42 outputs a four bit code indicating the one of sixteen possible tone combinations corresponding to the numbers 0–9,* #, and keys A–D on some tone pads. The band pass filter 44 is centered at about 400 Hz in order to pass various supervisory tones such as busy signals The output of the band pass filter 44 is applied to a Schmitt trigger 46 whose output is applied to an I/O port of the CPU 34.

The above description deals with circuitry receiving signals from an external station through the telephone line 22 or the local station 12 through the station lines 20. The control system 10 is also capable of applying dial pulses, dual-tone multifrequency tones and supervisory tones to the telephone lines 22, or station lines 20. Accordingly, an I/O port of the CPU 34 is applied to a dial pulse generator 50 which intermittently de-energizes the off-hook relay 36 in order to momentarily raise the impedence of the telephone lines 22 to simulate dial pulses Four bits of the data bus of the CPU 34 are applied to a dual-tone multifrequency tone generator 52 which selectively generates combinations of dual tones to indicate one of 16 keys of a conventional key pad. The output of the dual tone multifrequency generator 52 is applied to the transformer 38 through an amplifier and filter 54.

The control system 10 also includes circuitry for interfacing with the local telephone 12. Accordingly, an I/O port of the CPU 34 is applied to the input of a local tone and current generator 60 that generates supervisory tones, such as busy signals, ringing signals, etc., and loop current for the telephone station 12. A local current detector 62 measures the current through the tip and ring lines 20 of the station. When the loop current rises above a predetermined value, the local current detector 62 generates an output to an I/O port of the CPU 34 to indicate an off-hook condition of the telephone station 12.

As mentioned above, the operation of the control system 10 can be divided into groups of local operating modes and external operating modes. In the local operating modes, the control system 10 is accessed through the local telephone 12 connected to the control system 10 through the station tip and ring lines 20. The local operating modes are as follows:

1. Placing a telephone call.

When the local telephone station 12 goes off hook, the telephone lines 22 are disconnected from the station 12 by energizing the relay 32. A dial tone is then applied to the local telephone station 12 by the local tone and current generator 60. The output of the dual tone multifrequency detector (DTMF) 42 and the output of the local current detector 62 are then monitored by the CPU 34 to detect dialing tones or dial pulses, respectively. The CPU 34 decodes the digits being dialed by the telephone station 12 and records these digits. If the CPU 34 determines that the station 12 is placing an outside call rather than programming the control system 10 or using the intercom function, the CPU 34 dials the recorded digits through either the dial pulse generator 50 or dual-tone multifrequency generator 52. When the CPU 34 has dialed the number of digits previously dialed by the local station 12 (i.e., the CPU 34 has "caught up" to the local station 12), the CPU 34 energizes the relay 32 to connect the telephone station tip and ring lines 20 directly to the tip and ring lines 22. Thereafter, the dial pulses or dial tones are applied by the local station 12 directly to the trunk tip and ring lines 22. The primary advantage of this "catch up" feature is the speed at which an outside number can be dialed. Conventional systems record the entire number being dialed, determine whether the number being dialed is for placing an outside call, and then apply all of the recorded numbers to the telephone lines 22. As a result, these conventional systems do not even begin applying the called number to the telephone lines 22 until after the entire called number has been dialed by the local station. In contrast, in the control system 10 when the local station completes dialing the called number, the called number has already been placed on the telephone trunk lines 22.

2. Placing a call through a private telephone service.

The "catch up" feature described above is particularly advantageous when placing a call through a private telephone service requiring a multidigit (usually seven) access code. In conventional telephone systems, one must dial the access code, wait for a dial tone, then dial a multidigit station identifier and finally the seven digit telephone number. With the control system 10, the access code digits, identifier digits, and telephone number digits are sequentially dialed without waiting for dial and other supervisory tones. The control system 10 records all of these numbers as they are dialed by the local station 12 and applies them to the telephone lines 22 in an appropriate manner. Thus, the control system 10 applies the access code digits to the telephone line, waits for a dial tone, then dials the multidigit identifier and then finally dials the seven digit telephone number. If, at any time, the control system catches up to the digits as they are being dialed by the local station 12, the CPU 34 de-energizes the relay 32 and the digits are thereafter applied to the telephone lines 22 directly from the local station. This "catch up" feature can also be used when the access code is dialed from memory Thus, a seven digit access code may be dialed from a memory location by dialing a selected digit such as "1." The caller need not wait for a supervisory tone confirming that the access code has been accepted Instead, the caller can dial the desired number immediately after dialing "1". The system will record the digits of the telephone number while the access code is being automatically dialed. After the supervisory tone confirming acceptance of the access code is received, the system automatically dials the recorded digits of the phone number and thereafter dials any remaining digits in realtime as they are manually dialed It will also be understood that the telephone number may be dialed from memory instead of being dialed manually The "catch up" feature thus allows long distance telephone numbers to be dialed through a variety of long distance services in the conventional manner (i.e., "1+area code+number").

3. Last Number Redial

The digits for each called number are decoded by either the dual-tone multifrequency detector 42 or by the CPU 34 from the output of the local current detector 62 and stored in memory. This number may be repeatedly redialed by pushing appropriate keys on the local station 12 The tones corresponding to these keys are decoded by the dual-tone multifrequency detector 42. The CPU 34 then applies dial pulses or dial tones from the dial pulse generator 50 or dual-tone multifrequency generator 52, respectively, corresponding to the memorized numbers directly to the telephone lines 22. The CPU 34 then energizes relay 32 to apply the local station 12 directly to the lines 22.

4. Automatic Call Back

In the automatic call back mode, which is entered by selecting appropriate digits on the local station key pad, a busy or unanswered line can be repeatedly called at predetermined intervals. After a call has been placed and the called station is either busy or unanswered, the automatic call back mode is selected. Thereafter, the CPU 34 will apply the dial pulses through dial pulse generator 50 or dialing tones through dual-tone multifrequency generator 52 corresponding to the previously called number. When and if the called party answers, the ringing or busy signal will cease, and this condition will be detected by Schmitt trigger 46, the output of which is applied to the CPU 34. The CPU 34 then causes tone generator 60 to generate a ring signal that is applied to the local station 12. When the local station 12 goes off hook, the off hook condition is detected by the local current detector 62 thereby causing the CPU 34 to energize the relay 32 and connect the local station 12 to the called party.

5. Toll Call Restriction

Local stations 12 are prevented from gaining access to the telephone lines 22 for any telephone number beginning with a "1" or "0" digit This feature is selected or overridden by dialing a four digit access code either through the local station 12 or, as explained in greater detail below, from an external station through lines 22.

6. Call Hold

Incoming calls are placed on hold by pushing the appropriate keys on the local station 12. CPU 34 then energizes the relay 32 and energizes the off hook relay 36 to maintain a low impedance condition on the lines 22. This low impedance created by the off hook relay 36 simulates the local station 12 being off hook so that the local station 12 does not hang up on the calling party. The control system 10 may be equipped with a "music on hold" feature that applies a radio station, a music synthesizer or other music to the lines 22 through the transformer 38 in the hold condition.

7. Local Intercom

By dialing an appropriate number in the local telephone 12 when the local telephone station 12 is off hook, all of the extensions to the local station can be made to ring. Moreover, the ringing pattern of the extensions can be selected by selecting appropriate digits on the local station key pad. For example, by dialing "6 N #" all of the extensions to the local station will ring in a cadance of N rings Individuals can thus be selected by selecting a ringing pattern associated with that individual. When the local intercom mode is dialed by dialing, for example "6 3 #," the CPU 34 causes the local tone and current generator 60 to place a cadance of three rings on the tip and ring line s 20 connected to the extensions of the local station 12.

The local intercom mode can also be used while an external call is placed on hold. The appropriate keys on the local station 12 are pushed, causing CPU 34 to energize relay 32 and off hook relay 36, thereby placing the outside call on hold, the CPU 34 then causes the local tone and current generator 60 to generate a dial tone for the local station 12. The local station then dials the intercom mode as described above to notify the individual corresponding to the selected cadance to pick up an extension. When the extension is picked up, the current is detected by local current detector 62. The CPU 34 then de-energizes relay 32 to connect the lines 22 to the extension of the local station 12 and de-energizes the off-hook relay 38 since the low impedance on the line 22 is now provided by the station 12 being off-hook. This provides a "call transfer" function.

8. Conferencing

In order to understand the conferencing mode, one must understand the "three-way calling" capability commonly provided by conventional telephone service. In conventional telephone service, one may join a third party in an existing telephone conversation by flashing the hook switch to hold and obtain a dial tone. The telephone number of the third party is then dialed. After the third party answers the hookswitch is once again flashed, thereby connecting all three parties to each other.

Conferencing with two outside stations can be accomplished by the control system 10 utilizing the telephone service "three-way calling" capability. Accordingly, if the CPU 34 determines that the local station 12 is attempting to conference with an outside line, the off hook relay 36 is momentarily deenergized to simulate a hook flash to the telephone service central office. The existing outside call is then placed on hold thereby freeing up the lines 22 for placing another outside call. The local station 12 then dials a third party. When the third party answers, the off hook condition is detected by the line current detector 30 thereby causing the CPU 34 to actuate the off hook relay 36 to simulate a hook flash. The hook flash then releases the original outside call from hold thereby connecting the two outside calls to each other and to the local station 12.

9. Memory Dialing

By selecting appropriate keys on the key pad of the local station 12, telephone numbers may be entered into memory of the CPU 34. These memorized numbers can then be selected by pressing appropriate keys on the key pad of the local station 12. The CPU 34 then dials the memorized numbers through either the dial pulse generator 50 or dual tone multifrequency generator 52. An important feature of the control system 10 is the ability to designate that the memorized numbers be dialed either through dial pulses or dialing tones. Additionally, one portion of a number can be dialed with dial pulses while the remainder is dialed through dialing tones. This is particularly important for private long distance telephone services which sometimes have an access code that can only be dialed through dial pulses. Once the long distance service has been accessed, the long distance service is capable of handling dialing tones By automatically programming the CPU 34 to dial the access code with dial pulses and the remaining digits through dialing tones, the dialing speed of the memory dialing feature can be maximized. It is also possible to link two or more memory numbers automatically so that, for example, a long distance number can be dialed followed by a delay and then the subsequent dialing of a telephone service calling number.

10. Local limited Ringing

The CPU 34 can be programmed to ring in a preselected manner although the calling party will hear a continuous ringing. In the local limited ringing mode, after a predetermined number of rings the relay 32 is energized to disconnect the local station 12 from the lines 22. At that point, the ringing signal on the lines 22 is no longer connected to the local station thereby discontinuing the ringing. If the local station 12 goes off hook, the off hook condition is detected by the local current detector 62 which causes the CPU 34 to deenergize the relay 32 thereby connecting the local station 12 to the lines 22. The CPU 34 may also be programmed to not allow the local station 12 to ring at all during certain periods. During the periods the CPU 34 energizes the relay 32 to disconnect the local station 12 from the trunk lines 22.

11. Control System Disable

The control system 10 may be effectively disabled by entering a predetermined, two digit code from the key pad of the local station 12. The CPU 34 then deenergizes the relay 32 permanently until an appropriate code is dialed so that the local station 12 is connected to the lines 22. The relay 32, of course, also connects the local station 12 to the telephone lines 22 in the event that power is lost since the lines 20 and 22 are connected to each other when the relay 32 is in the deenergized condition.

The control system also operates in a number of external modes in which the control system 10 is accessed through external stations through the lines 22. In the external operating modes, the response of the control system 10 to incoming calls depends upon the mode in which the control system is programmed. If no external modes have been programmed, the control system 10 operates in the control system disable mode in which the lines 22 are connected directly to the local station 12 The external operating modes are as follows:

1. Simulated Call Forwarding

The control system 10 utilizes the three-way calling capability of the telephone service central office in a new and different manner to perform a simulated call forwarding. In the simulated call forwarding mode, an outside call to the local station 12 is automatically routed to an external station. The ringing of the incoming call is detected by the ring detector 33 thereby causing the CPU 34 to energize the off hook relay 36 to answer the incoming call. The CPU 34 then momentarily deenergizes the off hook relay 36 to flash the central office thereby placing the incoming call on temporary hold. The CPU 34 then dials the call forwarding number either through the dial pulse generator 50 or the dual tone multifrequency generator 52. The CPU 34 then once again momentarily deenergizes the off hook relay 36 to release the held incoming call thereby connecting the incoming call to the call forwarded station. Completion of the call is detected by the line current detector 30 which causes the CPU 34 to deenergize the off hook relay 36.

The control system 10 also allows for the use of the call transfer capability of the telephone service central office, in conjunction with the simulated call forwarding method described above If this call transfer capability is available, then the control system 10 may be set to forward calls as follows The ringing of the incoming call is detected by the ring detector 33 thereby causing CPU 34 to energize the off hook relay 36 to answer the incoming call. The CPU 34 then momentarily deenergizes the off hook relay 36 to flash the central office thereby placing the incoming call on temporary hold. The CPU 34 then dials the call forwarding number either through the dial pulse generator 50, or the dual tone multi-frequency generator 52. The CPU 34 then deenergizes the off hook relay 36, causing the phone company central office to connect the incoming call directly to the call forwarded station via the central office's call transfer service, and releasing the line of the control system 10 to handle another incoming call.

This significantly increases the number of calls that may be forwarded within a given period of time, since the control system is only used to set up each call.

With either method of simulated call forwarding, as described above, the control system 10 may also generate a 2 second audible ringback tone after coming off hook to answer the call, but before dialing the forwarding number. This is designed to match the normal 2 second on, 4 second off cadence of audible ringback tone, thus giving the caller confidence that the call is progressing properly.

2. Remote Programming of Call Forwarding Number

The call forwarding number is programmed or modified by first dialing a special three digit access code. This access code erases the previous call forwarding number The new call forwarding number is then dialed and stored into memory of the CPU 34. The call forwarding number can either be changed through the local station 12 or through an external station dialing the local station.

3. Answering Machine

A conventional answering machine may be connected to the control system in order to broadcast prerecorded messages and record messages from the calling party in a conventional manner. In addition to using a conventional answering machine, any information communicating device, such a voice synthesizer, tone generator or solid state voice recorder, may be used to implement this feature or any other feature described herein as using an answering machine.

4. Answering Machine and Call Forwarding

These two previously described modes can be combined to inform a calling party through the answering machine that his call is being forwarded to another number. The control system 10 then forwards the incoming call to an external location. In the answering machine and simulated call forwarding mode, the incoming call is answered by the answering machine. The current drawn by the answering machine is detected by line current detector 30 which then triggers the CPU 34. CPU 34 then starts a timer, the duration of which has been pre-programmed to be the same length as the pre-recorded message on the answering machine. When the timer expires, indicating the answering machine has broadcast the prerecorded message, the CPU 34 energizes the relay 32 which disconnects the answering machine and then energizes off hook relay 36. The CPU then momentarily deenergizes the off hook relay 36 to place the incoming call on hold. The CPU 34 then dials the forwarded number as described above before once again momentarily deenergizing the off hook relay 36 to release the hold on the calling party and connect it to the called station.

5. Page Alert

The page alert mode may be used with either the answering mode, the simulated call forwarding mode or both the answering and simulated call forwarding modes together. When used with the answering mode, an incoming call is detected by the ring detector 33 and answered by the answering machine. The answering machine then broadcasts the prerecorded message and records the message left by the calling party. When the calling party hangs up, the off hook relay 36 is energized to place the control system 10 on line. The CPU 34 then dials the telephone number of an individual's pager to signal the individual that a message has been left on his answering machine. The individual then dials the local station 12 and his call is answered by the answering machine. The individual then dials a three digit access code which prevents the control system 10 from initiating another Page Alert sequence, thus allowing the individual to retrieve the message left on the answering machine. In addition, should the caller hang up during the period in which the prerecorded message is being broadcast, the page alert function can be inhibited. This feature prevents an individual from responding to a page only to find that no message has been left on the answering machine.

In addition, when combining the page alert and answering machine modes, the control system 10 offers a special feature for display-type pagers. A display-type pager functions by having a caller dial a common phone number to reach a paging terminal. The paging terminal responds by generating a series of tones. The caller may then dial, in DTMF, a phone number that he wishes the user of the pager to call back. The paging system then transmits this number to the display of the pager and sounds an audible alert on the pager. In the past, a difficulty with this display-type paging system has been that each caller must be pre-instructed in the use of the paging system. A caller who was not instructed in its use, would not know what to do when the paging terminal responds with its tones. The control system 10 overcomes this difficulty as follows. The answering machines announcement is recorded to instruct the caller that he may dial his telephone number after the answering machines beep tone, instead of leaving a message as normal. When the caller enters his number, the digits are detected by DTMF detector 42 and stored by CPU 34. When the calling party hangs up, the off hook relay 36 is energized to place the control system 36 on line. The CPU 34 then dials the telephone number of the paging terminal, waits for detection of the response tone, then dials the number that was previously stored as entered by the caller. The off hook relay 36 is then de-energized, releasing the line, so that the next call may be handled. In this way, the control system 10 has taken the burden of dealing with the display paging terminal away from the caller, thus allowing the average, non-instructed caller to leave his telephone number for the display-type pager.

When the page alert mode is used with the simulated call forwarding mode, the incoming call is detected by the CPU 34 through the ring detector 33. The CPU 34 then energizes the off hook relay 36 to answer the incoming call. The off hook relay 36 is then momentarily deenergized to place the incoming call on hold at the central office. The CPU 34 then dials the telephone number of the pager. The CPU then momentarily deenergizes off hook relay 36 twice in succession to release the calling party from hold and to hang up on the pager. The CPU 34 then momentarily deenergizes off hook relay 36 once more, to place the calling party on hold again. The CPU 34 then dials the telephone number of the call forwarding number. The off hook relay 36 is once again momentarily deenergized to simulate a hook flash thereby releasing the calling party from the hold and connecting the calling party to the call forwarding station By dialing the pager number before dialing the call forwarding number, the individual is alerted that a call will be forwarded for him. This feature is particularly important when the individual is in a public place such as a restaurant or movie theatre because it might otherwise be difficult to locate the individual.

Finally, the page alert mode may be combined with the combination of the answering and simulated call forwarding mode. The operation in these modes is essentially as described above except that the calling party is informed by the prerecorded message on the answering machine that his call is being forwarded before the incoming call is placed on hold and the pager is dialed.

6. Call Screening

The purpose of the call screening mode is to shield the local station 12 from all incoming calls other than those dialing a predetermined call screening code. When the control system 10 is in a call screening mode, incoming calls are detected by the ring detector 33 thereby causing the CPU 34 to answer the call by energizing the off hook relay 36. The calling party then dials a predetermined access code. If the access code matches the authorized codes stored in the CPU 34, the local tone and current generator 60 generates a ringing signal on the local station 12. When the local station answers as detected by the local current detector 62, the relay 32 is deenergized to connect the local station 12 to the calling party on the line 22. The off hook relay 36 is then deenergized. The CPU 34 can also be programmed to cause the local tone and current generator 60 to generate different ringing signals corresponding to different access codes. The ringing pattern thus identifies the calling party to allow individuals at the local station to decide whether or not they wish to answer the calling party.

7. Screening With Call Forwarding

The screening mode together with the simulated call forwarding mode is somewhat like the screening mode alone in that the identity of the calling party's access code determines the subsequent operation of the control system 10. However, instead of producing a predetermined ringing pattern corresponding to each access code, the screening with simulated call forwarding mode forwards the incoming call to one of several call forwarding numbers depending upon the identity of the access code. Thus, an incoming call is detected by the CPU 34 through the ring detector 33 and then answered by energizing the off hook relay 36. The calling party then dials the access code and the CPU 34 momentarily deenergizes the off hook relay 36 to place the calling party on hold at the central office. The CPU 34 then dials a call forwarding number corresponding to the access code through either the dial pulse generator 50 or the dual tone multifrequency generator 52. Finally, the off hook relay 36 is once again momentarily deenergized to release the hold from the calling party and connect it to the call forwarding station. The possibilities for use of the screening with simulated call forwarding mode are extensive. For example, individual employees at a business enterprise may have their own individual access numbers so that they may be individually reached by callers.

8. Screening With Simulated Call Forwarding and Answering

One limitation with the screening with simulated call forwarding mode used as described above is that individuals may not know the access code for each of the individuals that can be reached on the various call forwarding numbers. By adding the answering mode, a prerecorded message on an answering machine is broadcast after the answering machine answers the incoming call. The answering machine informs the caller of the various access codes for each individual that can be reached through the call forwarding numbers. The calling party then dials the access code for the selected individual and operation of the control system 10 proceeds as described above with reference to the screening and call forwarding mode.

9. Remote

The remote mode allows the owner access to the control system 10 by dialing an appropriate access number. This allows the individual to change call forwarding numbers, receive messages left on the answering machine, change page numbers for the page alert modes, change call screening access codes, etc., all from an external location. The remote mode also allows different modes to be selected from an external location. The remote mode is accessed by dialing the local station and then dialing the predetermined access number. Although remote access to the control system 10 is described herein as being through telephone lines, it will be understood that access can also be through other communications channels, such as a radio link.

10. Money Saver

The "money saver" mode is an offshoot from the remote mode. Basically, the money saver mode allows an individual to place telephone calls from an external location, such as a telephone booth, through the local station. One of the advantages of this mode is the ability to make long distance calls from telephone booths at the direct dial rate rather than the substantially more expensive operater assisted rate required for long distance telephone calls from telephone booths. In the money saver mode, the local station is dialed and the special access number is then entered. The CPU 34 maintains the off hook relay 36 in an energized condition while the calling station dials the desired local or long distance number. The CPU then momentarily deenergizes the off hook relay 36 to simulate a hook flash thereby placing the calling station on hold at the central office. The CPU then dials the desired local or long distance number and once again momentarily deenergizes the off hook relay 36, causing the central office three-way calling service to connect the incoming call to the outgoing call. The caller may terminate this first call by dialing a terminate command. This causes the CPU to again momentarily deenergize off hook relay 36, thereby causing the central office to disconnect the other party. The caller may then dial another number if he wishes, and repeat this process as many times as desired without hanging up.

The "Money Saver" mode also may be used in conjunction with the central office call transfer service, if available. This mode functions as follows. The local station is dialed and the special access number is then entered. The CPU 34 maintains the off hook relay 36 in an energized condition while the calling station dials the desired local or long distance number. The CPU then momentarily deenergizes the off hook relay 36 to simulate a hook flash thereby placing the calling station on hold at the central office. The CPU then dials the desired local or long distance number and then deenergizes the off hook relay 36, causing the central office to connect the caller directly to the desired number via the central office's call transfer service, and thereby releasing the line of the control system 10 so that the next call may be handled. This significantly increases the number of calls that may be handled within a given period of time, since the control system is only used to set up each call rather than staying on line for the duration of each call. In this way, many users may take advantage of the same control system.

If the "Money Saver" feature is being used in the mode whereby it stays on the line for the duration of each call, then provision must be made to disconnect the call should the parties complete their call. The control system 10 employs several methods to this end. First, detection of dial tone or other supervisory signals such as busy or reorder for a predetermined time may trigger a disconnect. Second, detection of silence for a pre-determined period of time may trigger a disconnect. Third, detection of an interruption in line-current may trigger a disconnect, after the expiration of a delay designed to allow the caller time to enter a command to prevent the control system from disconnecting. This handles the situation where the other party hung up first causing a line current interruption to occur, but the original caller is still on the line and wishes to place another call through the control system. Also, the control system may be set to ignore the first interruption in line current that occurs with each call it dials. This handles the case where a line current interruption occurs when the third party answers in a three-way call. Therefore, the control system ignores the interruption that occurs when the called party answers, but accepts the interruption that occurs when either party hangs up.

The control system also employs a feature that allows the "money saver" mode to be used on a line that has central office call waiting service. The call waiting service of the central office produces a "beep" on the line if a new call is coming in while an original call is in progress. One of the parties in the original call may be placed on central office hold, while the other party speaks to the new caller. The control system handles this service as follows. An original caller may dial a second party via the control system's "money saver" feature. If, while the original caller and second party are conversing, a third party calls in attempting to use the control system, the control system will detect the call waiting signal and proceed as follows. The control system will generate a hook flash, causing the central office to place the original caller and second party on hold, allowing their conversation to continue, while connecting the new third party directly to the control system. The control system will then generate an audible busy indication to the new third party signifying the line is in use. Then the control system will hang up and wait for a ring-back from the central office indicating the original and second parties are still on central office hold. Upon detection of the ring-back, the control system will come off hook, thus taking the original party and second party off of the central office hold, reconnecting them to the control system, and restoring conditions to as they were before the call waiting signal was detected. In this way the original and second party's conversation was not interrupted yet the new third party was informed of the busy condition of the line.

One useful feature of the control system 10 is the ability to maintain an accurate and up-to-date customer list in order to provide customers with software updates resulting from newly developed features or modifications to telephone service operating parameters. Customer lists are often obtained from warranty cards which purchasers are required to return to the manufacturer to validate the warranty. The primary disadvantage of customer lists obtained in this manner, however, is the failure of many purchasers to return the warranty card. To alleviate this limitation, the CPU 34 is programmed to be inoperative until the purchaser enters his telephone number through the local station 12. Thereafter, software in the CPU 34 automatically dials the toll free number of the manufacturer and reads out the phone number of the purchaser and the serial number of the purchased unit which has also been stored in the CPU 34. This allows the manufacturer of the control system 10 to keep an accurate customer list for the sale of updated software.

It will be understood that the control system 10 may be equipped with all or only some of the above described operating features It is also apparent that other operating features may be devised which are either similar or quite different from the above described operating features Operating features can be changed at any time by merely reprogramming the CPU 34.

A schmetic for the block diagram illustrated in FIG. 2 is illustrated in FIG. 3. The CPU 34 includes a conventional microprocessor 70 driven by a conventional oscillator circuit 72 consisting of an inverter 74 having resistor 76 and the series combination of resistors 78 and crystal 80 connected in parallel from the output of inverter 74 to its input. Capacitors 82, 84, are connected from respective leads of the crystal 80 to ground. The shape of the waveform at the output of inverter 74 is restored to a clean square wave by inverter 86 before driving the microprocessor 70.

The microprocessor 70 includes "power up" circuitry 90 that resets the microprocessor 70 and other portions of the CPU 34 when power is initially applied to the system and interrupts the operation of the microprocessor 70 as power is lost from the system. When power is initially applied to the CPU 34, the +5 volt output from power supply 92 is immediately applied through resistor 94 to the RES input of the microprocessor 70. The +5 volt output of the power supply 92 is also applied through resistor 96 to the input of inverter 98. However, the input to inverter 98 is held low by capacitor 100 until capacitor 100 has charged through resistor 96. As a result, when power is initially applied to the system the input to inverter 98 is held low so that inverter 98 applies a high through resistor 102 to the base of transistor 104. Transistor 104 then saturates causing the RESET input to microprocessor 70 to go low thereby resetting the microprocessor 70. Thus, as soon as the inverter 98 and transistor 104 receive power, the microprocessor 70 is reset by a low at the collector of transistor 104. After capacitor 100 charges through resistor 96 to the switch point of inverter 98, the output of inverter 98 goes low thereby allowing the base of transistor 104 to be held low through resistor 106. Transistor 104 is then cut off so that +5 volts is applied through resistor 94 to the RESET input of microprocessor 70. As explained in greater detail below, the power on reset is also applied to other portions of the CPU 34 as well as other circuitry in the control system 10.

When AC power to the power supply 92 is lost, the 24 volt output of power supply 92 drops before the remaining outputs of the power supply 92 since these other outputs are more heavily filtered. The +24 volt output of the power supply 92 is applied to the cathode of Zener diode 110. The reverse biased voltage of Zener diode 110 is a fairly large percentage of +24 volts so that as the 24 volt output of the power supply 92 starts to fall, the voltage across resistor 112 quickly falls to 0 volts. However, as long as +24 volts is being applied to the Zenner diode 110, a voltage larger than about 0.7 volts is applied to the base of transistor 114 through resistor 116 thereby maintaining transistor 114 at saturation. Under these circumstances, sufficient current flows through resistor 118 so that the voltage applied to the inverting input of comparator 120 is below the threshhold voltage set by voltage divider resistors 122, 124. The positive feedback resistor 126 is connected between the output and the positive input of comparator 120 to provide hysteresis. The high at the output of comparator 120 provided through pull-up resistor 128 holds the IRQ input to the microprocessor 70 in the noninterrupted condition thereby allowing normal operation of the microprocessor 70.

When AC power is removed from the power supply 92, the voltage across resistor 112 quickly drops to zero thereby cutting off transistor 114 and causing the negative in put to comparator 120 to go high. The output of comparator 120 then quickly falls to ground potential to immediately interrupt the microprocessor 70 and cause the microprocessor 70 to execute an interrupt subroutine. This interrupt subroutine terminates operation of the CPU in an orderly manner in order to prevent spurious data from being written into random access memory (RAM) as explained below The low at the output of the comparator 120 in the power down condition also discharges capacitor 100 through diode 130 and resistor 132 after the output of comparator 120 has been low for a predetermined period, capacitor 100 discharges to the switching point of inverter 98 so that inverter 98 then saturates transistor 104 and applies a negative going reset to the microprocessor 70 and other circuitry in the CPU 34 and other portions of the control system 10.

In summary, the power up circuitry 90 immediately resets the microprocessor 70 other portions of the CPU 34 and other circuitry in the control system 10 as soon as AC power is applied to the power supply 92. When AC power is removed from the power supply 92, the power up circuitry 90 immediately causes the microprocessor 70 to execute a power down interrupt subroutine and, after a short delay, resets the microprocessor 70 as well as the other circuitry in the control system that is reset upon power up of the power supply 92.

The microprocessor 70 operates in accordance with a program of instructions stored in a read only memory (ROM) 140 The ROM 140 outputs the instructions on the B0–B7 bits of an address data bus (AD BUS) from a memory location designated by the. A0–A12 address inputs. The A8–A12 bits of the address are provided by the A8–A12 bits of the microprocessor's address bus However, the address data bus B0–B7 is used as both a low order address bus and a data bus In order to allow the AD BUS to transmit instructions while the address bus is designating a location for the instructions in ROM 140, the A0–A7 bits of the address are written into an address latch 142 from the AD BUS Thus, the microprocessor 70 initially places the A0–A7 bits of the instructions address on the AD BUS and then outputs a high on its address strobe (AS) output to latch the data on the AD BUS into the address latch 142. The address latch 142 then applies the A0–A7 address bits to the ROM 140 while the A8–A12 address bits are applied to the ROM 140 directly to the microprocessor 70. A low applied to the output enable (OE) input of the ROM 140 then outputs the instruction on the AD BUS and is read by the microprocessor 70.

The CPU 34 also includes a random access memory (RAM) 144 that is addressed in substantially the same manner as the ROM 140. However, insofar as the RAM 144 may both read and write data, a signal applied to its read (W) input designates the function of the RAM 144. The read control signal is generated as explained below Basically, a high applied to the W input causes the RAM to output data while a low applied to the W input causes the RAM 144 to input data. In either case, the RAM 144 is enabled by a low applied to its chip select (CS) input which is generated as explained below.

As mentioned above, the ROM 140 and RAM 144 are separately enabled by signals applied to their OE and CS inputs, respectively. These signals are generated by a decoding circuit from the A10–A12 address bits, R/W, data strobe (DS), and PA4 outputs of the microprocessor 70. The A11 and A12 address bits of the microprocessor 70 are applied to NOR-gate 150 which outputs a high in the event that both address bits are low. The output of NOR-gate 150 is applied to one input of NAND-gate 152 along with the A10 address bit of the microprocessor 70 The output of NAND-gate 152 will thus be low when the high order address bits are "100". This low at the output of NAND-gate 152 is applied to one input of NOR-gate 154 while the other input from NOR-gate 154 is connected to the PA4 output of microprocessor 70 and a manual program switch 157. Assuming that the PA4 output of microprocessor 70 is low, then independent of the state of the program switch, the output of NOR-gate 154 will be high whenever the high order address bits are "100." The high at the output of NOR-gate 154 enables NAND-gate 156 so that when a high data strobe pulse is output by the microprocessor 70, a low at the output of NAND-gate 156 generates a high at the output of inverter 158. This high at the output of inverter 158 turns on transistor 160 through resistor 162 thereby pulling sufficient current through resistor 164 to bring the chip select CS in put to RAM 144 low thereby enabling RAM 144. It is thus seen that RAM 144 will be enabled on the data strobe pulse whenever the high orders address bits are "100." The RAM 144 is disabled whenever the PA4 "external RAM disable" output is high.

A "program" switch 157 is also connected to the PA4 I/O port of microprocessor 70 through resistor 170. The PA4 port is periodically tested to detect a low caused by closing switch 157 to switch the system 10 to the programming mode. The PA4 I/O port thus serves as an input from switch 157 and as an output to NOR-gate 154.

Whenever RAM 144 is enabled by a high at the output of inverter 158, NAND-gate 172 is enabled to gate the R/W output of microprocessor 70 from inverter 174 to the read (W) input to RAM 144. Thus, if the R/W. output of microprocessor 70 is high when the RAM 144 is enabled as described above, the RAM 144 will output data on the B0–B3 bits of the AD BUS. If the R/W output of microprocessor is low, data on the B0–B3 bits of the AB BUS will be written into RAM 144 when the RAM 144 is enabled.

As mentioned above, RAM 144 is enabled only when the output of inverter 158 is high. However, a high at the output of inverter 158 can cause transistor 160 to draw sufficient current through resistor 164 to enable RAM 144 only if transistor 180 is saturated by a high applied through resistor 182 from the RESET input to microprocessor 70. Thus, when are set of the microprocessor 70 occurs by a low at the collector of transistor 104, the base of transistor 180 is pulled low through resistor 184 thereby preventing a high at the output of inverter 158 from enabling RAM 154. In short, transistor 160 and transistor 180, and their associated circuitry, function as a NAND-gate so that RAM 144 can be enabled only when microprocessor 70 is not being reset and the high order address bits are "100" during a data strobe.

In the event that the high order address bits are not "100," the output of NOR-gate 154 is low. This low at the output of NOR-gate 154 is applied to one input of NOR-gate 190. Assuming that the R/W output of microprocessor 70 is high, the output of NOR-gate 190 will be high, thereby enabling NAND-gate 192. A data strobe pulse from the DS output of microprocessor 70 will then cause NAND-gate 192 to enable the output of ROM 140. ROM 140 is thus enabled by the data strobe pulse whenever the microprocessor 70 outputs a high on the R/W output and the high order address bits are not "100."

The remaining circuitry in the CPU 34 decodes the high order address bits and the R/W output of the microprocessor 70 to provide an enable signal for the dual-tone multifrequency detector 42. Accordingly, the output of NAND-gate 156 and the output of inverter 174 are applied to NOR-gate 200. Both inputs to NOR-gate 200 are low to produce a high that enables the dual-tone multifrequency detector 42 whenever the microprocessor 70 is designating a read function by a high R/W output and the high order address bits are "100" during a data strobe pulse. Thus, when the microprocessor 70 is designating a read function, RAM 144 and dual-tone multifrequency detector 42 are simultaneously enabled. The output of RAM 144 is on the B0–B3 bits of the AD BUS and the four outputs from the dual-tone multifrequency detector 42 are on the B4–B7 bits of the AD BUS.

The ring detector 33 includes a monolithic ring detector circuit 210 having an external filter capacitor 212. The AC inputs to the monolithic ring detector circuit 212 are connected across the tip and ring lines of the telephone line 22 through resistor 214 and capacitor 216 which together implement a high pass filter. Whenever the AC voltage applied to the monolithic ring detector circuit 210 is above a predetermined value, DC current flows through resistor 218 and light emitting diode (LED) 220. Light emitting diode 220 is optically coupled to phototransistor 222 so that when LED 220 is illuminated, sufficient current is pulled through resistor 224 to apply a low to the PA7 input of microprocessor 70. The PA7 input is thus a ring detect signal that is low whenever a ringing signal is present on the telephone lines 22.

Connected across the telephone tip and ring lines 22 are a pair of back-to-back Zener diodes 226 for limiting the voltage across the tip and ring lines and a capacitor 228 for filtering very high frequency transients.

The line current detector 30; as described above with reference to FIG. 2, provides a line current detect signal responsive to the telephone line current exceeding a predetermined value. It also detects dial pulses on the telephone line. Line current is detected by a pair of light emitting diodes 230, 232 connected in series with resistor 234 and the tip line of the telephone 222. When the current flowing through the telephone tip line is below a predetermined value, relatively little illumination is emitted by the light emitting diodes 230, 232. However, as the telephone line current increases, the light emitting diodes 230, 232 emit sufficient light to saturate phototransistor 236 thereby drawing sufficient current through resistor 238 to generate a high at the output of inverter 240. This high is applied through resistor 242 to the PA1 input of microprocessor 70 to indicate to the microprocessor 70 that the telephone line current is above a predetermined value. Connected in series with the telephone tip line and in parallel with resistor 234 and diodes 230, 232 are the parallel combination of three series diodes, indicated generally at 246, 248. The purpose of these diodes 246, 248 is to limit the current flowing through light emitting diodes 230, 232 to a value that will not damage the diodes 230, 232.

As is well known in the art, an off hook condition of a telephone station is indicated by a relatively low impedance across the telephone tip and ring lines 22 Accordingly., the off hook relay 36 includes a conventional double pole relay 260 having a pair of relay contacts 262, 264 and a relay coil 266. When the relay 260 is energized by current flowing through the relay coil 266, relay contact 264 connects the tip line through dial pulse generator 50 to the ring line through transformer 38 thereby placing a relatively low impedance between the tip and ring lines. Normally, the impedance between the tip and ring lines in the on-hook condition is substantially infinite. However, operation of the control system 10 requires that signals on the telephone line 22 be received even when the telephone is on hook. For this reason, the primary of transformer 38 is connected across the tip and ring lines through resistor 270 and capacitor 272 even when the off hook relay 260 is deenergized. The relay 260 also includes a second relay contact 262 for connecting the A and A1 lines to each other in the off hook condition in the event that multiple stations are connected to the same line.

The relay 260 is energized by saturating transistor 280 thereby drawing current through the coil 266 of relay 260. The transistor 280 is saturated by a high applied through resistor 282 from the PB0 output of the microprocessor 70. The PB output of microprocessor 70 is thus an OFF HOOK RELAY signal that is high to place the control system in the off hook condition. When the off hook relay signal is low, transistor 280 is cut off by a low applied to the base of transistor 280 through resistor 284. Current flow through transistor 280 and the relay coil 260 is thus terminated Diode 286 is provided to dampen the reverse EMF spike generated across relay coil 266 when current therethrough abruptly terminates.

As mentioned above, the control system 10 is capable of dialing numbers either through dial pulses or through dual tone multifrequency signals. Dial pulses are generated by momentarily increasing the impedance between the tip and ring lines. Accordingly, the dial pulse generator 50 includes a single throw relay 290 having a single contact 292 operated by a relay coil 294. When the relay 290 is in the deenergized condition and the off hook relay 36 is in the off hook condition, contact 292 connects the tip line to the ring line through transformer 38. This connection is, of course, a relatively low impedance. When the relay 290 is momentarily deenergized thereby moving the relay contact 292 downwardly, connection between the tip and ring lines through the transformer 38 switches to the substantially higher impedance of the series combination of capacitor 296 and resistor 298.

Current flows through the coil 294 of relay 290 whenever transistor 300 is turned on by a high applied through resistor 302 from the PB1 output of microprocessor 70. The PB1 output of microprocessor 70 thus generates a DIAL PULSE BREAK signal to increase the impedance between the tip and ring lines of the telephone line 22 whenever the signal is high. When the dial pulse break signal is low, transistor 300 is held at cutoff through resistor 304 thereby terminating the flow of current through coil 294. Diode 306 is connected across relay coil 294 to dampen transients generated when current flow through the coil 294 abruptly terminates.

As mentioned above with reference to FIG. 2, a relay 32 is provided to connect the tip and ring lines 20 of the station to either the tip and ring lines of the telephone line 22 or to the control system. The relay circuit 32 includes a dual pole doubles throw relay 310 having a pair of relay contacts 312, 314 and a relay coil 316. The relay 310 is energized by turning on transistor 318 by a high applied to its base through resistor 320 from the PA0 output of microprocessor 70. The PA0 output is thus the local power relay signal which, when high, connects the telephone station lines 20 to the control system 10.

When the LOCAL POWER RELAY signal is low, transistor 318 is held at cut off through resistor 322 thereby connecting the station tip and ring lines directly to the telephone tip and ring lines 22. Diode 324 is, once again, provided to dampen reverse EMF voltages generated across coil 316 when the flow of current therethrough abruptly terminates.

As mentioned earlier with reference to FIG. 2, the CPU 34 can dial utilizing a dual-tone multifrequency generator 52. The dual-tone multifrequency generator 52 consists of a conventional dual-tone multifrequency circuit 330 and a conventional shift register 332. Data designating a particular combination of dual-tone multifrequency dialing tones is loaded into the shift register 332 in a serial data stream applied to the A input of the shift register 332 from the PA6 output of the microprocessor 70. The data is clocked into the shift register 332 by a clock signal applied to the CLK input of the shift register of the 332 from the PB6 output of the microprocessor 70. When all eight bits of the shift register 332 have been loaded, the tone generator circuit 330 generates a dual-tone dialing signal corresponding to the output of the shift register 332. The dialing tone generator circuit 330 is enabled whenever a reset is not being applied to the microprocessor 70. The shift register 332 is cleared by a low applied to its CLR input whenever microprocessor 70 is being reset.

The output of the, tone generator circuit 330 is applied to an amplifier and filter 54 and the output of the amplifier and filter 54 is connected to the transformer 38. The amplifier and filter circuit includes a resistor 340 connecting the input to ground to provide a predetermined load on the dual-tone multifrequency generator 52, and a high pass network formed by resister 342 and capacitor 344 connecting the input to a summing junction of amplifier 346. A negative feedback network of the parallel combination of capacitor 348 and resistor 350 provides a low pass negative feedback network The high pass network of resistor 342 and capacitor 344 coupled with the low pass network of resistor 350 and capacitor 348 provides the operational amplifier 346 with a broad band pass characteristic encompassing the frequency range of the tones generated by the dual tone multifrequency generator 52. The gain of the operational amplifier 346 can be reduced by switching resistor 354 in parallel with resistor 350 by field effect transistor (FET) 356. The lower gain of amplifier 346 is used when a music on hold capability is employed Accordingly, when the gain is to be reduced, a low is generated at the PB6 output of microprocessor 70. This low allows transistor 360 to be held low through resistor 362. Since transistor 360 is thus a cut off, +9 volts is applied to FET 356 through resistor 364 thereby turning on FET 356 and connecting resistor 354 in parallel with resistor 350 When the PB6 output of microprocessor 70 is high, transistor 360 is turned on through resistors 366 and 368 to apply a low to the gate of FET 356 thereby removing resistor 354 from the feedback path across operational amplifier 346.

Capacitor 370 is provided to prevent transistor 360 from turning on by the clock signal applied to the clock input of shift register 332 which is also generated at the PB6 output of microprocessor 70. The output of operational amplifier 346 is applied to transformer 338 through resistor 374 and capacitor 376. The effective impedance of the amplifier and filter 54, as seen by the tip and ring lines through transformer 38, may be increased by disconnecting resistor 378 from resistor 374. Resistor 378 is connected in parallel with resistor 374 by turning on field effect transistor (FET) 380. The effective impedance of amplifier 54 must be increased in the on hook condition since, it will be remembered, the control system is connected across the tip and ring lines through resistor 270 and capacitor 272 rather than through transformer 38. In order to detect the same amplitude of signal on the tip and ring lines on the on hook condition, the impedance of amplifier 54 must be increased. Accordingly, when the off hook relay signal is low in the on hook condition, transistor 390 is cut off through resistor 392. Since transistor 390 is at cut off, the +9 volts is applied through resistor 394 and resistor 396 to the base of transistor 398 thereby causing transistor 398 to apply a low to the gate of the FET 380. This low disconnects resistor 378 from resistor 374 thereby increasing the effective impedance of the amplifier and filter 54.

Dual-tone multifrequency tones transmitted from an external location or from the local station 12 are, as explained above, coupled across the transformer 38 in either the on hook or off hook conditions, although the amplitude of the signals will be substantially higher in the off hook condition since the primary transformer 38 is then connected almost directly across the tip and ring lines. Accordingly, back-to-back Zener diodes 440 are provided to prevent excessive voltages from being generated across the secondary of the transformer 38 in the off hook condition. The signals generated across the secondary of transformer 38 are applied to the low pass filter 40 which consists of an operational amplifier 410 connected in voltage follower configuration with low pass filtering characteristics provided by resistor 412 and capacitors 414, 416. The output of amplifier 410 is biased at +9 volts through resistor 418. The output of low pass filter 40 is applied through resistor 420 and field effect transistor 422 to the summing junction of operational amplifier 424. Resistor 426 in combination with capacitor 428 sets the gain of amplifier 424 and limits the high frequency response. The output of operational amplifier 424 is applied through capacitor 430 to the input of dual-tone multifrequency detector 42. A pair of back-to-back Zener diodes 432, 434 prevent overvoltage signals from damaging dual-tone multifrequency detector 42. When enabled by a high at the output of NOR-gate 200 dual-tone multifrequency detector 42 outputs a four bit digital word on the B4–B7 bits of AD BUS indicative of the particular one of 16 keys on a key pad corresponding to the tones. Dual-tone multifrequency detector 42 also signals the microprocessor 70 of the presence of a valid tone pair by placing a high on microprocessor 70's PA5 input.

Field effect transistor 422 applies the output of low pass filter 40 to amplifier 424 when the voltage on its gate is high as explained above A high at the PB7 output of microprocessor 70 is applied through resistor 440 and resistor 442 to turn on transistor 444 thereby pulling sufficient current through resistor 446 to make the gate to FET 422 low. A high at the PB7 output of microprocessor 70 thus disconnects the output of low pass filter 40 from the dual-tone multifrequency detector 42. Capacitor 448 is provided to prevent the FET 422 from switching responsive to a clock signal which is also generated on the PB7 output of microprocessor 70.

As mentioned above, whenever the control system is in an on hook condition the PB0 ouput of microprocessor 70 is low. This low applied to transistor 390 produces a high at the collector of transistor 390 which turns on field effect transistor (FET) 450. FET 450 then switches resistor 452 parallel with resistor 420 to increase the gain of operational amplifier 424. It is necessary to increase the gain of operational amplifier 424 when the control system is on hook since the signals are coupled to the transformer 38 through capacitor 272 and resistor 270 rather than directly. By increasing the gain of operational amplifier 424 in the on hook condition, the amplitude of the signal output by the operational amplifier 424 is the same in both the on hook and off hook conditions.

The input to operational amplifier 424 also receives a signal through resistor 460 and capacitor 462. As explained in greater detail below, this signal is generated by the dual-tone multifrequency generator in the local station 12 By coupling the output of the dual-tone multifrequency dialing tones from the local station 12, the control system 10 is able to determine the telephone numbers dialed by the local station 12.

The output of the low pass filter 40 is applied to the dual-tone multifrequency detector 42 as explained above to decode dialing tones received from the telephone lines 22 and from the local station 12. Supervisory tones are decoded by a band pass filter 44 and Schmitt trigger 46 as explained above with respect to FIG. 2 The band pass filter 44 includes operational amplifier 470 having its positive input biased at +9 volts Resistor capacitor network formed by resistor 472, resistor 474 and resistor 476 coupled with capacitor 478 and capacitor 480 provide operational amplifier 470 with band pass characteristics in a conventional manner The Schmitt trigger 46 is implemented comparator 490 having positive feedback resistor 492 connected between its output and positive input to provide hysteresis. The output of comparator 490 is pulled high through pull up resistor 494. The output of the comparator 490 is applied to the PA3 input of the microprocessor 70 and is thus the SUPERVISORY TONE DETECT signal. By sampling the supervisory tone detect signal the microprocessor 70 can determine the frequency and cadence of the tone and hence identify the tone.

As explained above with reference to FIG. 2, loop current, supervisory tones and a ringing signal for the local station 12 are generated by a local tone and current generator 60 Loop current is generated through resistor 500 which is applied through the local station tip line 20 through diode 502 Local station loop current is thus through resistor 500, 502, tip line 20, the local station 12, ring line 20 and ground through relay contact 314.

Supervisory tones are generated at the PB2 and PB3 outputs of the microprocessor 70 and they are applied to the inverting input of operational amplifier 510 through a band pass filter network consisting of capacitors 512, 514, 516, 518 and resistors 520, 522, 524, 526 The output of the operational amplifier 510 is biased at 9 volts by the +9 volts applied to the positive input of the amplifier 510. The supervisory tones at the output of the operational amplifier 510 are coupled to the tip line of the local station 12 through capacitor 530, resistor 532, diode 502 and the relay 310. Basically, the band pass filter network connected to operational amplifier 510 converts the square wave outputs from the PB2 and PB3 outputs of the microprocessor 70 into corresponding sine waves.

The local tone and current generator 60 also includes a circuit for applying a ringing signal to the local station 12. +180 volt DC power is applied to the ringing circuit through resistor 540 The fundamental frequency for the ringing circuit is output at the PB5 output of the microprocessor 70 as a 20 Hz local ring signal The local ring signal is applied to transistor 542 through voltage divider resistors 543, 544. A low at the PB6 output of the microprocessor 70 turns off transistor 542 thereby cutting off transistor 545 through resistor 546 connected between the base and emitter of transistor of 544. Since the transistor 545 is now at cut off, the collector of transistor 544 is held at ground through resistor 548, and this ground potential is applied through resistors 550, 552, to the bases of common emitter follower transistors of 545 554, 556. The zero potential on the emitters of transistors 545, 556 is then output through resistor 558 to relay 560. Diodes 562, 564 are provided to protect transistors 554, 556, respectively. Thus, a low at the PB5 output of the microprocessor 70 tends to apply a low to the relay 560.

A high at the PBS output of microprocessor 70 turns on transistor 542 thereby drawing sufficient current through resistor 546 and 568 to turn on transistor 545. Transistor 545 then applies substantially all of the 180 volt DC applied through resistor 540 to the bases of transistors 554, 556 The emitters of these transmitters 554, 556, then output to the relay 560 a relatively high voltage.

In operation, because of the presence of capacitor 570, the bases of transistors 554, 556 do not oscillate between 0 and 180 volt DC. Instead, the filtering effect of capacitor 570 causes the bases to oscillate in a relatively smooth waveform at an average voltage between 0–180 DC. The waveform applied to the relay 560 is thus a relatively high voltage AC sawtooth signal.

The PB4 output of microprocessor 70 is a LOCAL RING RELAY signal that, when high, turns on transistor 590 thereby drawing current through relay coil 594. Relay contact 596 then connects the high frequency AC ringing signal to the tip line 20 through relay 310 A low LOCAL RING RELAY signal allows transistor 590 to be biased at cut off through resistor 598 thereby terminating the flow of current through relay coil 594 and opening relay contact 596 Diode 600 is provided to protect transistor 590 from reverse EMF transients generated when current flow through the coil 594 is abruptly terminated.

As mentioned above with reference to FIG. 2, the control system 10 includes a local currect detector 62 that generates an output indicative of the current between the tip and ring lines 20 of the local station 12. It will be remembered that loop current for the local station 12 is supplied through resistor 500 from the +18 volt output of power supply 92. The +18 volt output of power supply 92 is also connected to the emitter of transistor 610 while the base of transistor 610 is connected to the opposite end of resistor 500 through resistor 612 and Zener diode 614. Thus, when the voltage drop across resistor 500 rises to above the reverse breakdown voltage of Zener diode 614 as the loop current increases, transistor 610 becomes forward biased thereby supplying current through resistor 616 to the base of transistor 618 Transistor 618 then turns on thereby applying a low to the PA2 input of the microprocessor 70. The PA2 input of the microprocessor 70 is thus the LOCAL CURRENT DETECT signal. When the local loop current is relatively low, the voltage across resistor 500 is less than the reverse breakdown voltage of the Zener diode 614. Transistor 610 is then held at cut off through resistor 620 thereby allowing resistor 622 to hold transistor 618 at cut off. A logic level of +5 volts is then applied to the PA2 input of the microprocessor 70 through resistor 624.

It will be recalled from the above discussion of FIG. 1 that the control system 10 includes a panel 16 containing a plurality of light emitting diodes 18. These light emitting diodes are connected to respective stages of a shift register 640 through respective resistors 642. The shift register 640 is loaded in the same manner as shift register 332. Namely, serial data from the PA6 output of the microprocessor is shifted into the shift register by a clock signal at the PB6 output of the microprocessor 70. The shift register 640, like the shift register 332, is cleared whenever a reset signal is applied to the RESET in put of the microprocessor 70. The light emitting diodes 18 are thus selectively illuminated by shifting the proper bits into the shift register 640.

The RAM 144 retains data stored therein only for as long as it is continuously powered Therefore, power for the RAM 144 may be supplied by an internal 9-volt battery 650. However, the RAM 144 is normally powered from the +5 volt output of the power supply 92 through diode 652. When the power supply 92 is deenergized, the +9 volts from the battery 650 is dropped to approximately 5 volts by Zener diode 654 to also apply 5 volts to the DC input of RAM 144. Under these circumstances, diode 652 isolates the battery 650 from the power supply 92.

In order to insure that the 9-volt battery 650 is replaced before it has become worn, the voltage from the battery 650 is monitored by a voltage monitoring circuit. The battery voltage is applied across resistor 658 to the negative input of comparator 660 through resistor 662. A reference voltage generated from the +18 volt output of power supply 92 by voltage divider resistor 664, 668 is connected to the positive input of the comparator 660. When the voltage from batteries 650 is greater than the reference voltage, the output of the comparator 660 floats, thereby allowing a low to be applied to the PA6 input of microprocessor 70 through resistor 670. When the voltage across the battery 650 falls below the reference voltage, the output of comparator 660 goes high, and this high is applied thorugh resistor 672 to the PA6 input of the microprocessor 70.

As mentioned above, the microprocessor 70 operates in accordance with the program of instructions stored in the read only memory (ROM) 140. A flow chart for this program is illustrated in FIGS. 4–38.

An index of the software controlling the operation of the CPU 34 is illustrated in FIG. 4. The software includes 18 main tasks that are sequentially executed. Each of these tasks is explained in respective FIGS. 5–23.

The software also includes 13 interrupt tasks that are explained in respective FIGS. 24-36. At predetermined time intervals the task jumps from a main task to one of the timer interrupt tasks and then executes the timer interrupt task. The software also includes a hardware interrupt task illustrated in FIG. 37. Like the timer interrupt tasks, an interrupt causes the execution of a main task and causes a jump to the interrput task to occur. In the hardware task, however, the interrupt occurs because of a signal produced by the circuitry rather than at a predetermined time. Finally, the software includes a dialing task illustrated in FIG. 38.

Figure 5:
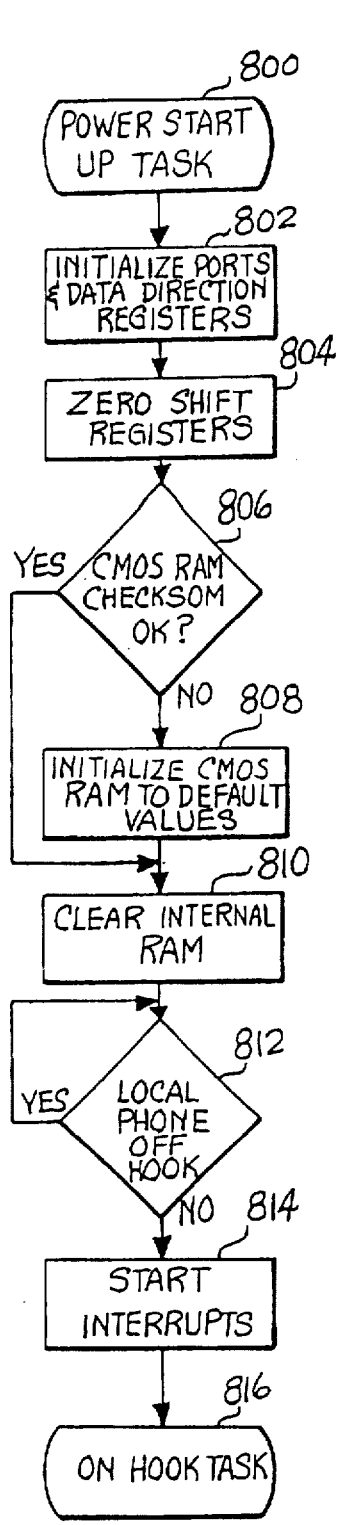

The power start-up task illustrated in FIG. 5 is initially executed when power is applied to the telephone control system. The task is entered at 800 and the various I/O ports and registers of the microprocessor 70 (FIG. 3) are initialized at 802 in a conventional manner. The shift registers 332, 640 (FIG. 3) are then cleared at 804 by generating a low at the RESET output of the microprocessor 70 as explained above with reference to FIG. 3 At 806, the random access memory 144 is checked for operability This checking is accomplished by writing two bytes of known data into the RAM and them attempting to read those two bits from the RAM and checking for a match. If there is not a match, then it is likely that the data that was previously written into the RAM 144 has been erased such as would result from a power failure. For this reason predetermined data is written into the RAM 144 at 808 so that the RAM is initialized with known data. If, however, the previously written bytes are still present in RAM, the task branches directly to 810 where a random access memory internal to microprocessor 70 is cleared The power start-up task then checks 812 to determine if the local telephone station is off-hook This is accomplished by sampling the output of the local current detector 62 through the PA2 I/O port of the microprocessor 70 (FIG. 3). If the local telephone is off-hook, the task remains at 812. This prevents loss of a call in progress during a power failure If the local telephone is not off-hook, the interrupt timers are started at 814 so that a timer interrupt task will occur at the proper time. The task then progresses to the on-hook task at 816.

Figure 6:
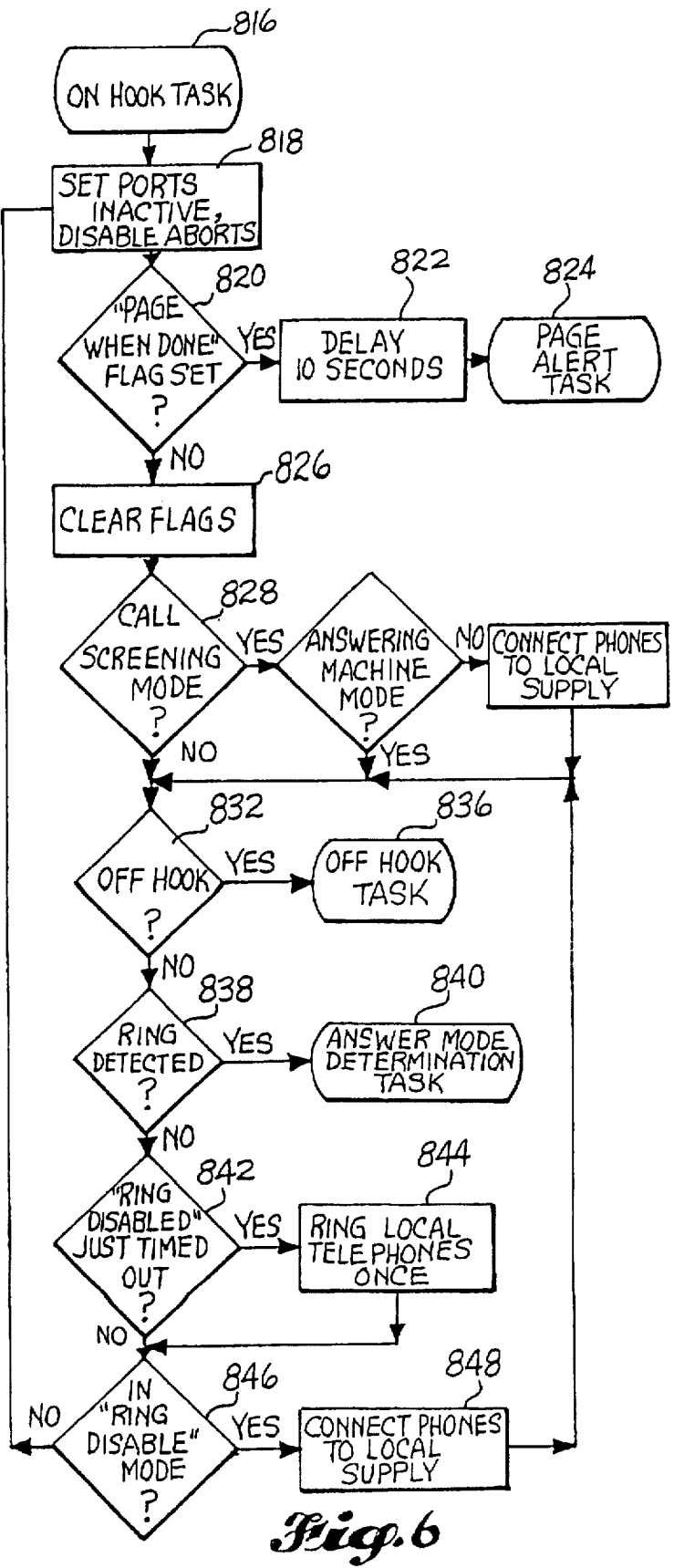

The on-hook task illustrated in FIG. 6, performs the various functions required when the local telephone station goes on-hook. The I/O ports of the microprocessor are made inactive and "aborts" are disabled at 818. The "aborts" if enabled, cause an immediate return from an interrupt task to the on-hook task regardless of what task is being executed when the interrupt occurred At 820, the task determines whether a "PAGE WHEN DONE" flag is set. It is this feature that allows a pager to be alerted a predetermined period after a call has been received Thus, if the "PAGE WHEN DONE" flag has been set, at the conclusion of a call to the local station, the task branches to 822 to implement a 10-second delay and the page alert task is then called at 824 to cause the telephone number of the pager to be dialed. If the "PAGE WHEN DONE" flag has not been set, the task branches to 826 where all call processing flags such as the "GENERATE DIAL TONE," "AUTO RETRY," "HOLD," etc. flags are cleared.

A determination is made at 828 if the call screening code is being implemented. If the call screening mode is enabled, a determination is made at 830 if the answering machine mode has been selected If either the call screening mode has not been selected or both the call screening mode and the answering machine mode have been selected, the task branches to 832. If the call screening mode has been selected, but the answering machine mode has not been selected, the local station is first connected to the local supply at 834 by energizing relay 32 (FIG. 32). This prevents the individual at the local station from hearing the ringing of an incoming call until the caller has entered a valid access code.

A check is then made at 832 to determine if the local telephone station is off-hook. If the station has gone off-hook, a jump to the off-hook task occurs through 836. Otherwise, the status of the ring detector 33 (FIG. 2) is checked at 838. If a ring indicative of an incoming call is detected, a jump to the answer mode determination task occurs through 840 in order to answer the incoming call.

If an incoming call is not being received, the status of a "ring disable" timer is checked at 842 to determine if the timer has timed out. If so, a ringing signal is applied from the local tone and current generator 60 (FIG. 2) to the local telephone station at 844 to inform the user that calls will henceforth cause the local telephone station to ring. If the "ring disable" mode has not recently terminated, a check is made at 846 to determine if the control system is still in the ring disable mode. This check is made because a finding that the "ring disable" mode has not recently terminated could mean either that the control system is still in the "ring disable" mode or that it has been out of this mode for a substantial period of time. If the control system is not in the "ring disable" mode, the task branches to 818. If the control system is in the "ring disable" mode, the telephone station is connected to the local tone and current generator 60 at 848 by energizing relay 32.

Figure 7:
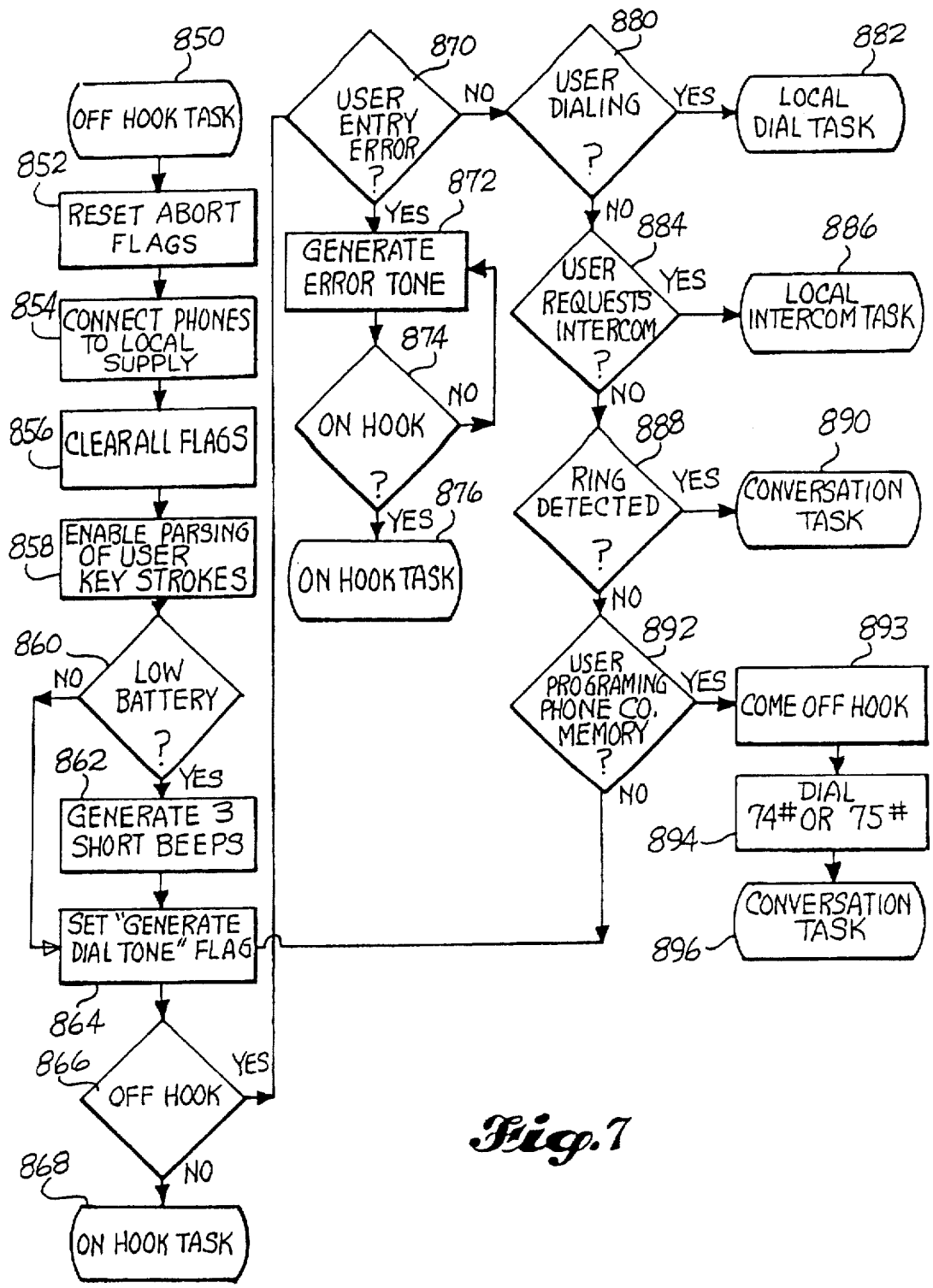

The off-hook task called at 840 is entered at 850 as illustrated in FIG. 7. The aborts are immediately disabled at 852 so that an immediate return from an interrupt to the on-hook task will not occur. The local telephone station is then connected to the local tone and current generator 60 at 854 as explained above and all processing flags are cleared at 856. A flag is then set at 858 that allows a "parser" subtask to accept valid dialing inputs as explained in greater detail below. The internal battery 650 (FIG. 3) is then checked at 860 by examining the PA6 I/O port of the microprocessor 70. If the battery voltage is below a predetermined value, the microprocessor 70 causes three short tones to be generated on the local telephone station at 862 before setting a "GENERATE DIAL TONE" flag at 864. The three short tones alert the user to the low battery condition, so that he may install a new battery at his earliest convenience. If the battery voltage is above the predetermined value, the "GENERATE DIAL TONE" flag is set at 864 without generating the three short tones at 862. The "GENERATE DIAL TONE" flag is recognized by the local tone generation subtask as explained in more detail below with reference to FIG. 32, causing dial tone to be produced by local tone and current generator 60 and connected to local station 12 through relay 32. The task then determines at 866 if the local station is still off-hook. If not, the task branches to the on-hook task 868 and this task is then executed as explained above with reference to FIG. 6.

If the local telephone station is off-hook, the task branches from 866 to 870 where a determination is made whether or not there has been a user entry error. As explained below, a user entry error is detected and indicated in a "parser" subtask If there has been a user entry error, an error tone is generated at 872 and the on-hook condition of the local station is examined at 874. If the local station is not on-hook, the error tone is once again generated at 872. Otherwise, the task jumps to the on-hook task illustrated in FIG. 6 through 876.

If no user entry error has been found at 870, the task branches to 880 where a determination is made as to whether the user is dialing a telephone number. Once again, this determination is made in the "parser" task explained below. If the user is found to be dialing a number on the local station at 880, the task branches to a local dial task through 882. This local dial task is explained in detail below with reference to FIG. 8.

In the event that the user is not dialing a number on the local station, the task determines at 884 whether the user is requesting use of the intercom. Once again, a request for the intercom is indicated by the "parser" task. If the user is requesting the intercom, the program branches through 886 to a local intercom task explained below with reference to FIG. 10.

If the user is not found to be dialing a number at 880, nor performing an intercom function at 884, the output of the ring detector 33 (FIG. 2) is checked at 888. If a ring indicative of an incoming call is detected at 888, a conversation task is called at 890 and executed as explained below with reference to FIG. 11.

Finally, the program determines at 892 if the user is programming the phone company's speed dialing numbers. If so, the off-hook relay 36 (FIG. 2) is energized at 893 to connect the control system to the telephone trunk tip and ring lines. The microprocessor then dials "74 #" or "75 #" at 894 which are decoded by the central office. The 74 # and 75 # sequence are commonly used prefixes for storing speed dialing numbers in the phone company central office. The program then calls the conversation task through 896. If the task determines at 892 that the user is not performing a programming function, the task branches to 864 where the "GENERATE DIAL TONE" flag is set as explained above.

Figure 8:
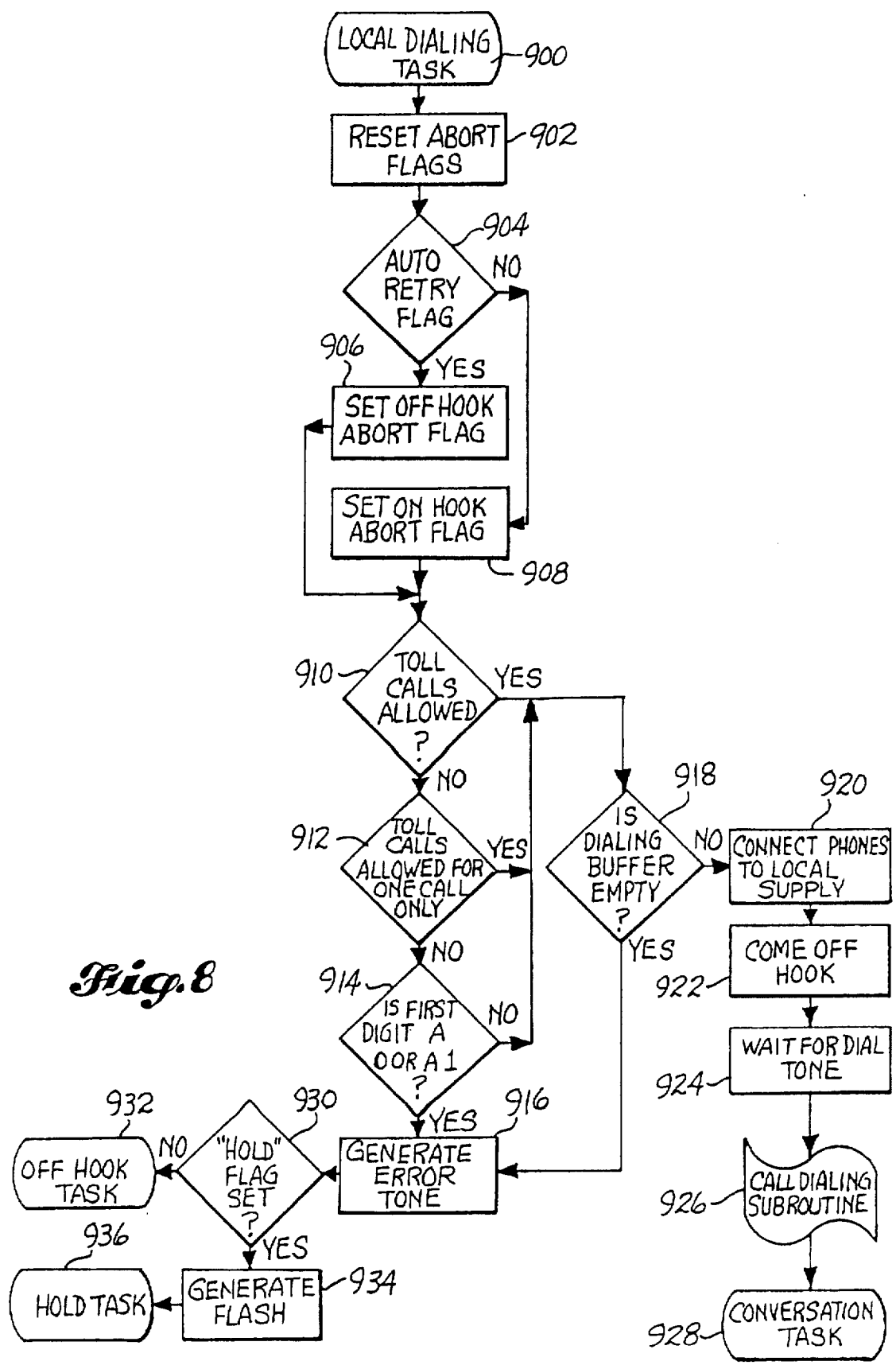

The local dialing task illustrated in FIG. 8 is entered at 900. The aborts are disabled at 902 and the "AUTO RETRY" flag is checked at 904. As explained below, the "AUTO RETRY" flag is set when the user requests that a busy or unanswered telephone number be periodically redialed. If the "AUTO,RETRY" flag has been set, the off-hook abort flag is set at 906 The setting of the off-hook abort flag being detected in the interrupt tasks as explained below causes the retry attempt to terminate in the event that the local station goes off-hook. An off-hook condition terminates the retry since the user is then electing to manually dial a number rather than allowing the control system to periodically dial the busy or unanswered number. If it is determined at 904 that the auto retry flag has not been set, the on-hook abort flag is set at 908 so that the program will return to the on-hook task illustrated in FIG. 6 in the event that the local station goes on-hook.

The local dialing task then checks at 910 to determine if the control system has been programmed to accept toll calls, i.e., telephone numbers beginning with a "1" or a "0". If not, the task checks at 912 to determine if the control system has been programmed to allow a single telephone number beginning with a "1" or a "0" to be dialed. If the control system has not been programmed to allow either one or more toll calls to be dialed, the program checks at 914 to determine if a toll call is being dialed and, if so, generates an error tone through the local tone and current generator 60 (FIG. 2) to inform the user that an improper number is being dialed. If toll calls are allowed either generally as determined at 910 or for a single call as determined at 912 or if the telephone number does not begin with a "0" or a "1" as determined at 914, the task progresses to 918 where the contents of the dialing buffer is checked. The dialing buffer stores the telephone number to be dialed and, if no number is stored in a selected location of RAM, the error tone is generated at 916. Otherwise, the local station i s connected to the local tone and current generator 60 (FIG. 2) at 920. At 922, the control system comes off-hook by energizing the off-hook relay 36 (FIG. 2) and then waits for a dial tone at 924. When the dialing tone is detected from the Schmitt trigger 46, the dialing task is called at 926 in order to dial the selected number. The conversation task is then entered through 928 to allow a conversation with the dialed number.

After the error tone is generated at 916, the status of the "HOLD" flag is checked at 930. As explained below, the "hold" flag is set when the telephone station is on hold. If the "HOLD" flag has not been set, the off-hook task is called through 932 to place the local station off-hook. If the "HOLD" flag has been set, a hook flash is generated at 934 to inform the user that toll call restrictions prevent the user from conducting a specific conference call. Insofar as the task determined at 930 that the "HOLD" flag was set, the hold task is then entered at 936.

Figure 9A:
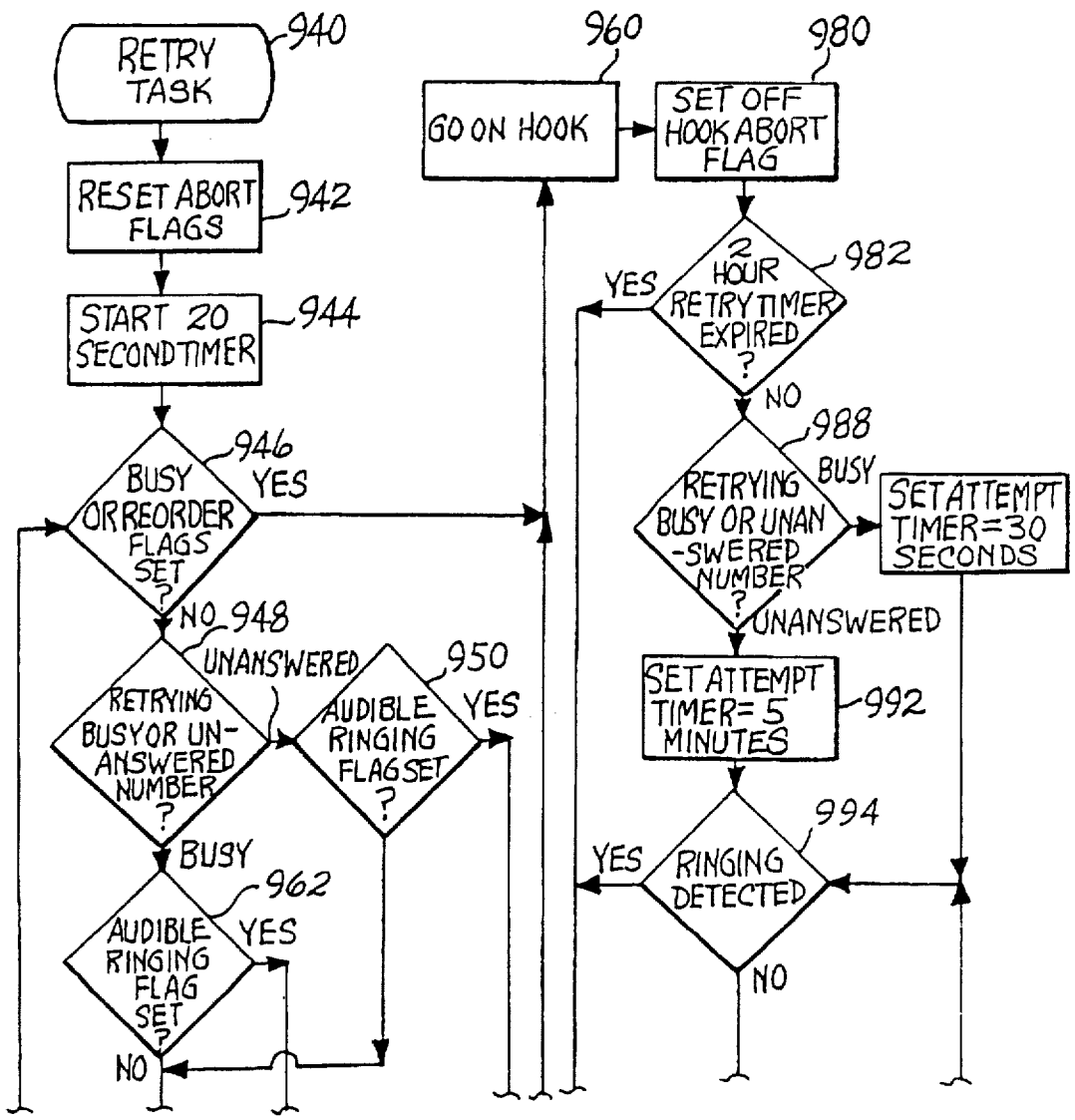
Figure 9B:
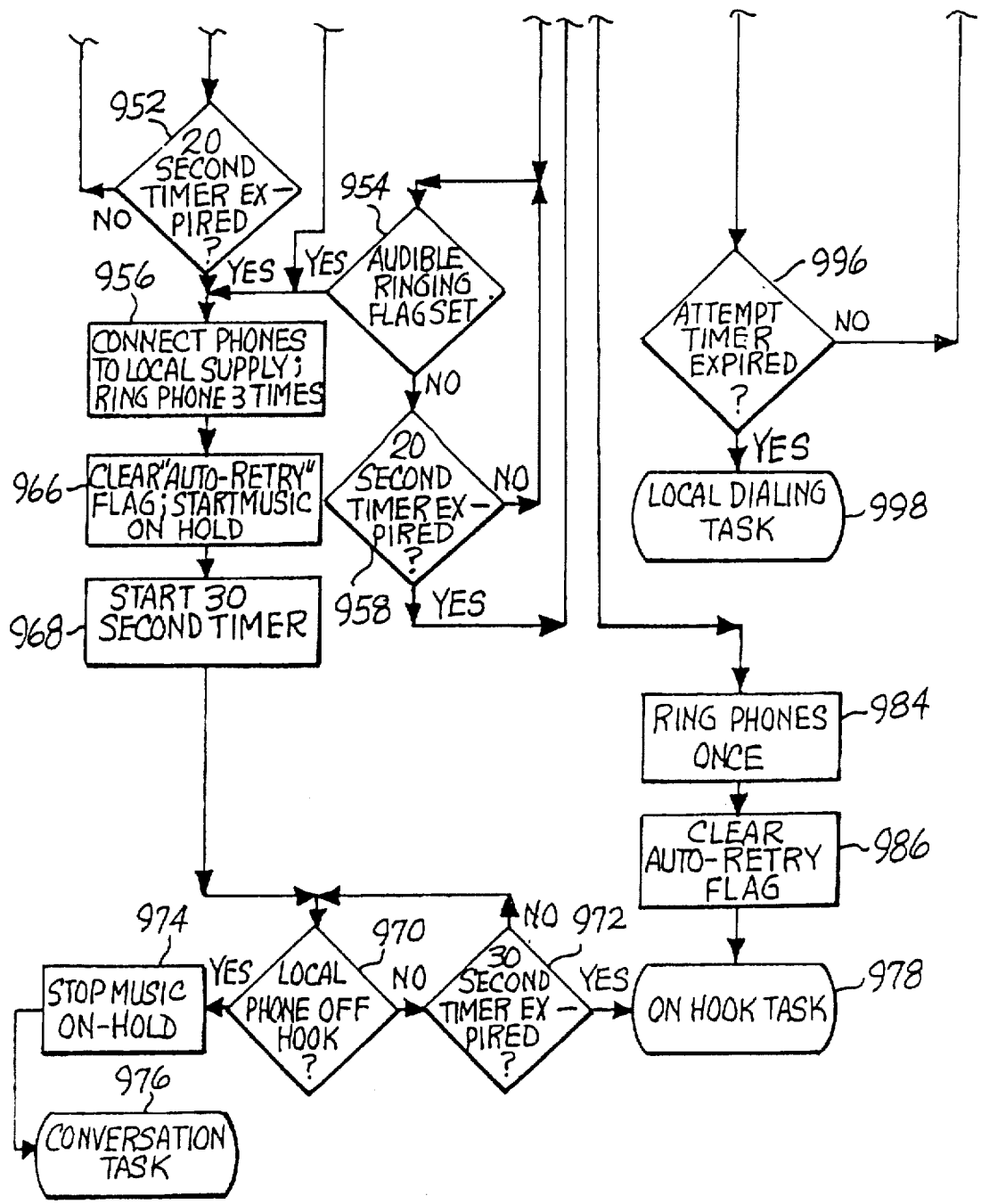

The retry task, illustrated in FIG. 9, is entered at 940. The abort flags are reset at 942 and a 20-second timer is started at 944 The 20-second timer, which is internal to the CPU 34, determines how long a busy or ringing signal is detected in the redial of a previously busy or ringing station. If 20 seconds elapse in which the called station is still busy or ringing, then a retry occurs. At 946, the task determines whether a "BUSY" flag or a "REORDER" flag has been previously set. As explained below, the "BUSY" flag is set when a busy signal is detected and received The "REORDER" flag is set when a reorder tone (also known as a trunk busy tone) is detected in the supervisory tone detection task explained below. At 948, the task determines whether the telephone number that is being retried was previously busy or unanswered. If the number was previously unanswered, i.e., continuously ringing, the status of the "AUDIBLE RINGING" flag is checked at 950. As explained below with reference to the supervisory tone detection subtask, the "AUDIBLE RINGING" flag is set whenever the Schmitt trigger 46 detects an an audible ringing signal on the telephone trunk lines 22. If the "AUDIBLE RINGING" flag is not set, the task progresses to 952 where a determination is made as to whether the 20 second timer has expired If not, the program returns to 946 to repeat the above-described procedure. If it is determined at 950 that the "AUDIBLE RINGING" flag is set, the task progresses to 954 where the status of the "AUDIBLE RINGING" flag is again checked. If the flag is not set thereby indicating that audible ringing has terminated, the task progresses to 956. Otherwise, the status of the 20-second timer is checked at 958 and if the timer has not expired, the task loops through 954 to wait for the audible ringing determination. If the audible ringing does terminated the called station must have answered since an audible ringing was previously detected and is now no longer detected If the 20-second timer expires as detected at 958, the local telephone station goes on-hook at 960 by de-energizing the off-hook relay 36 (FIG. 2).

Returning now, to step 948, if the called station was previously busy, the "AUDIBLE RINGING" flag is checked at 962. If the flag is set thereby indicating that the called station was previously busy but is now ringing, the retry is considered successful and the task progresses to 956. If the "AUDIBLE RINGING" flag has not been set, the called station is still considered to be busy, and the 20-second timer is then checked at 952.

As mentioned above, if the task has progressed to 956, the retry must have been successful in that either a previously busy station is now ringing or a previously ringing unanswered station has now stopped ringing. The task thus connects the local station to the local tone and current generator 60 (FIG. 2) and the CPU 34 causes the local station to ring three times at 956 At 966, the "AUDIO RETRY" flag if reset and the "MUSIC ON HOLD" flag is set so the called party is placed on hold and the local station rings. A 30-second timer internal to the CPU 34 is then started at 968. At 970, the off-hook condition of the local station is checked by monitoring the output of the local current detector 62. If the local station has not gone off-hook, the task checks to see if the 30-second timer has expired at 972. The task thus remains in the 970, 972 loop until either the local station has gone off-hook or the 30-second timer expires. In the event that the local station goes off-hook during this 30-second period, the music on hold function is terminated at 974 and the conversation task is called at 976. If the local telephone station does not go off-hook during the 30-second period, the task progresses from 972 to 978 where the on-hook task is called thereby placing the local station on-hook.

As mentioned above, the retry task progresses to 960 if either the "BUSY" or "REORDER" flags have been found to be set at 946 or the 20-second timer expires in which audible ringing is still present as determined at 958. Thus, progression to step 960 is an indication of an unsuccessful retry in which the station is still busy or is ringing but still unanswered. The local station is first placed on-hook at 960 by de-energizing the off-hook relay 36 (FIG. 2). The "OFF-HOOK ABORT" flag is then set at 980. At 982, the task determines how long the control system has been retrying the called station. If the retry attempt has occured for more than two hours, a single ring signal is applied to the local station at 984, and the "AUTO RETRY" flag is cleared at 986 so that additional retries are not attempted. The on-hook task is then called at 978 to place the control system on-hook.

In the event that the retry period has not reached two hours, a determination is made at 988 whether the called station was originally busy or whether it was unanswered If the called station was originally busy, an attempt timer internal to the CPU 34 is set for 30 seconds at 990. If the called station was unanswered, the attempt timer is set for 5 minutes at 992. In either case, the output of ring detector 33 is then checked at 994 and, if ringing is present, indicating the occurrence of an incoming call, then the task progresses to 984 as explained above. If the ring detector 33 is not detecting ringing, the attempt timer status is checked at 996 and, if the attempt timer has not expired, the task remains in a loop through 994 and 996 until either the attempt timer expires or ringing is detected In the event that the attempt timer expires before audible ringing is detected, the task calls the local dialing task at 998, to begin a new attempt.

Figure 10:
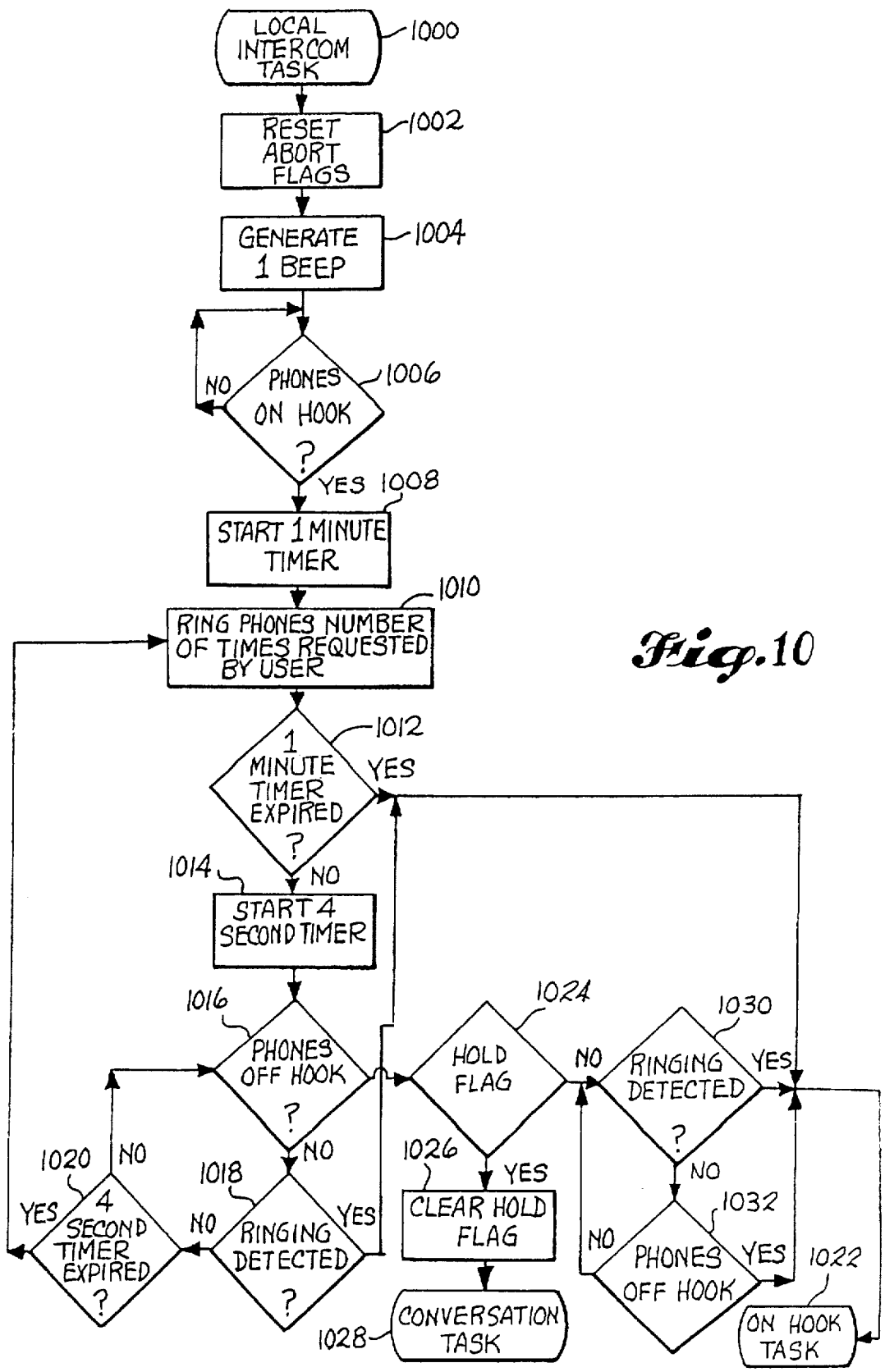

The local intercom task, as illustrated in FIG. 10, is entered at 1,000. The "ABORT" flags are reset at 1002 and a single tone is generated in the local telephone station at 1004 thereby informing the user that the local station should go on-hook. The task remains in a loop at 1006 until the local station goes on-hook at which point a one minute timer is started at 1008. The one-minute timer sets the duration of the local intercom task in which local intercomming occurs. The local telephone stations are then rung by generating a ringing signal from the local tone and current generator 60 (FIG. 2) at 1010. The one-minute timer is then checked at 1012 and, if the timer has not expired, a 4-second timer internal to the CPU 34 is started at 1014. At 1016, the task determines if the local station is off-hook by examining the output of the local current detector 62 (FIG. 2).

If the local station has not gone off-hook, the task checks the output of the ring detector 33 at 1018 to determine if an incoming call is being received. If not, the 4-second timer is checked at 1020. If the 4-second timer is not expired, the task remains in a loop of steps 1016, 1018, 1020. At the expiration of the 4-second period, the task returns to 1010 where the local stations are once again rung a predetermined number of times. This loop will continuously repeat until either the expiration of the one-minute timer is detected at 112 or an incoming call is detected at 1018, at which point the on-hook task is called at 1022. The local intercom task can also exit the loop if the local station goes off-hook as detected at 1016. Under these circumstances, the "HOLD" flag is checked at 1024 to determine if an incoming call has been placed on hold, which commonly occurs when the local intercom feature is used to inform a user that an incoming call is designated for him. If the "HOLD" flag has been set, the "HOLD" flag is cleared at 1026 and the conversation task is called at 1028 to initiate the telephone conversation. If the "HOLD" flag has not been set, the output of the ring detector 33 is checked at 1030 and, if an incoming call is being received, the on-hook task is called at 1022. If ringing is not detected, the output of the local current detector is checked at 1032 to determine if the local station is on-hook. If the local station is not on-hook, the task remains in a loop composed of steps 1030, 1032 until either an incoming call is received or the local station goes on-hook. When it is finally determined at 1032 that the local station has gone on-hook, the on-hook task is called through 1022.

Figure 11A:
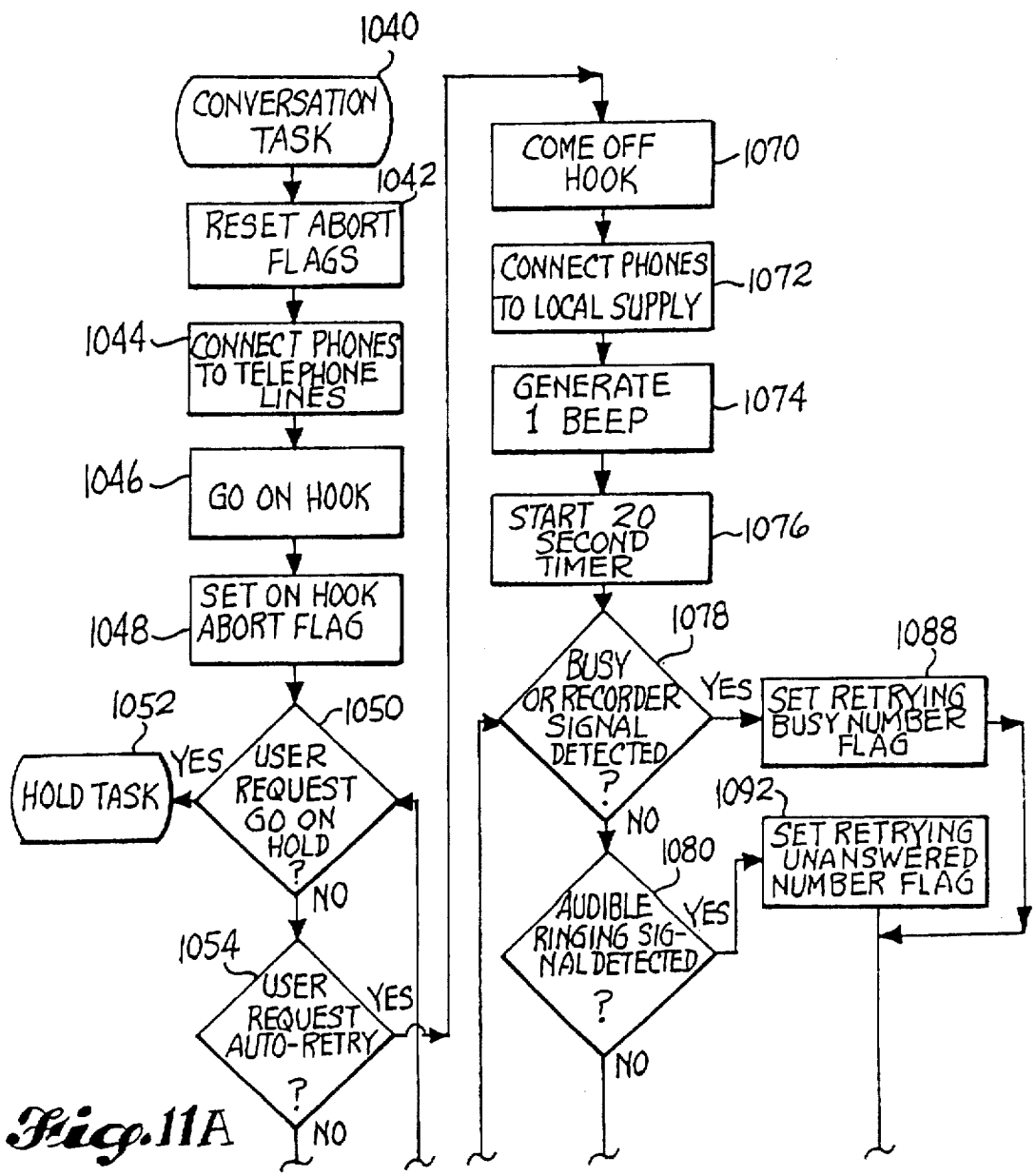
Figure 11B:
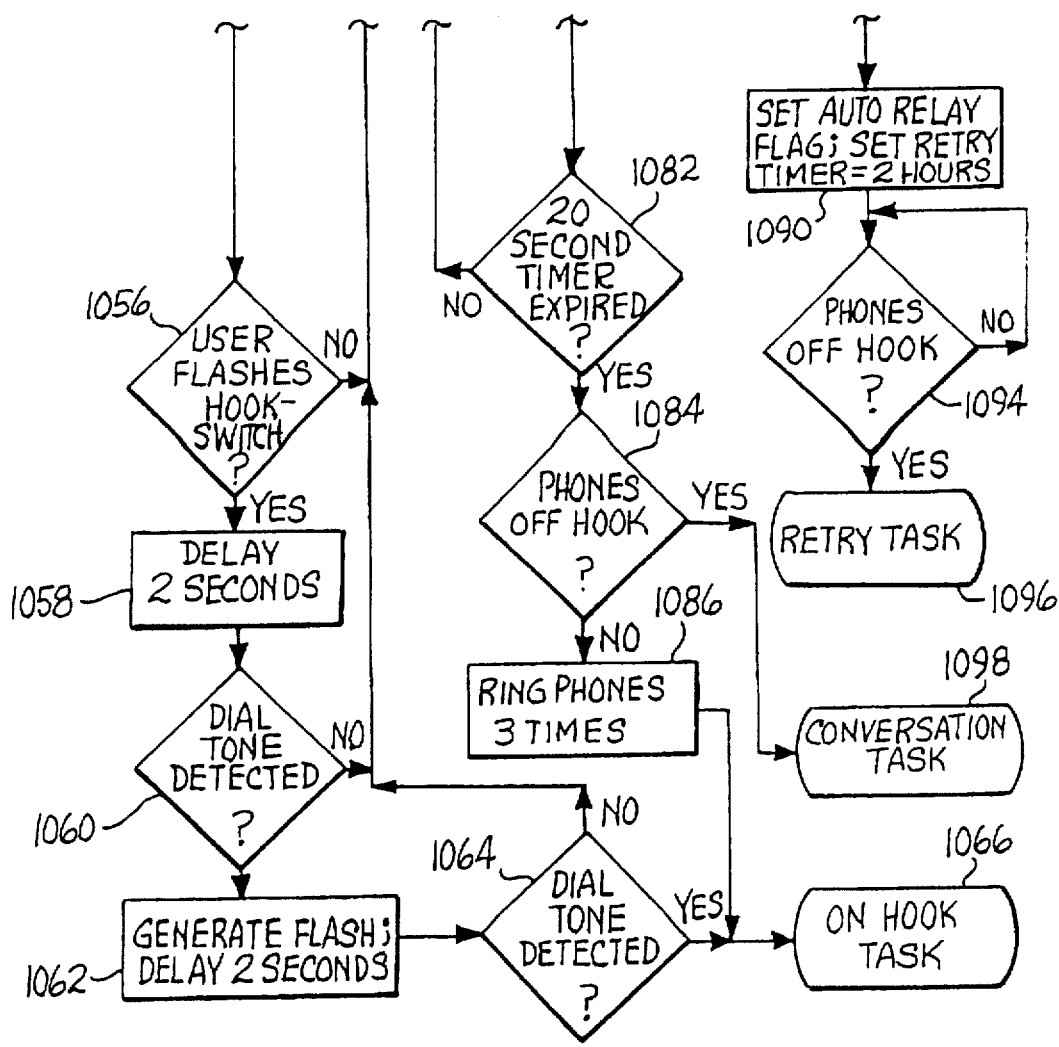

FIG. 11 is a schematic of the conversation task which is entered at 1040. As with the above-described task, the "ABORT" flags are initially reset at 1042. The local station is then connected to the telephone trunk task, the "ABORT" flags are intially reset at 1042. The local station is then connected to the telephone lines at 1044. This function is accomplished by de-energizing relay 32 by an output from the CPU 34. At 1046, the control system goes on-hook by de-energizing the off-hook relay 36. At this time, the control system has effectively removed from the telephone line since the telephone lines are now connected to the local station. The "ON-HOOK ABORT" flag is then set at 1048. At 1050, the task determines whether the user has requested to go on hold. If so, the hold task is called through 1052. Otherwise, the task determines at 1054 whether the user is requesting an auto retry of a busy or unanswered station If the user is not requesting an auto retry, the task determines at 1056 whether the user is flashing the hook switch by examining the output of the local current detector 62. If the user is, in fact, flashing the hook switch, a two second delay is implemented at 1058. If the user had flashed because a central office CALL WAITING tone had been heard, then the flash causes the first calling station to be placed on hold at the central office and the user connected through to the second caller. If the user had flashed to obtain a second dial tone from the phone company, then the control unit will detect and prevent this from occurring as explained below. The control unit prevents the user from obtaining central office second dial tone since the control unit itself produces a second dial tone. The task checks for a dial tone at 1060 and a hook flash is generated at 1062 to retrieve the previously held call from the central office If a dial tone is once again detected at 1064, the on-hook task is called at 1066 since the previously held call has apparently gone on-hook thereby generating a dial tone.

If the user is not flashing the hook switch or if the user is flashing the hook switch but no dial tone is received or a held party subsequently goes on-hook, the task returns to 1050 and repeats the above-described steps.

In the event that the user is requesting the auto retry of a busy or unanswered number as detected at 1054, the task branches to 1070 where the control system comes off-hook by energizing the off-hook relay 36 (FIG. 2). The local station is then connected to the local tone and current generator 60 at 1072 by energizing relay 32. The CPU 34 then causes the local tone and current generator 60 to generate a single tone at 1074 to inform the user that he should hang up After a 20-second timer is started at 1076, the task checks at 1078 for the presence of a busy or re-order signal at the output of Schmitt trigger 46. If neither a busy nor a reorder signal is detected, the task checks at 1080 for an audible ringing signal and, if no such signal is detected, checks at 1082 to determine if the 20-second timer has expired. If not, the task returns to 1078. At the expiration of the 20-second timer, a check is made at 1084 to determine if the local station is off-hook If not, three rings are applied to the local stations at 1086 signifying the failure of auto-retry to detect the busy or ringing condition, and the on-hook task is called at 1066.

If either a busy signal or a reorder signal is detected at 1078, a "RETRYING BUSY NUMBER" flag is set at 1088 and the "AUTO RETRY" flag is set at 1090. At 1090, a retry timer is also set for two hours. If a ringing signal, rather than a busy or reorder signal is detected, a "RETRYING UNANSWERED NUMBER" flag is set at 1092 before the "AUTO RETRY" flag is set and the retry timer is set for two hours at 1090. The task then remains in a loop at 1094 until the local station goes on-hook at which time the retry task is called at 1096. In the event that the local station is found to be off-hook at 1084, the conversation task is recalled at 1098.

Figure 12A:
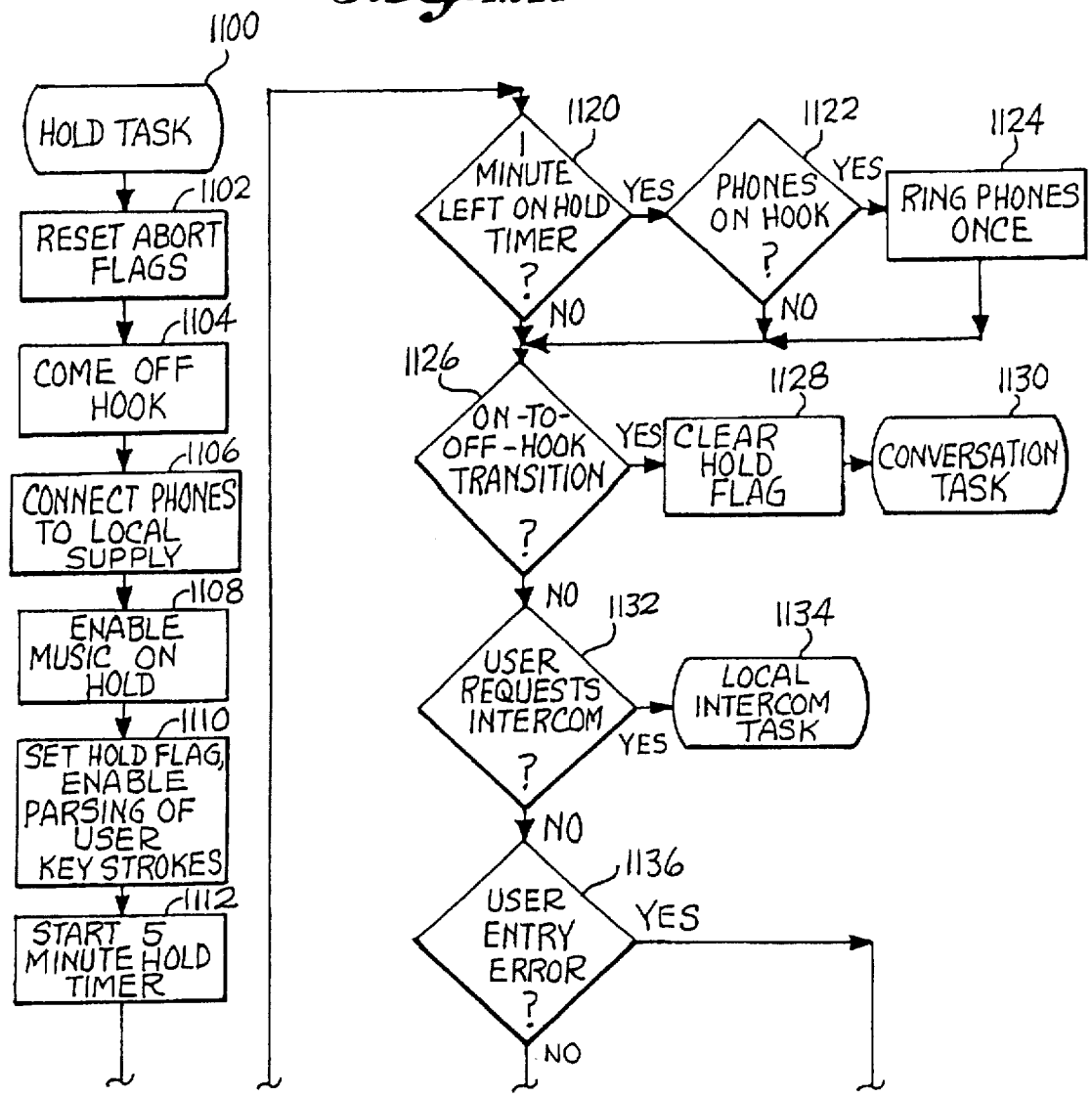
Figure 12B:
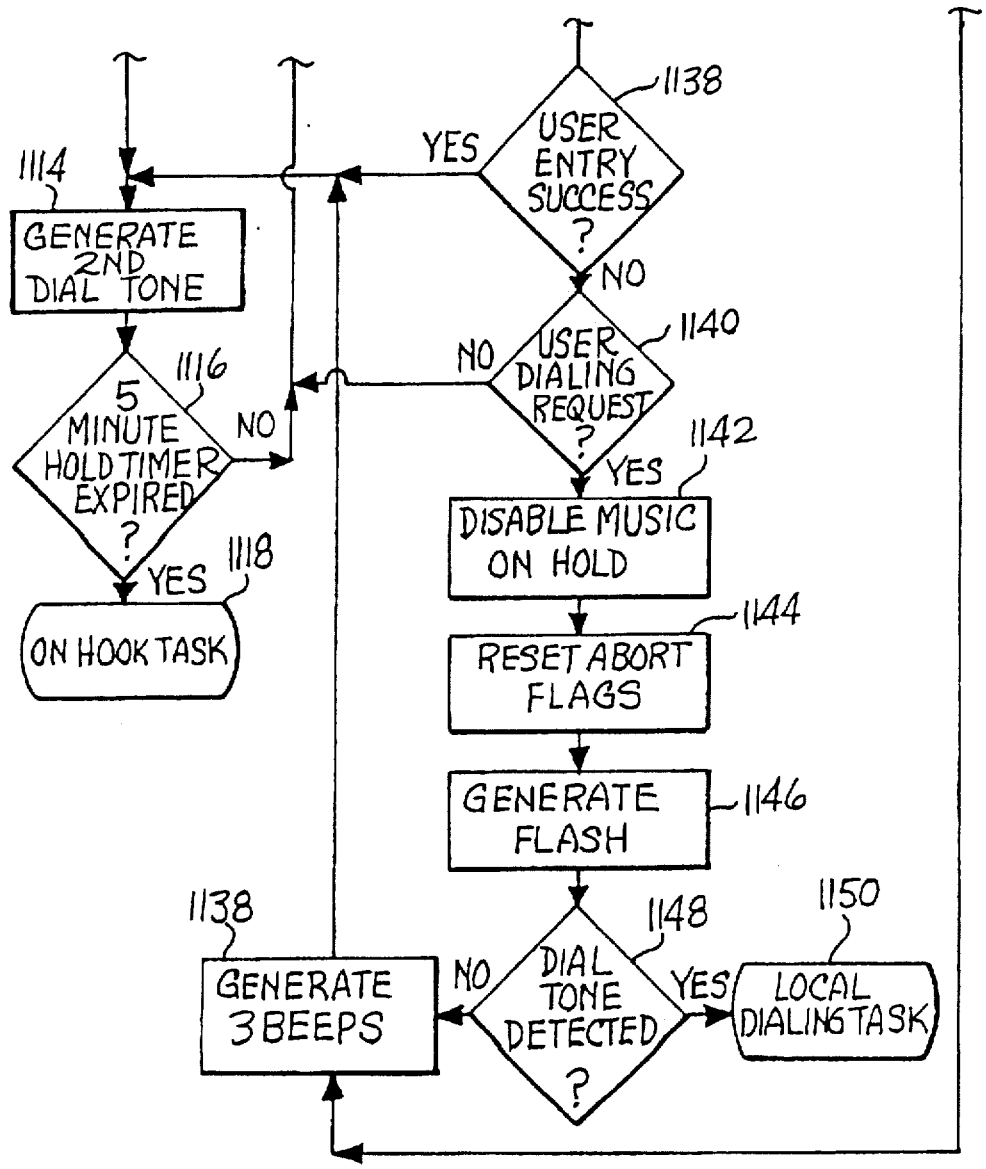

The hold task, illustrated in FIG. 12, is entered at 1100. The "ABORT" flags are reset at 1102 and the local station comes off-hook by energizing the off-hook relay 36 at 1104 thus placing the distant party on hold. The local station is then connected to the telephone lines by de-energizing relay 32 at 1106. At 1108, musical tones are generated by the dual-tone multifrequency generator 52 and applied to the tip and ring lines of the telephone trunk and local station so that the distant party will hear music while being "on hold." The hold task causes the user to hear a second dial tone generated by the control unit and allows the user to access the advanced features of the control unit. The "HOLD" flag is then set at 1110 and the "KEY STROKE PARSING" flag is set to allow dialing to occur. A 5-minute hold timer is started at 1112 to terminate the hold after five minutes, and a second dial tone is generated at 1114 to allow the user to dial a third party for conference calls or access other advanced features. The 5-minute hold timer is then checked at 1116 and if the hold timer has expired, the on-hook task is called at 1118.

If the hold timer has not expired, the hold task checks at 1120 to determine if there is less than one minute left before expiration of the hold timer. If so, a check is made at 1122 to determine if the local station is on-hook and, if so, a single ring is applied to the local station at 1124. These steps 1120–1124 thus remind the user that a call is being held just prior to the expiration of the hold timer.

The hold task than progresses to 1126 where an on-to-off hook transition is detected thus indicating that the local station has come off hold. If this on-to-off hook transition is detected the "HOLD" flag is cleared at 128 and the conversation task is called at 1130 to once again initiate a conversation between the local station and the distant party.

If the local station is still on-hook, the task determines at 1132 whether the user is requesting the intercom function. If so, the local intercom task is called at 1134. Otherwise, the task determines at 1136 whether the user has committed an entry error as explained in greater detail below. If an entry error has been committed, the local tone and current generator 60 generates three error beeps at 1138 and the task then progresses to 1114 as explained above. If no user entry error has been committed and the user entry has instead been successful, the task also branches to 1114 through 1138. If the user has not committed an entry error, but has nevertheless not successfully completed dialing a number, a request for user dialing is checked at 1140. If the user is not requesting dialing, the task returns to 1120. If, however, the user is requesting dialing to initiate a three-way conference call, the music on hold function is disabled at 1142, the "ABORT" flags are reset at 1144, a hook flash is generated at 1146 by momentarily de-energizing relay 36 in order to obtain a second dial tone from the central office and, when the second dial tone is detected at 1148, the local dialing task is called at 1150. If the local dial tone is not detected at 1148, three error beeps are generated at 1138 before progressing to 1114.

Figure 13A:
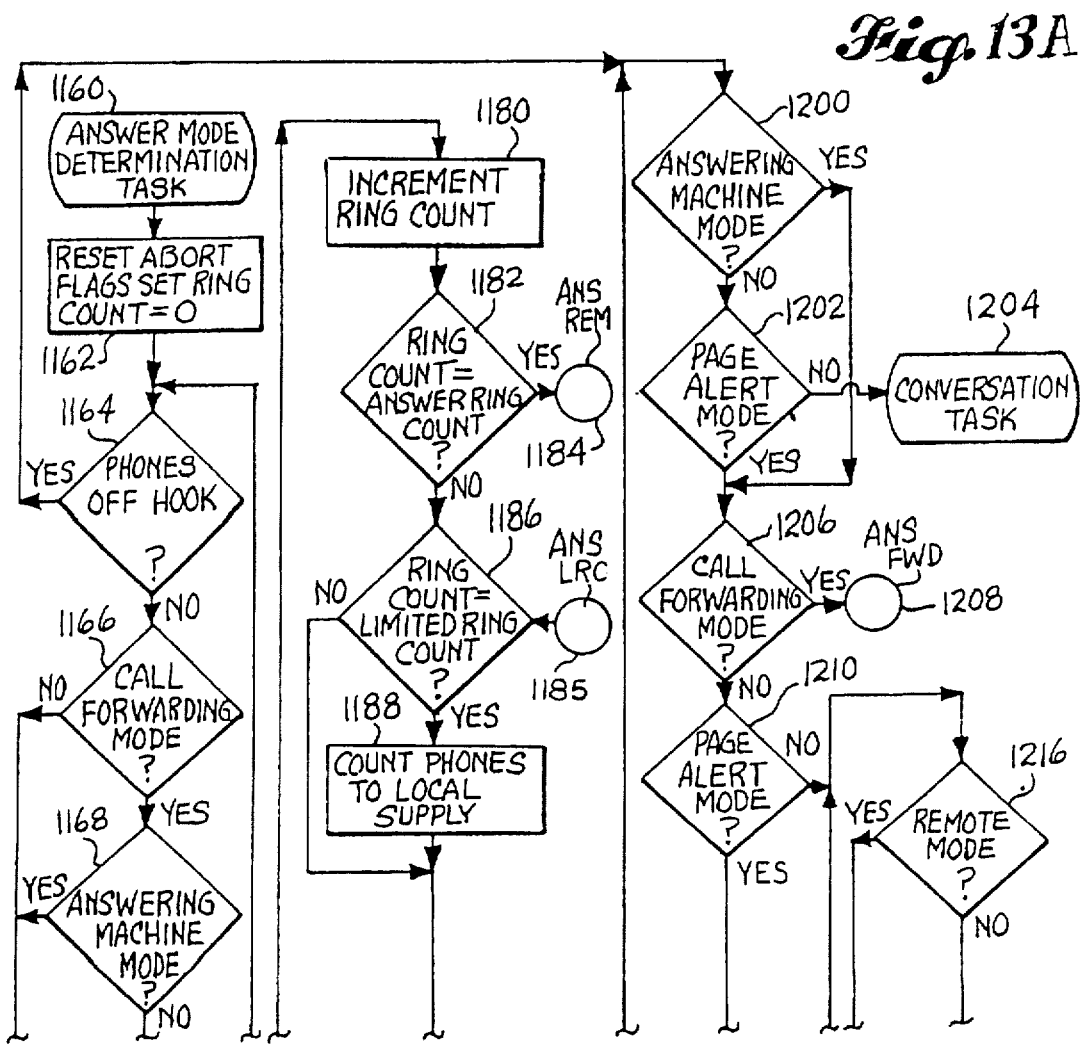
Figure 13B:
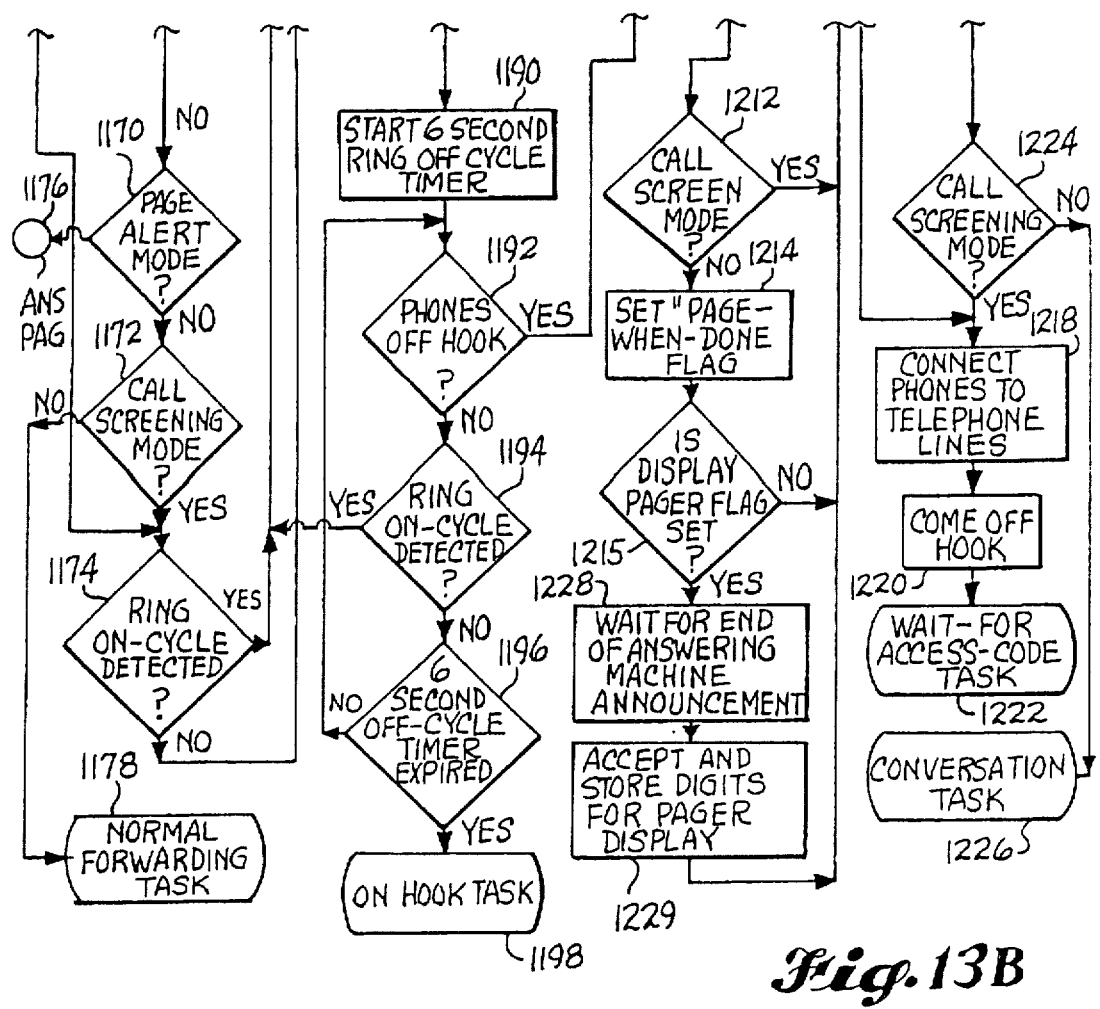

The answer mode determination task, illustrated in FIG. 13, determines the operating mode used to answer incoming calls. The talk is entered at 1160 and the "ABORT" flags are reset and a ring counter is set to zero at 1162. A determination is made at 1164 whether the local station is off-hook by sampling the output of the local current detector 62 (FIG. 2). If the local station is not off-hook, the task determines at 1166 whether the call forwarding mode has been selected. If so, the task then determines at 1168 whether the answering machine mode has been selected. If not, a selection of the page alert mode is detected at 1170 and, if the page alert mode has not been selected, the selection of the call screening mode is detected at 1172. If the call screening mode is requested, the task checks at 1174 to determine if a ring-on cycle has been detected. A ring-on cycle is a predetermined ringing cadence normally generated by the central office for an incoming call. As is apparent from FIG. 13, the ring on cycle detection step is also performed if the call forwarding mode has not been selected, or if the call forwarding mode has been selected along with the answering machine mode. If the call forwarding mode has been selected and the page alert mode has been selected, but not the answering machine mode, the task jumps to an answer page ("ANS PAG") subtask at 1176. Finally, if the page alert mode has not been selected, and the call screening mode has not been selected, a normal forwarding mode task is called at 1178.

In the event that a ring-on cycle is not detected at 1174, the ring counter is incremented at 1180. When the ring count equals an answer ring count value as detected at 1182, the task jumps to an answer remote ("ANS REM") subtask value at 1184. The answer ring count is a value programmed by the uses which allows the user to select how many rings the control system should receive before answering an incoming call. Assuming that the ring count has not yet reached the answer ring count, the task checks at 1186 to determine if the ring count is equal to the limited ring count number The limited ring count number is programmed by the user to limit the number of rings of the local station in response to an incoming call. If the ring count has reached the ring count limit, the local station is connected to the local tone and current generator 60 and the local station is disconnected from the central office trunk lines at 1188 in order to prevent any more ring signals from being applied to the local station. If the ring count has not reached the ring count limit or after the local station has been disconnected from the telephone lines, a 6-second, ring-off cycle timer is started at 1190. Thereafter, a determination is made at 1192 whether the local station has gone off-hook to answer the call. If the local station has not gone off-hook, but a ring-on cycle is detected at 1194, execution of the task resume at 1164. Otherwise, the 6-second off cycle timer is checked at 1196 to determine if it has expired If so, the on-hook task is called at 1198. Otherwise, the answer mode determination task returns to 1192.

If the local station goes off-hook as detected at 1164 or 1192, the task branches to 1200 where a check is made for the answering machine mode. If the answering machine mode has not been selected, nor has the page alert mode been found to be selected at 1202, the conversation task is called at 1204 since no additional function is requested of the control system.

If either the answering machine mode has been selected or the answering machine mode has not been selected, but the page alert mode has been selected, the selection of the call forwarding mode is detected at 1206. If the simulated call forwarding mode has been selected, the task jumps to the answer forward ("ANS FWD") subtask at 1208. Otherwise, the page alert mode is detected at 1210 and a determination is then made at 1212 whether call screening has been selected. If not, a "PAGE WHEN DONE" flag is set at 1214 before checking for the "DISPLAY PAGER" flag at 1215. If the "DISPLAY PAGER" flag is not set, then the task waits for the end of the answering machine announcement at 1228. The end of announcement determination may be made by detecting the "BEEP" tone from the answering machine, or by expiration of a pre-programmed answering-machine-delay timer. The task then progresses to 1229, where the task idles for a predetermined amount of time while accepting and storing DTMF digits entered by the caller. These digits will be retrieved from memory later in the PAGE ALERT TASK, and transmitted to the paging terminal to appear in the display of the user's pager, thus indicating a telephone number he should call back. The answering machine announcement would typically be used to instruct callers to dial their phone number. After the digits have been stored at 1229, the task progresses to 1216.

If the page alert mode has not been selected, or both the page alert mode and the call screening mode have been both been selected, the task progresses to 1216 without first setting the "PAGE WHEN DONE" flag at 1214. This routing occurs because there is no need to dial the telephone number of a pager since the page alert mode has not been selected Also, if the page alert and call screening modes have both been selected, the "PAGE WHEN DONE" flag cannot be set until a determination is made that the incoming call is one selected for answering by the call screening function.

The remote mode detected at 1216 allows the user to access the control system at a remote location as explained above. If the remote mode is selected, the local station is connected to the central office lines at 1218 by de-energizing the relay 32 The local station then comes off-hook at 1220 by energizing the off-hook relay 36 (FIG. 2). The wait for access code task is then called at 1222. In the event that the remote mode has not been selected, the task checks at 1224 to determine if the call screening mode has been selected If not, the conversation task is called at 1226. If the remote mode has not been selected, but the call screening mode has been selected, the task progresses through 1218–1222 as explained above.

Figure 14A:
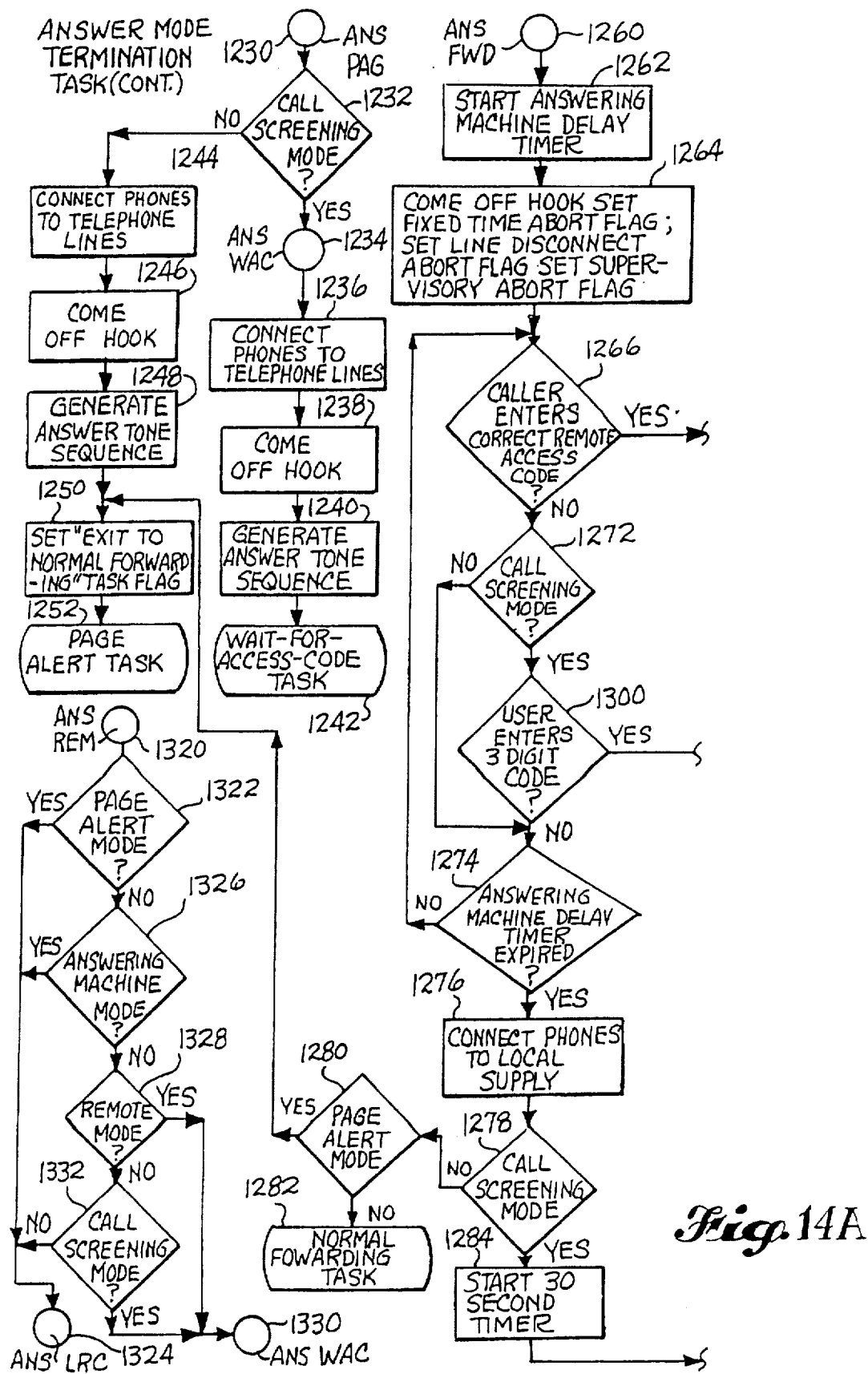
Figure 14B:
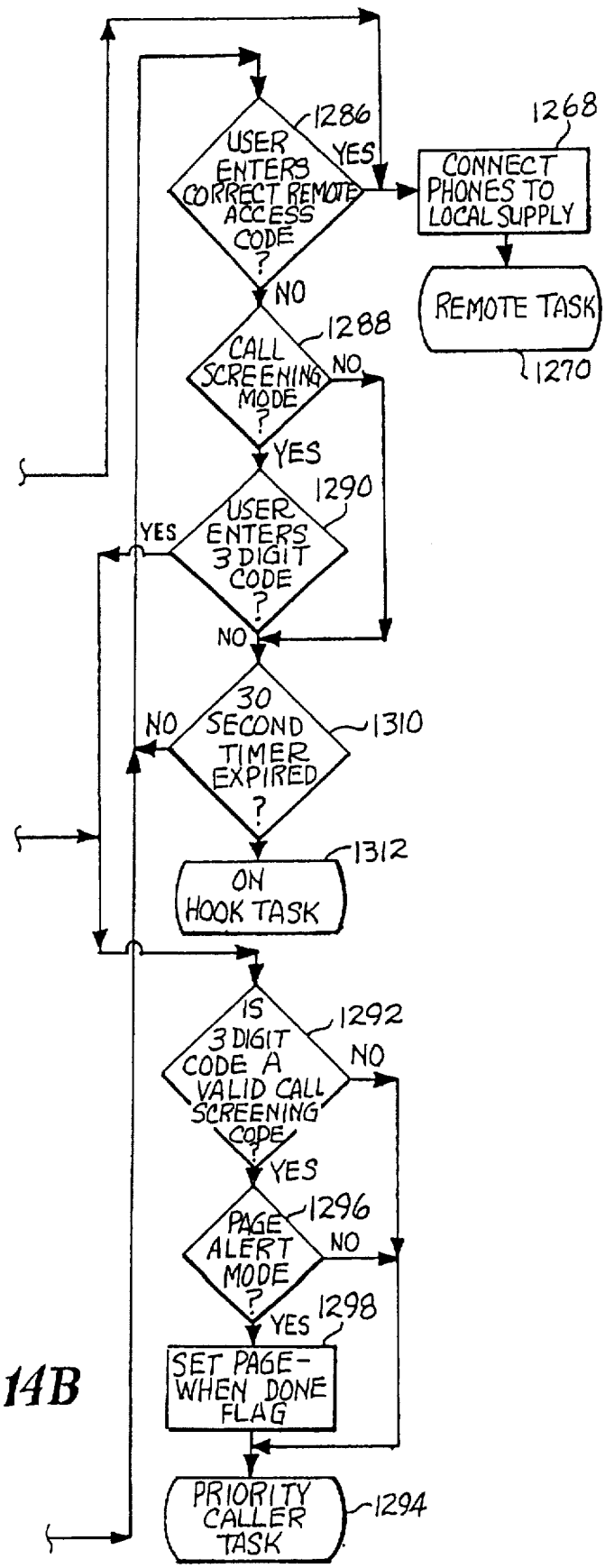

The answer mode determinations task calls a number of subtasks illustrated in FIG. 14. The answer page ("ANS PAG") subtask called at 1176 is entered at 1230. A determination is first made at 1232 whether the call screening mode has been enabled and, if so, the answer "wait for access" ("ANS WAC") subtask starting at 1234, is executed In this task, the local station is connected to the trunk lines at 1236 by de-energizing relay 32 (FIG. 2), the control system comes off-hook at 1238 by energizing the off-hook relay 36 (FIG. 2), an answer tone sequence is generated at 1240 as explained below and the wait for access code task is called at 1242.

If the call screening mode has not been selected, steps 1244–1248 which are identical to steps 1236–1240, respectively, are executed before a "EXIT TO NORMAL FORWARDING" task flag is set at 1250. Finally, the page alert task is called at 1252.

An answer forward ("ANS FWD") subtask, entered at 1260, is called at 1208 in FIG. 13. At this point the control unit has determined that an answering machine has answered the call An answering machine delay timer is then started at 1262 and, 1264, the off-hook relay 36 is energized to place the control system off-hook, and "FIXED TIME ABORT," "LINE DISCONNECT ABORT," and "SUPERVISORY TONE ABORT" flags are set. A determination is made at 1266 whether a caller has entered a correct remote access code. It will be recalled that, in the remote mode, a user can dial a predetermined access code which allows the user to modify the mode of the control system, enter new call forwarding numbers, etc from a remote location If the user has entered the correct access code, the local station is connected to the local tone and current generator 60 at 1268 by energizing relay 32. The remote task is then called at 1270. If the user has not entered a correct access code, or has not entered any access code, the selection of the call screening mode is checked at 1272. If the call screening mode has not been selected, a check is made at 1274 to determine if the answering machine delay timer has expired If not, the task returns to 1266 and remains in that loop until the expiration of the answering machine delay timer, indicating the announcement message on the answering machine is completed. At that point, the local station is connected to the local tone and current generator 60 at 1276 and a check is made at 1278 to determine of the call screening mode has been selected. If the call screening mode was not selected, the selection of the page alert mode is checked at 1280 If the page alert mode was detected, the "EXIT TO NORMAL FORWARDING TASK" flag is set at 1250 and the page alert task is called at 1252 as explained above. Otherwise, the normal forwarding task is called at 1282.

Assuming that the call screening mode is found to be selected at 1278, a 30-second timer internal to the CPU 34 is started at 1284. This allows the user 30 additional seconds to enter an access code after the answering machine announcement is complete. The presence of the correct remote access code is then checked at 1286. If the caller has not entered the correct access code as preset by the call screening feature, the task checks at 1288 to ensure that the call screening mode was selected. If so, a check is made at 1290 to determine if the user has entered a three-digit code. If so, a determination is made at 1292 if the code is a valid call screening code. If an incorrect code has been dialed, the priority caller task is called at 1294. Similarly, if the code is valid, but the page alert mode has not been selected as determined at 1296, the priority caller task is called at 1294. Finally, if the page alert mode has been selected, the priority caller task is called at 1294 after the "PAGE WHEN DONE" flag has been set at 1298.

The above steps 1292–1298 are also executed if a determination is made at 1300 that the call screening mode has been selected and the user has entered a three-digit code.

In the event that the user has not entered the correct remote access code as detected at 1286 and the call screening mode has not been selected, the program remains in a loop at 1310 until the expiration of the 30-second timer at which point the on-hook task is called at 1312.

The answer remote ("ANS REM") subtask, called at 1184 of FIG. 13, is entered at 1320. The presence of the page alert mode is first checked at 1322 and, if the page alert mode has been selected, the task returns to the answer mode determination task through 1324 and 1185 of FIG. 13. If the page alert mode has not been selected, a determination is made at 1126 whether the answering machine mode has been selected. If so, the task once again exits through 1124. If neither the page alert mode nor the answering mode has been selected, the remote mode is detected at 1328 to branch to the ANS WAC subtask at 1234 through 1330. Finally, if none of the foregoing modes have been selected, the task determines at 1332 if the call screening mode has been selected and, if so, branches to 1234 through 1330 and, if not, returns to the answer mode determination task through 1324.

Figure 15:
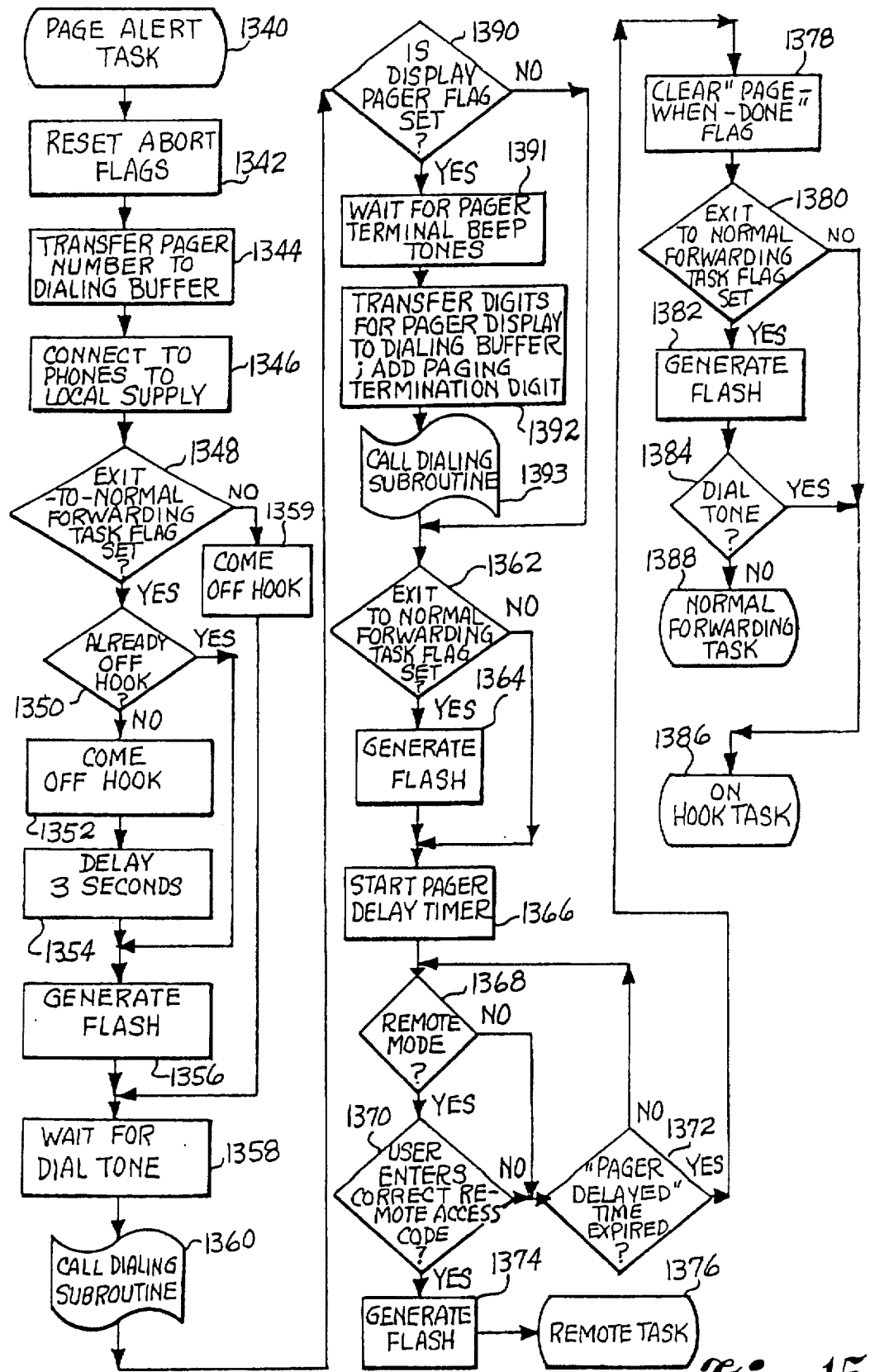

The page alert task, illustrated in FIG. 15, is entered at 1340 and, as before, the "ABORT" flags are reset at 1342. The pager number corresponding to the telephone number of the pager is than transferred to a dialing buffer in the CPU 34 at 1344. After the local station has been connected to the local tone and current generator 60 at 1346 by energizing relay 32, the task checks at 1348 to determine if the "EXIT TO NORMAL FORWARDING TASK" flag has been set. If so (thus indicating that simulated a call forwarding will occur after the pager is dialed), a determination is made at 1350 whether the local station is already off-hook If not, the control unit comes off-hook at 1354 by energizing relay 36 in order to answer the incoming call if the incoming call has not already been answered.

After a three second delay effected at 1354, a hook flash is generated at 1356 by momentarily de-energizing the off-hook relay 36, thus placing the calling party on central office hold. The three second delay at 1354 is required since central office switching equipment will not generally accept a hook flash immediately after the local station comes off-hook. When the hook flash occurs at 1356, a second dial tone is normally generated at the central office. The task then waits for receipt of the dial tone at 1358. If paging is to occur without a subsequent call forwarding, the task branches from 1348 to 1360 thereby causing the control system to come off-hook by energizing the off-hook relay 36 The task then once again waits at 1358 for a dial tone. When the dial tone is received, the dialing task is called at 1360 in order to allow the telephone number of the pager to be called. The status of the "DISPLAY PAGER" flag is then checked at 1390. If the flag is not set, then the task progresses to 1362. Otherwise, if the "DISPLAY PAGER" flag is set, then the pager called must be a display type pager. The task then waits for detection of the paging terminal's beep tones at 1391. These beep tones indicate the terminal is ready to accept digits to be sent to the pager's display. The task then transfers the stored digits for the page display to the dialing buffer at 1392. At 1392 the task also adds to the dialing buffer a predetermined "PAGER TERMINATING DIGIT", which is used to indicate to the paging terminal that dialing is complete. The contents of the dialing buffer are then dialed at 1393, and then the task progresses to 1362.

The status of the "EXIT TO NORMAL FORWARDING TASK" flag is then checked at 1362. If the flag is set, a hook flash is generated at 1364 to conference the caller into the pager station. A pager delay timer is then started at 1366 for a period corresponding to the length of time required for the pager terminal to respond to the call. If the remote mode has been selected, as determined at 1368 a check is made at 1370 to determine whether the user has entered the correct remote access code. If not, or if the remote mode has not been selected, the task remains in a loop at 1372 and 1368 until the expiration of the pager timer. If the user has entered the correct remote access code, a hook flash is generated at 1374 to disconnect the paging terminal from the local station and the remote task is called at 1376.

After the expiration of the pager delay timer, the "PAGE WHEN DONE" flag is cleared at 1378 and the status of the "EXIT TO NORMAL FORWARDING TASK" flag is checked at If the flag is set, a hook flash is generated at to disconnect the paging terminal and the presence of a dial tone is detected at 1384. If a dial tone is present, thereby indicating that the caller has already hung up, the on-hook task is called at 1386. The on-hook task is also called if the "EXIT TO NORMAL FORWARDING TASK" flag is not determined to be set at 1380. Finally, if the dial tone is not found to be present at 1384, the normal forwarding task is called at 1388.

Figure 16B:
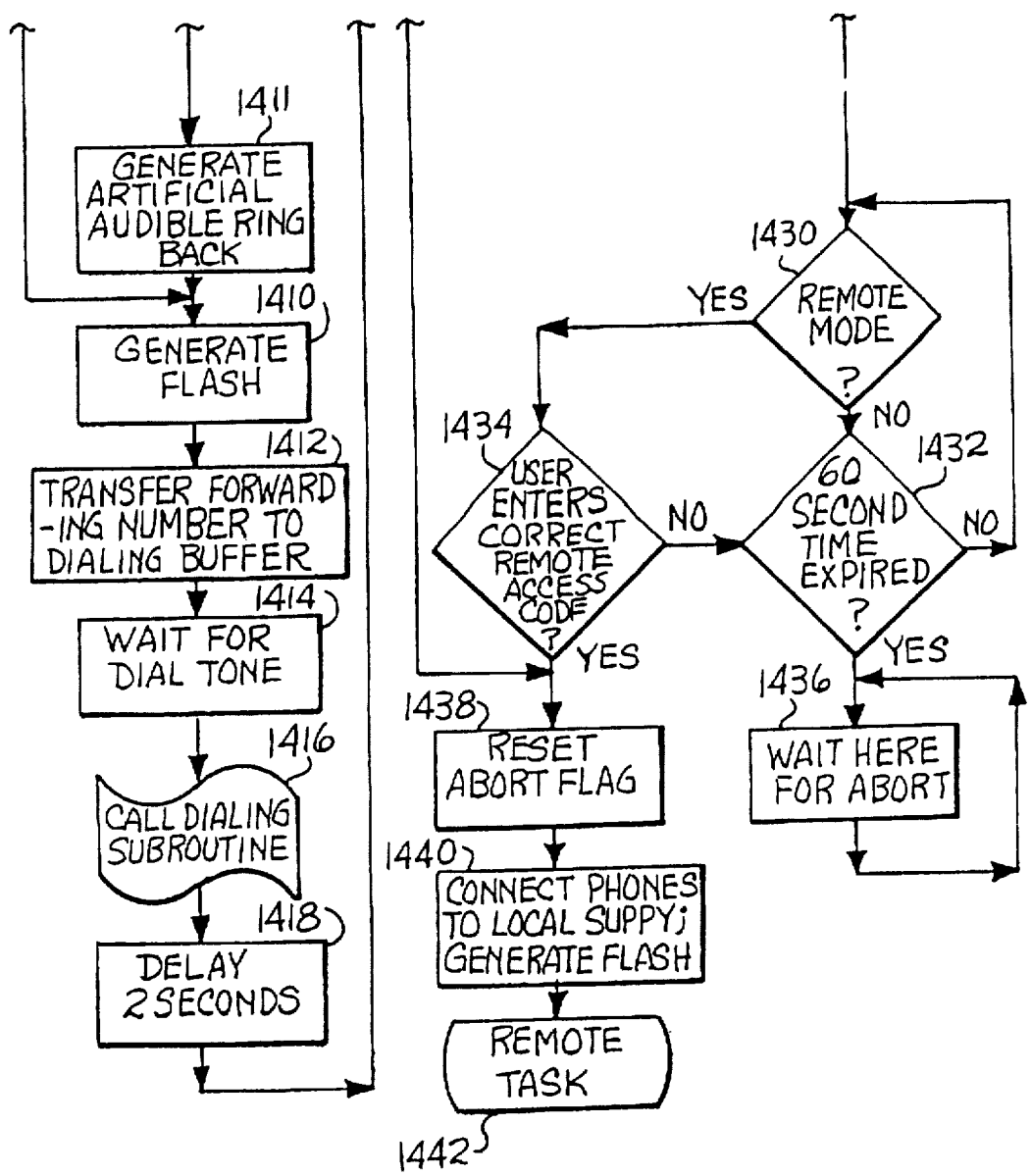

FIG. 16 is a flow chart of the normal forwarding task which is entered at 1400. The "ABORT" flags are reset at 1402 and a determination is made at 1404 whether the station is already off-hook If not, the control system goes off-hook at 1406 by energizing the off-hook relay 36 and, after a three-second delay at 1408, a determination is made at 1409 as to whether the caller has entered a remote access code. If the caller has entered a remote access code, then the unit progresses to 1438. Otherwise, an artificial audible ringback is generated at 1411. This matches the cadence of normal ringback, so the caller will remain on the line. The task then progress to 1410, where a hook flash is generated to obtain a dial tone from the local station. The forwarding number is then transferred to the dialing buffer in the CPU 34 at 1412 and the task then waits for a dial tone at 1414. The forwarding number is then dialed at 1416 and, after a delay of two seconds at 1418, the "CALL-TRANSFER-AFTER-FORWARDING" flag is checked at 1419. If this flag is set, then the task progresses to 1421 where the control system goes on hook and returns to ON-HOOK TASK at 1423. By going on-hook, the phone company's "CALL-TRANSFER" feature will transfer the caller directly to the forwarded number. This freezes up the control system to handle another call.

If the "CALL-TRANSFER-AFTER-FORWARDING" flag is not set at 1419, then a second hook flash is generated at 1420 to connect the calling party to the call forwarding number.

After a subsequent two-second delay at 1422 the "FIXED TIME ABORT" flag and "LINE DISCONNECT ABORT" flag are set at 1424 and the "SUPERVISORY TONE ABORT" flag is set at 1426. A 60-second timer is then started at 1428 and the task checks at 1430 to determine if the remote mode has been selected This allows the user 60 seconds after the beginning of a forwarded call to enter a valid remote access code. If the remote mode has not been selected, the task waits at 1432 for the expiration of the 60-second timer. If the remote mode has been selected, a determination is made at 1434 whether the user has entered the correct remote access code. If not, the task remains in a loop composed of 1432, 1430, 1434 until the expiration of the 60-second timer at which point the task waits at for an abort. In the event that the access code is entered, as determined at 1434, the "ABORT" flags are reset at 1438. Finally, the local station is connected to the local tone and current generator 60 and a hook flash is generated to disconnect the forwarded call, at 1440, and the remote task is then called at 1442.

Figure 17:
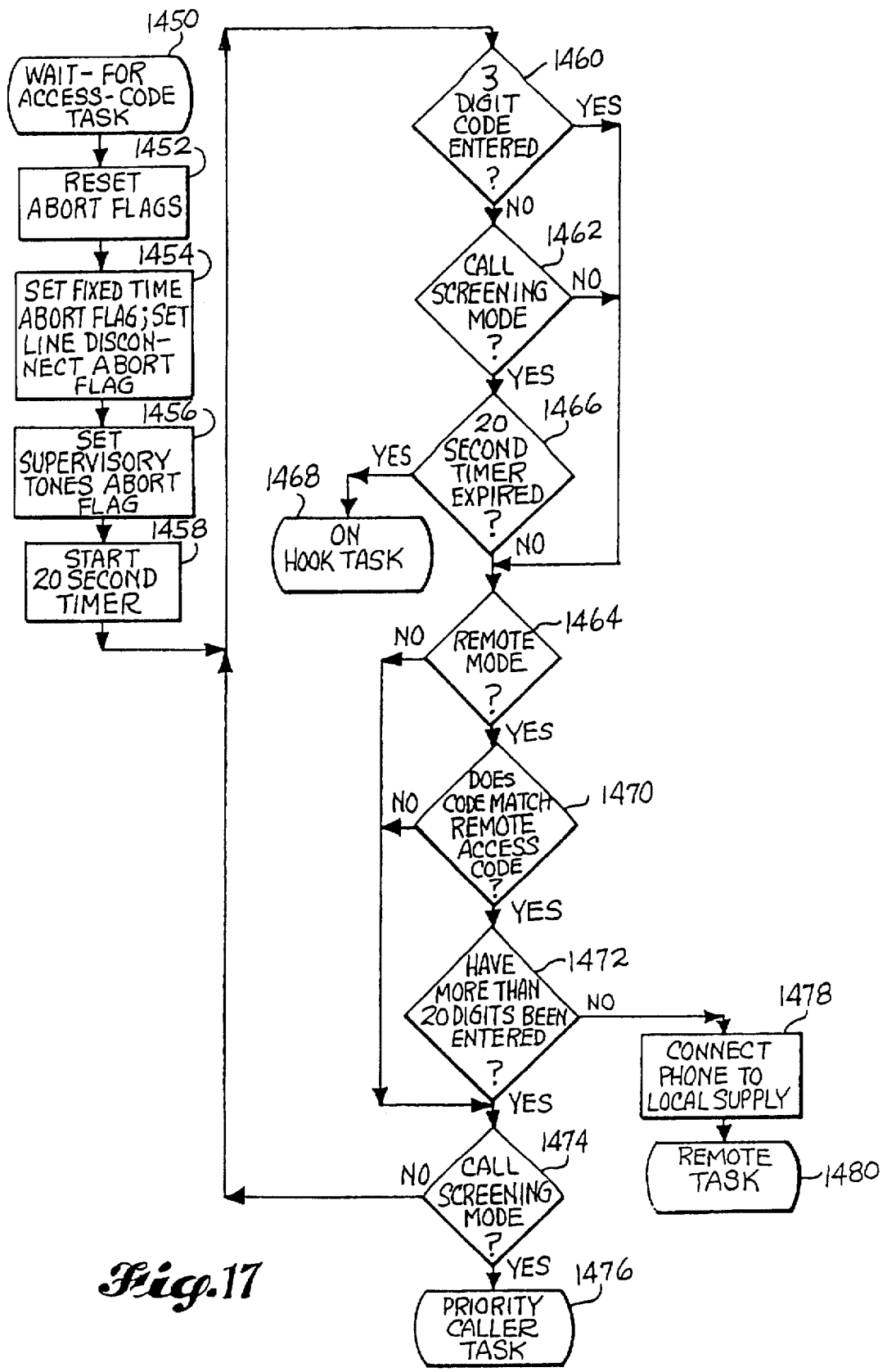

The wait for access code task illustrated in FIG. 17 is entered at 1450. In steps 1452–1456 various "ABORT" flags are initially reset and then selectively set for use as explained below. A 20-second timer is then started at 1458 before the task checks at 1460 to determine if a three digit code has been entered. If not, the selection of the call screening mode is checked at 1462 and if the call screening mode has not been selected, a determination is made at 1464 as to whether the remote mode has been selected. If the three digit code has not been entered, but the call screening mode has been selected, the task determines at 1466 if the 20-second timer has expired If so, the on-hook task is called at 1468. When the call screening mode is selected, the caller thus has 20 seconds to enter the correct access code. Otherwise, the wait for access code task proceeds to 1464 to check if the remote mode has been selected. If the remote mode has been selected, the task determines at 1470 whether a correct remote access code has been entered. If so, a check is made at 1472 to determine if more than 20 digits have been entered. If more than 20 digits have been entered, there is the possibility that a remote user is attempting to enter the correct remote access code by trial and error. Accordingly, if more than 20 digits have been entered, the task checks at 1474 to determine if the call screening mode has been selected. If not, the program returns to 1460 Otherwise, the priority caller task is called at 1476. If the remote access code is correctly entered and less than 20 digits have been entered, the local station is connected to the local tone and current generator 60 at 1478 and the remote task is called at 1480.

Figure 18A:
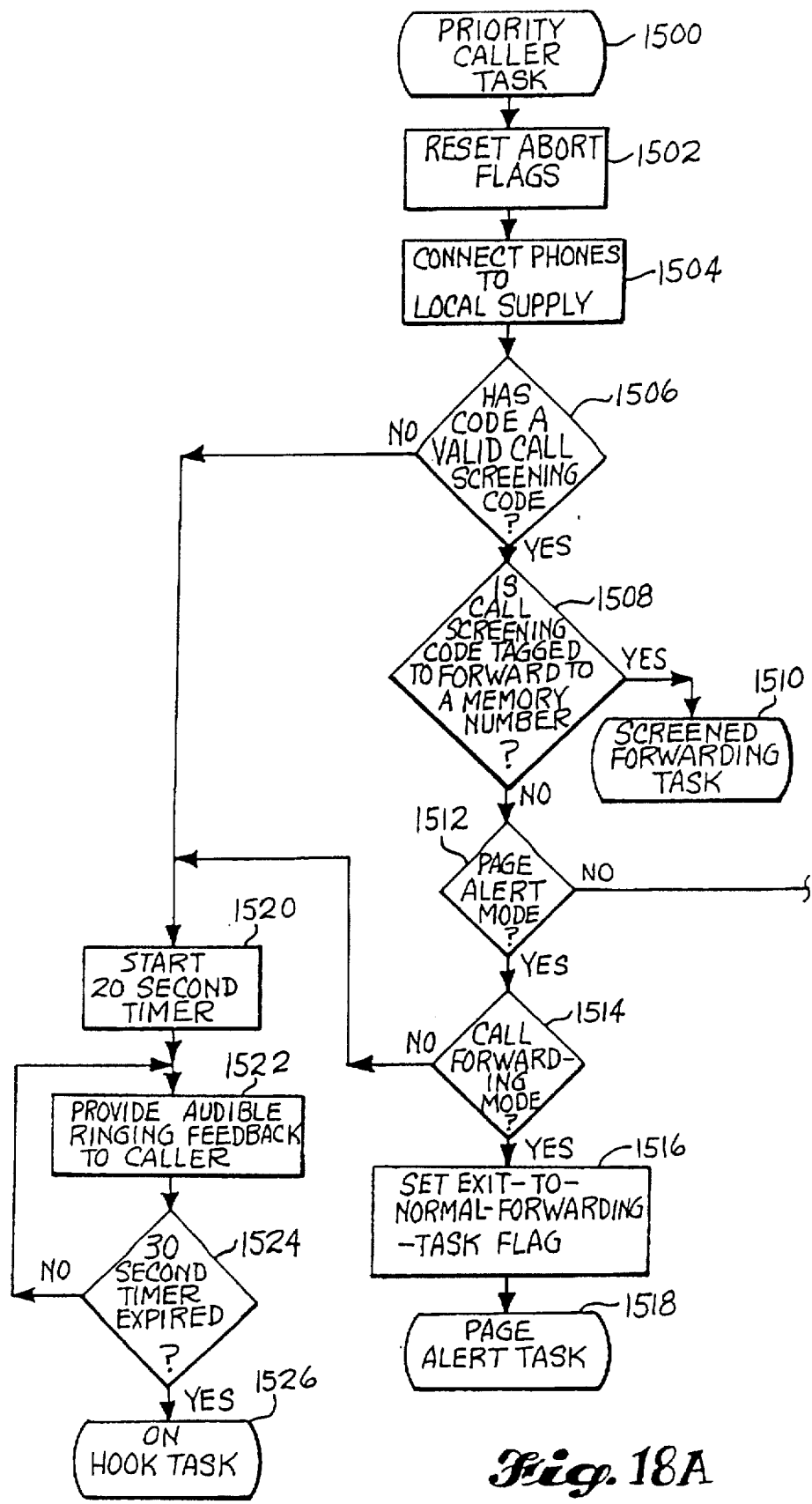
Figure 18B:
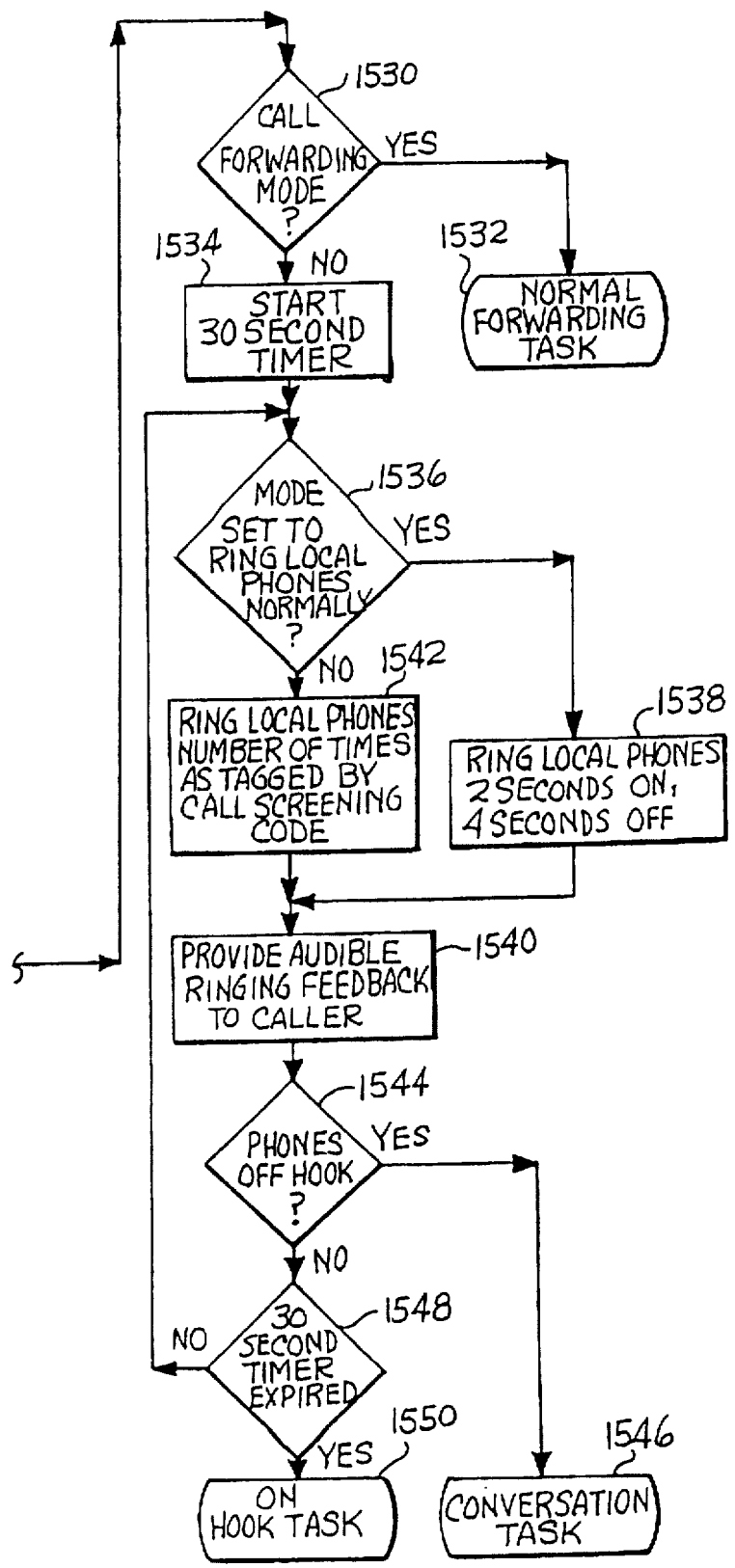

The priority caller task is illustrated in FIG. 18 and entered at 1500. The "ABORT" flags are reset at 1502 and the local station is then connected to a local tone and current generator 60 at 1504. The task checks at 1506 to determine if the three digit call screening code previously entered is valid. If so, a determination is made at 1508 whether the control system is programmed to utilize the call screening code to forward the calling party to a call forwarding number. It will be recalled that a call screening code can be used to either forward the calling party to an external station or to cause the local station to ring. If the screening code is used to forward the call, the screened forwarding task is called at 1510. Otherwise, the mode status is checked for the page alert mode at 1512. If the page alert mode has been selected and a determination is made at 1514 that the call forwarding mode has also been selected, a "EXIT TO NORMAL FORWARDING TASK" flag is set at 1516 and the page alert task is called at 1518 in order to dial the telephone pager and then forward the incoming call to an external location after the pager has been dialed.

If the page alert mode has been selected, but the simulated call forwarding mode has not been selected, the priority caller task branches to 1520 where a 30-second timer is started. The 30-second timer is also started if the call screening code dialed in the incomming call is not valid. At 1522, audible ringing is provided to the caller so that the caller will not know that his code is invalid and merely assumes that the called party is not available so that the ringing continues indefinitely. The task remains in a loop at 1522 and 1524 until the 30-second timer expires at which point the on-hook task is called at 1526.

If the control system is programmed to use the call screening number to ring the local station, the task progresses through 1508 to 1512 and, if the page alert mode has not been selected, the determination is made at 1530 whether the simulated call forwarding mode has been selected If so, the normal forwarding task is called at 1532.

Otherwise, a 30-second timer is started at 1534 and a determination is made at 1536 whether the user has designated the local phones to ring normally. If so, the local station rings in a cadence of two seconds on and four seconds off at 1538, and audible ringing is provided to the caller at 1540. If the ringing cadence is to vary with the identity of the call screening code so that the user can determine the identity of the calling party before answering, the local station rings a number of times as determined by the call screening code at 1542 while providing audible ringing feedback to the caller at 1540. The task then checks at 1544 for the local station going off-hook when the user answers the local station. When the local station is answered, the conversation task is called at 1546. If the local station does not go off-hook, a check of the 30-second timer is made at 1548. The task returns to 1536 until the expiration of the 30-second timer at which point the on-hook task is called at 1550.

Figure 19:
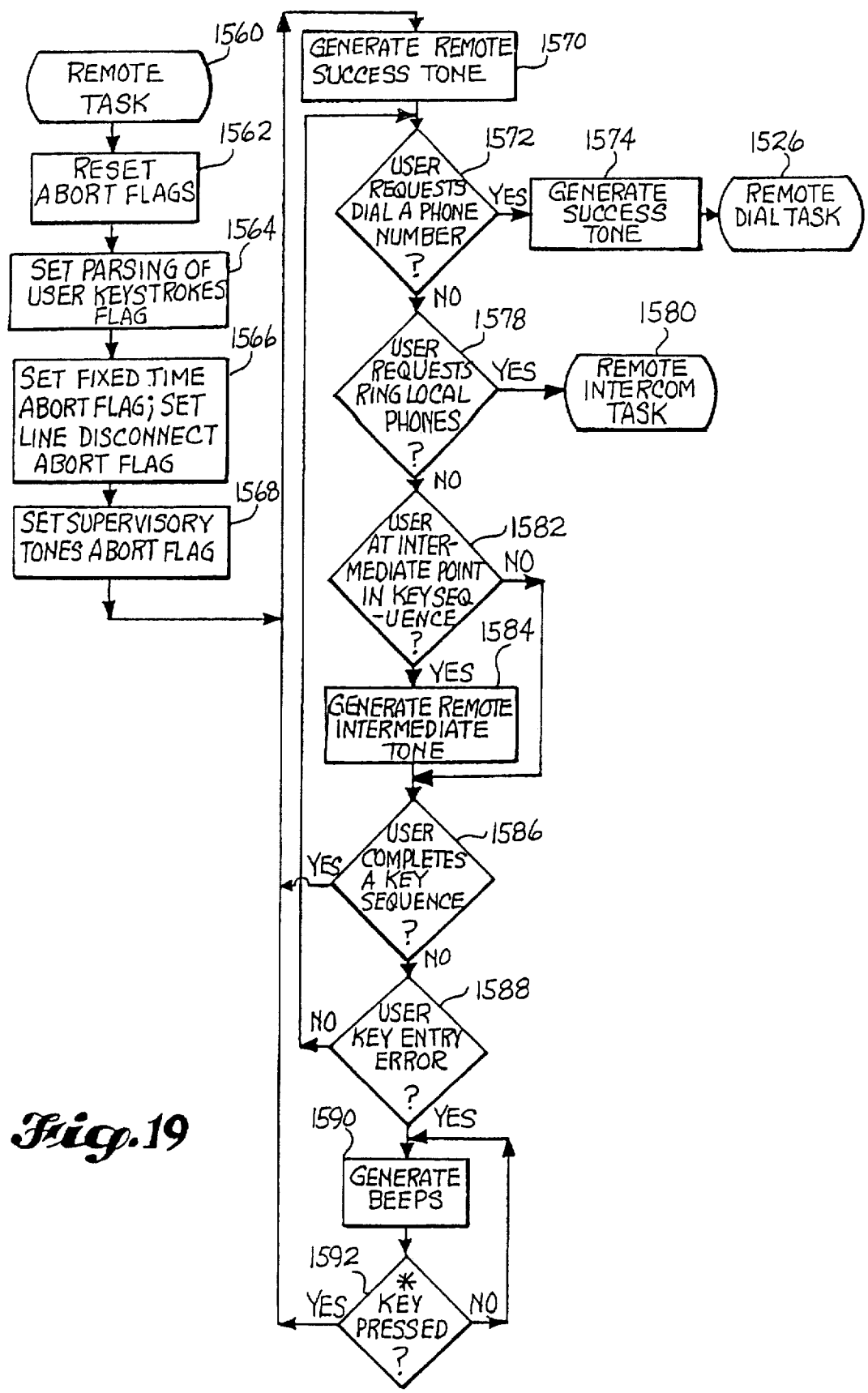

The remote task illustrated in FIG. 19 is entered at 1560. The remote task is executed when the user calls in from a remote location and correctely dials his remote access number. As with the previously described tasks, the "ABORT" flags are reset at 1562 and the "PARSING OF USER KEYSTROKES" flag is set at 1564. The "FIXED TIME ABORT" flag and "LINE DISCONNECT ABORT" flag are set at 1566 and the "SUPERVISORY TONES ABORT" flag is set at 1568. At 1570, a remote success tone is generated to let the user know that his remote access code has been accepted and he may now enter a command. A determination is made at 1572 as to whether the user is requesting to dial in accordance with the "money saver" mode described above in which telephone calls may be made from a telephone booth or other remote location through the local station. If dialing is requested, a success tone is generated at 1574 to verify receipt of the request by the user and the remote dial task is then called at 1576.

If the user is not accessing the control system to dial a telephone number through the local station, a determination is made at 1578 whether the user is requesting that the local station be rung. If so, the remote intercom task is called at 1580. If the user has entered a valid remote access number but does not wish to dial a number through the local station and does not want to ring the local station telephones, the user must be performing a programming function that requires the entry of additional digits. Accordingly, at 1582 a check is made whether additional digits are to be entered and, if so, generates a remote intermediate tone at 1584 to request the user to enter additional digits The task then checks at 1586 if the user has completed the key sequence inputting the additional data. When the user has entered the additional data, the task branches to 1570 where a remote success tone is once again generated. If the user has not completed the key sequence, the task checks at 1588 to determine if there is an error in keying the data. If not, the task returns to 1572 and executes the steps as explained above If an error has occurred, an error tone is generated at 1590 and a determination is made at 1592 as to whether the user is pressing the "*" key to cancel the error tone and attempt to properly enter the data.

Figure 20:
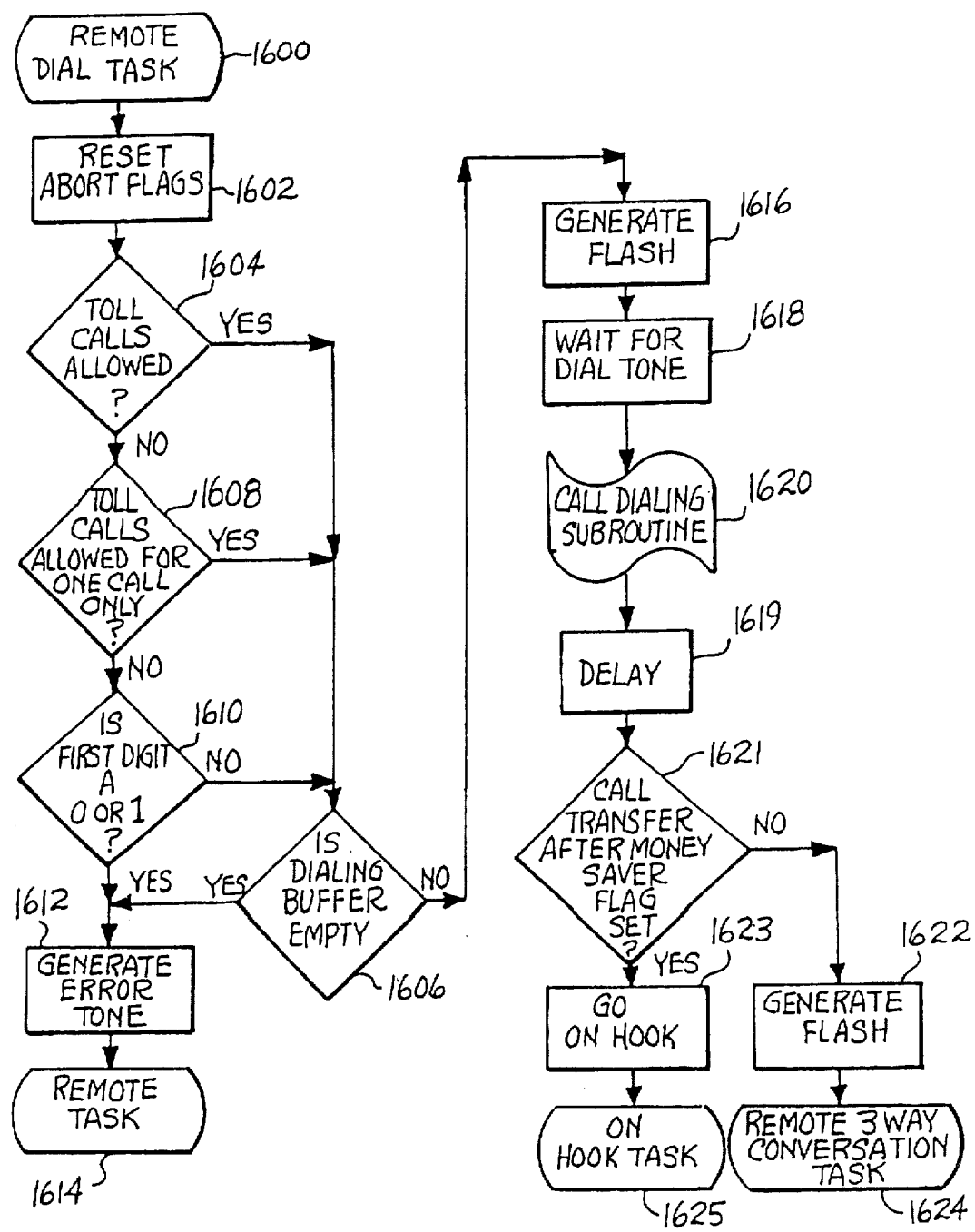

The remote dial task, entered at 1600, is illustrated in FIG. 20. This task is used to dial a third party through the local station from a remote location. The "ABORT" flags are initially reset at 1602 and a determination is then made at 1604 as to whether unlimited toll calls are allowed If so, the status of the dialing buffer is checked at 1606 to determine if the buffer contains the number to be dialed. Otherwise, a check is made at 1608 to determine if a single toll call is allowed. If so, the dialing buffer is once again checked at 1606. If toll calls are not permitted, the task checks at 1610 to determine if the number to be dialed begins with "0" or a "1". If so, an unauthorized number is being dialed and an error tone is thus generated at 1612 before the remote task is called at 1614. If the first digit of the number being called does not begin with a "0" or a "1", the contents of the dialing buffer is checked at 1606. If the buffer is empty, thus indicating that a call is being attempted but a telephone number has not been loaded into the dialing buffer, the error tone is generated at 1612 and the remote task is then called at 1614.

Assuming that the dialing buffer contains a telephone number and that number is authorized for dialing, a hook flash is generated at 1616 to place the calling party on hold and to obtain a dial tone for the control system. The control system waits at 1618 for receipt of the dial tone and then calls the dialing task at 1620 to dial the number contained in the dialing buffer.

The control system then generates a predetermined delay at 1619, and then checks the status of the "CALL-TRANSFER-AFTER-MONEY-SAVER" flag at 1621. If this flag is set, then the control system goes on hook at 1623 and returns to ON-HOOK task at 1625. This signals the phone company's CALL TRANSFER service to transfer the caller directly to the number dialed, thus freeing up the control system to handle another call. This dramatically increases the number of calls that can be handled by the control system.

If the "CALL-TRANSFER-AFTER-MONEY-SAVER" flag is not set at 1621, then a second hook flash is generated at 1622 to retrieve the calling party from the central office hold and connect the calling party to the dialed third party station. The remote three-way conversation task is then called at 1624.

Figure 21:
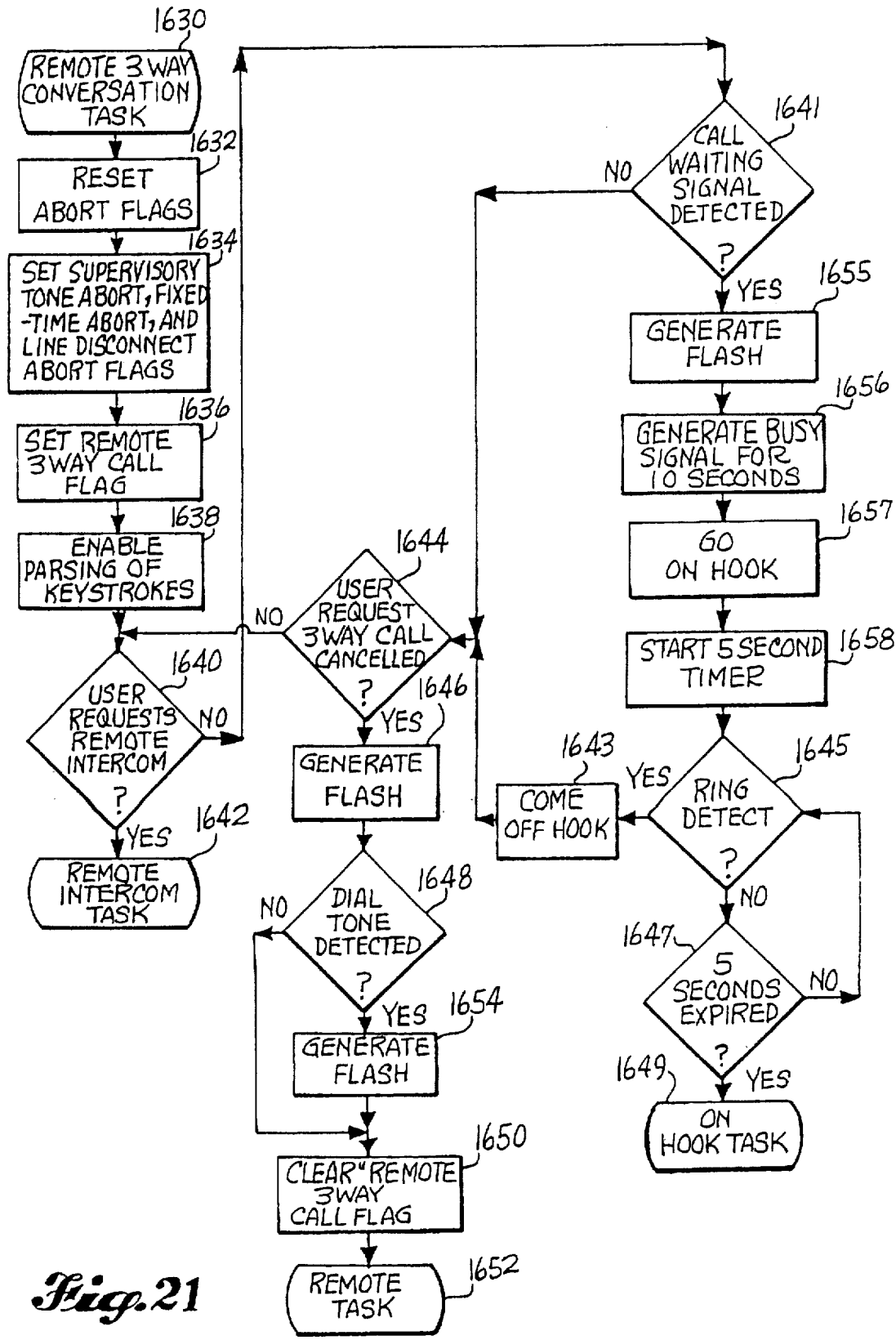

The remote three-way conversation task is illustrated in FIG. 21. The task is entered at 1630 and the "ABORT" flags are reset at 1632. The "SUPERVISORY TONE ABORT" flag, "FIXED-TIME-ABORT" flag, and "LINE-DISCONNECT-ABORT" flag is then set at 1634 and the "REMOTE THREE-WAY-CALLING" flag is set at 1636 for use by the remote intercom task as explained below. The "PARSING OF KEYSTROKES" flag is set at 1638 and a check is made at 1640 to determine if the user is requesting the remote intercom feature. If so, the remote intercom task is called at 1642. Otherwise, a check is made at 1641 to determine if a CALL WAITING signal is detected from the phone company, indicating another party is trying to reach the system. This CALL WAITING signal is normally a short "beep" tone with an interruption in line current before and after the beep. The two line current interruptions within a short period of time are thus detected by the control system as a CALL WAITING signal. Upon detection of this CALL WAITING signal at 1641, the control system generates a flash at 1655, thus signalling the phone company to place the original parties on the phone company hold, allowing their conversation to continue, and connect the control system to the new "CALL WAITING" party. The control system then generates a busy signal to the new party signifying that the control system is busy and that the new party should hang up and call back later. The control system then goes on hook at 1657 and starts a 5 second timer at 1658. The task then enters a loop, waiting for ring detection at 1645 or expiration of the 5 second timer at 1647. If the original 2 parties placed on hold at the phone company are still there, then the phone company will ring the line, and the ring will be detected at 1645 causing the control system to come off hook at 1643 and then progress to 1644. If the original 2 parties had finished talking, then no ring signal will be generated by the phone company, and the 5 second timer will expire at 1647, causing the control system to enter the ON-HOOK-TASK at 1649.

If the CALL WAITING signal is not detected at 1641, or if it was detected and processed as described in the previous paragraph, then a check is made at 1644 to determine if the user is no longer requesting a three-way call. If the user is no longer requesting a three-way conference call, the task returns to until a determination is made that the remote intercom feature is being requested and then calls the remote intercom task at 1642.

If the user is requesting the three-way conference call be canceled, the task generates a hook flash at 1646. The hook flash disconnects the third party. A determination is then made at 1648 whether a dial tone has been detected If not, the "REMOTE THREE-WAY CALL" flag is cleared at 1650 and the remote task is then called at 1652. If a dial tone is detected at 1648, one of the parties to the previous three-way conversation must have gone on-hook. As a result, the dial tone is eliminated at 1654 by generating a hook flash.

Figure 22:
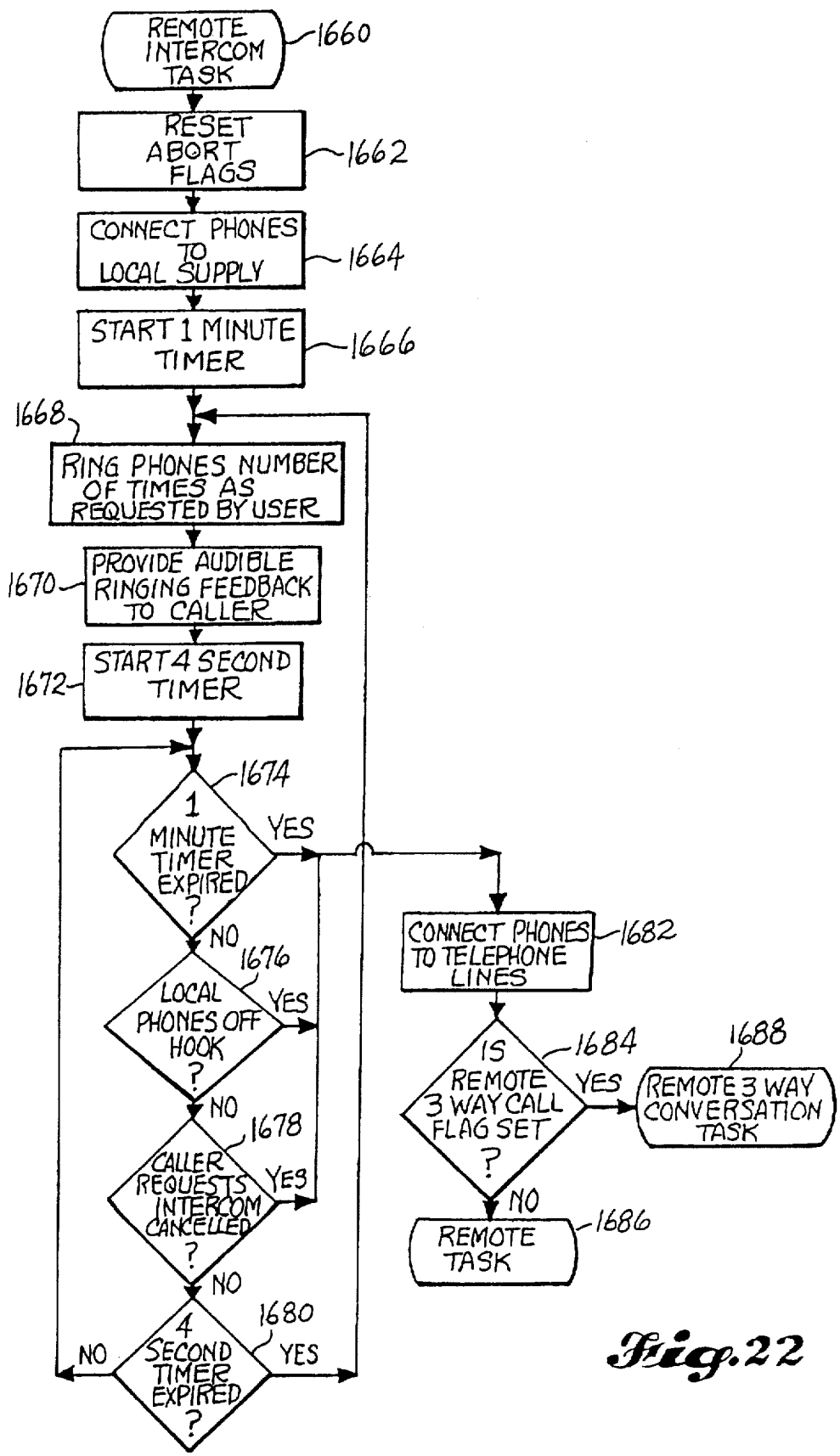

FIG. 22 illustrates the remote intercom task which is entered at 1660 The "ABORT" flags are first reset at 1662 and the local station is connected to the local tone and current generator 60 at 1664. After a one-minute timer is started at 1666, a ring signal is applied to the local station telephones at 1668 with the number of rings being determined by the ringing code dialed by the user as explained above. Audible ringing is then provided to the user at 1670 and a 4-second timer is started at 1672. The status of the one-minute timer is then checked at 1674 and, if the timer has not expired, a check is made at 1676 to determine if the local station is off-hook If the local station is not off-hook, a check is made at 1678 to determine if the user has cancelled the intercom request. If not, the status of the 4-second timer is checked at 1680. If the 4-second timer has not expired, the task returns to 1674 to check the status of the one-minute timer. If the 4-second timer has expired, execution of the task resumes at 1668. Thus, the user calling from a remote location may cancel the remote intercom during each four second interval between rings. If the one-minute timer expires or if the local station is off-hook or the caller cancels the intercom feature, the local station is connected to the telephone lines at 1682 by de-energizing the relay 32 (FIG. 2). A check is then made at 1684 to determine if the "REMOTE THREE-WAY CALL" flag is set. If the flag is not set, the remote task is called at 1686 Otherwise, the remote three-way conversation task is called at 1688 since the user had been in a conference call with a third party from a remote location.

The screened forwarding task illustrated in FIG. 23 is entered at 1700. The screen forwarding task causes an incoming call to be forwarded to one of several numbers depending upon the call screening code dialed by the caller. The "ABORT" flags are reset at 1702 and a hook flash is generated at 1704 to obtain a dial tone from the central office and put the calling party on hold. The call forwarding telephone number corresponding to the call screening code dialed by the calling party is then transferred to the dialing buffer at 1706. If no telephone number was in the portion of memory designated by the call screening code, the dialing buffer will now be empty and this fact is recognized at 1708 to call the on-hook task at 1710.

Assuming that the call screening code designates a portion of memory containing a call forwarding number, the task will wait at 1712 for a dial tone allowing the control system to dial the call forwarding number which is accomplished by calling the dialing task at 1714. After a delay of two seconds implemented at 1716 to allow the central office equipment to accept a new hook flash, a second hook flash is generated at 1718 to connect the calling party to the call forwarding number. After a subsequent delay of two seconds at 1720, the "FIXED TIME ABORT" flag and "LINE DISCONNECT ABORT" flag are set at 1722 and the "SUPERVISORY TONE ABORT" flag is set at 1724. The task then remains in a loop at 1726 waiting for an abort resulting from a dial tone (for five seconds), a busy signal (for sixty seconds), a ringing signal (for sixty seconds), a line disconnect if the call forwarding station goes on-hook or a fixed time abort (30 minutes). When the abort occurs, the on-hook task is immediately called.

The previously described-flow charts are for the main tasks that are executed either upon power up or upon being called by another main task. As explained above, a number of interrupt subtasks are executed at fixed intervals upon the occurrence of an interrupt. The first of these subtasks is the 500 microsecond timer interrupt service task which is illustrated in FIG. 24 and entered at 1730. The timer interrupt service task starts a countdown timer internal to the CPU 34 for 500 microseconds at 1732. At the expiration of the 500 microsecond period, the supervisory tone detection subtask is called at 1734. Thus, the supervisory tone detection subtask is executed every 500 microseconds when the timer interrupt occurs.

Figure 25:
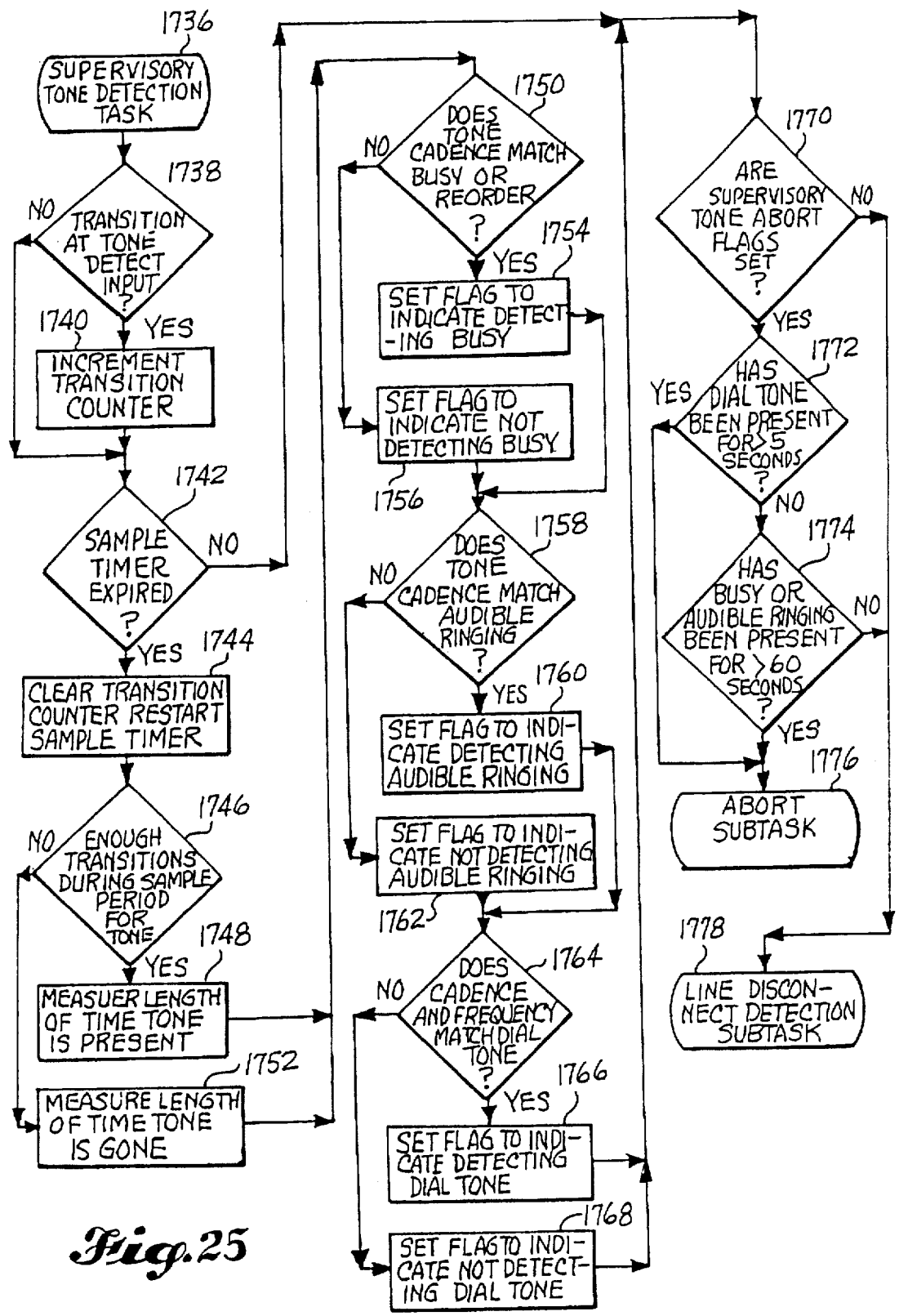

The supervisory tone detection subtask is illustrated in FIG. 25 and entered at 1736. The supervisory tone detection subtask counts the transitions at the output of the Schmitt trigger (FIG. 2) during several sample periods in order to determine if a busy, dial tone, or audible ringing is present on the trunk lines. The task checks at 1738 to determine if transitions are present on the Schmitt trigger output. For each transition detected, a transition counter is incremented at 1740. At the expiration of the sample period, as detected at 1742, the transition counter is cleared and the sample timer is restarted at 1744. The status of the sample timer is also checked at 1742 if transitions are not detected at the output of the Schmitt trigger at 1738. After the transition counter has been cleared and the sample timer started, a determination is made at 1746 as to whether enough transitions have occurred during the sample period to indicate a valid tone. If so, the length of the tone is measured at 1748 and matched with the tone cadence for a busy or reorder signal at 1750. If an insufficient number of transitions have occurred during the sample period, thus indicating that a tone is not present, the length of time that the tone is absent is measured at 1752 and compared to the cadence of a busy or reorder signal at 1750. If the detected tone matches the cadence of a busy or reorder signal, a flag is set at 1754 to indicate that the tone is for a busy signal. Otherwise, a flag is set at 1756 to indicate that the detected tone is not for a busy signal.

After the tone is identified as being a busy signal or not a busy signal, the task checks at 1758 to determine if the tone cadence matches an audible ringing. If so, a flag is set at 1760 to indicate that the tone is for an audible ringing. Otherwise, a flag is set at 1762 to indicate that the detected tone is not for audible ringing. A check is then made at 1764 to determine whether the cadence of the received signal matches the cadence and frequency of a dial tone. If so, a flag is set at 1766 to indicate that a dial tone is being detected. Otherwise, a flag is set at 1768 to indicate that the detected tone is not a dial tone.

After the received tone is identified as being a busy, reorder, dial tone or ringing signal, a check is made at 1770 to see if the "SUPERVISORY TONE ABORT" flags have been set. This check is also made if a determination is made at 1742 that the sample time period has expired. If the "SUPERVISORY TONE ABORT" flags have been set, a check is made at 1772 to determine if the dial tone has been present for more than five seconds.

If not, a check is made at 1774 to determine if the busy or audible ringing signal has been present for more than sixty seconds. If either the dial tone has been present for more than five seconds or the busy or audible ringing signal has been present for more than sixty seconds, the abort subtask is called at 1776 since a supervisory tone signal of this duration should cause the termination of the call. If the dial tone has not been present for more than five seconds, or audible ringing or busy signal has not been present for more than sixty seconds, the line disconnect detection subtask is called at 1778.

The line disconnect detection subtask, which is illustrated in FIG. 26, detects when a line disconnect current interruption occurs when the called party goes on-hook. The task is entered at 1800 and a determination is first made at 1802 as to whether the "LINE DISCONNECT ABORT" flag is set. The output of the line current detector (FIG. 2) is then sampled at 1804 to determine if a line current interruption indicative of the calling party going on-hook has been detected. A current interruption can also occur when the central office signals that a call is waiting for the local station. A call waiting signal is, however, a double interruption. The task thus checks at 1806 to determine if the current interruption detected at 1804 is for a call waiting signal. If not, a determination is made at 1808 whether the line current interruption detected at 1804 followed a double interruption indicative of a call waiting signal.

If the line current interruption detected at 1804 follows a double interruption, the line current interruption so detected may have been the call waiting party going on-hook and the line current interruption detected at 1804 should thus be ignored. If the line current interruption did not just follow a double interruption, as determined at 1808, then a determination is made at 1809 as to whether the "REMOTE 3-WAY CALL" flag is set. If it is not set, then the current interruption must have resulted from the called party going on hook, and therefore the "ABORT" subtask is called at 1810. If the "REMOTE-3-WAY CALL" flag is set, then the "MONEY-SAVER" feature is in use, and a determination is made at 1811 as to whether the "IGNORE 1st INTERRUPTION" flag is set, indicating that the phone company transmits line current interruptions when the called party answers. If so, then a determination is made at 1814 as to whether this is the first interruption. If it is, then the task progresses to the CIRCULATOR subtask at 1812, thus ignoring the first interruption. If it is not the first interruption, or if the "IGNORE 1st INTERRUPTION" flag was not set at 1811, then the task progresses to 1815 where the fixed-time-abort timer is reduced to 20 seconds before progressing to the CIRCULATOR subtask at 1812. By reducing the timer to 20 seconds, the control system gives the user 20 seconds to enter a new command or phone number after detecting a line current interruption due to the the other party hanging up. The task then calls the circulator subtask at 1812. The circulator subtask is also called if the "LINE DISCONNECT ABORT FLAG" is not set, or there is no line current interruption.

The circulator subtask, illustrated in FIG. 27, is entered at 1820. Basically, the circulator subtask causes various other tasks to be executed in a predetermined order and with a predetermined frequency. A circulator counter is incremented at 1822 and a check is made at 1824 to determine if the circulator counter is equal to five. If so, the circulator counter is reset to one at 1826. The circulator thus respectively counts from one to five. If the circulator counter is less than five, a determination is made at 1828 whether the count is equal to two. If so, the ring detection subtask is called at 1830. If the count is not two, a check is made at 1832 to determine if the circulator counter is equal to four and, if so, the dial pulse and hook switch detection subtask is called at 1834. If the circulator counter is one or three, the local tone generation subtask is called at 1836. The circulator subtask thus calls the local tone generation subtask on alternate executions of the task with the ring detection subtask and the dial pulse and hook switch detecting subtasks being alternately called between each calling of the local tone generation subtask.

The ring detection subtask, called at 1830 of FIG. 27, is illustrated in FIG. 28. This subtask, which is entered at 1840, performs a debouncing function on the signal received from the ring detector (FIG. 2). The determination is first made at 1842 whether ringing has been present for at least one hundred milliseconds. This prevents erroneous ring detection caused by "dial-tap." If so, a flag is set at 1844 to indicate that a ring has been detected. If the ringing has not been present for at least one hundred milliseconds or after the flag has been set at 1844, a check is made at 1846 to determine if ringing has been absent for at least 1.5 seconds. The 1.5 second timing ensures that the ring flag will stay set until the true end of each "ring on" cycle. If so, a flag is set at 1848 to indicate that a ring has not been detected and the shift register subtask is then called at 1850. If the ringing has not been absent for at least 1.5 seconds, the shift register subtask in immediately called. Thus, before the shift register subtask is called at 1850, the ring indication flag remains set only if ringing has been present for at least 100 milliseconds and it has not been absent for more than 1.5 seconds.

The shift register subtask is illustrated in FIG. 29. This subtask is used to update the light emitting diode and dual tone multifrequency shift registers 640, 332, respectively (FIG. 3). The shift register subtask is entered at 1860 and a check is made at 1862 to determine if any of the operating modes have changed thus necessitating a change in the light emitting diodes on the panel of the control system. If the modes have remained the same, a determination is made at 1864 whether the battery status has changed. If the battery voltage level is the same as it previously was during execution of the shift register subtask, a check is made of the use status at 1866 to see if the function performed by the control system has changed since the previous execution of the task If the use status remains the same, a check is made at 1868 to determine if there has been any change in the dual tone multifrequency tone currently being generated by the control unit. If not, the current values for the above-described variables are saved at 1870 and the dual tone multifrequency detection subtask is called at 1872.

The above described execution of the shift register subtask presumes that no change in the various items of information have occurred. If any of the modes have changed, or if the battery status has changed, or if the use status has changed, the new data values are output to the LED shift register at 1874. If there has been a change in the dual tone multifrequency tone, the new value of DTMF tone is sent to the DTMF shift register at 1876.

The dual tone multifrequency detection subtask illustrated in FIG. 30 is used to determine the number corresponding to a given DTMF dialing tone. The task is entered at 1880 and a determination is made at 1882 as to whether a new dialing key has been pressed. If so, the identity of the key is saved at 1884. If a new key has not been pressed, the return from timer interrupt subtask is called at 1886.

Figure 31:
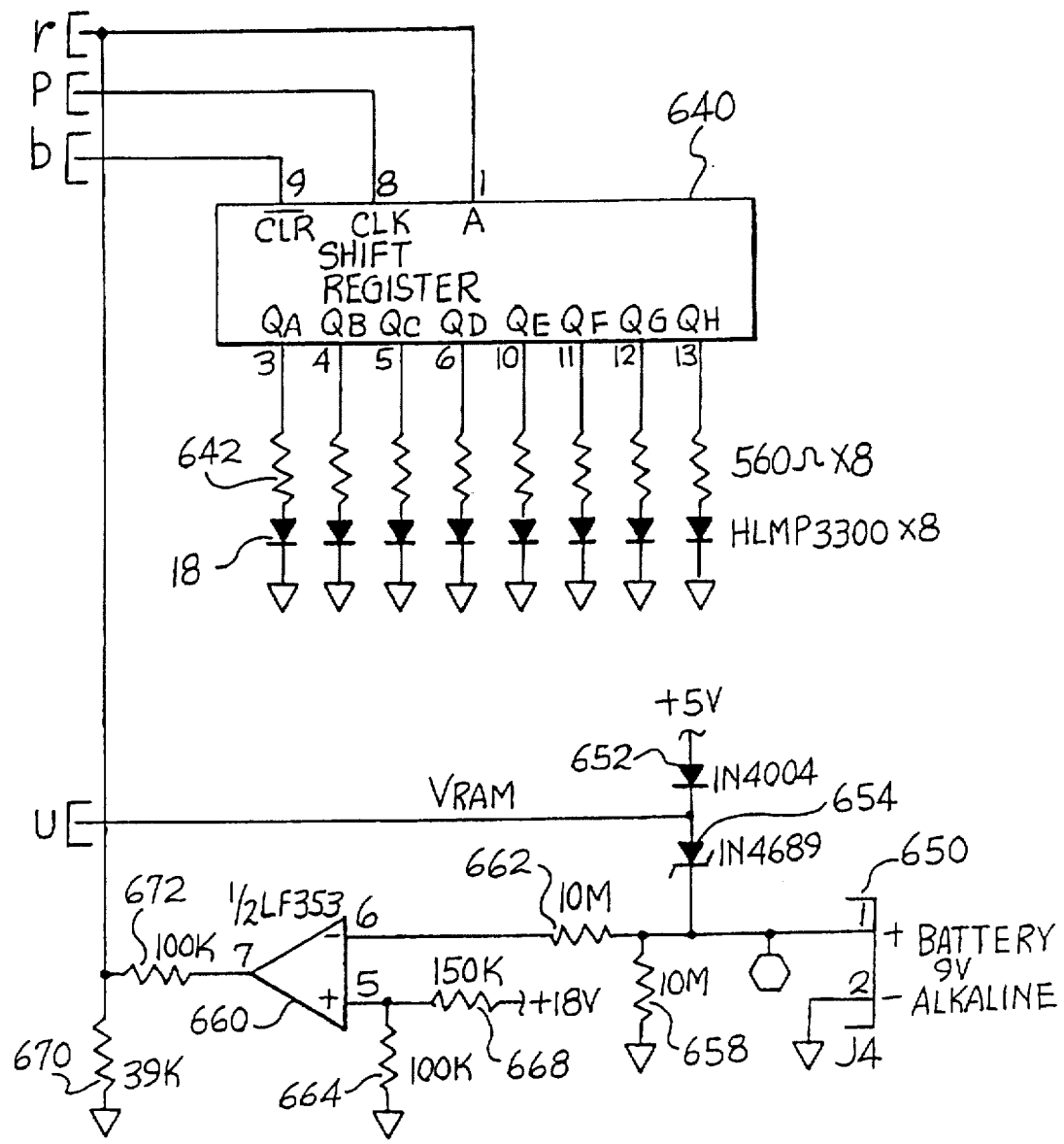

The return from timer interrupt subtask, called at 1886 of FIG. 30, is illustrated in FIG. 31. After the task is entered at 1890, a determination is made at 1892 whether the 500 microsecond timer has exceeded 500 microseconds during service of the interrupt. If so, the interrupt timer value is adjusted at 1894 before the supervisory tone detection subtask is called at 1896. If servicing the interrupt has not taken 500 microseconds, the task returns at 1898 to the main task being executed when the timer interrupt occurred. Adjusting the timer value at 1894 in the event that the timer interrupt has taken longer than 500 microseconds to service, ensures the next interrupt will occur at the proper time.

The local tone generation subtask, illustrated in FIG. 32, is entered at 1900. The local tone generation subtask, as the name implies, generates the supervisory tones for the local station. The first portion of the task generates a dial tone until dialing by the local station or detection of a ring signal applied to the local station occurs. Accordingly, at 1902 a check is made to see if a flag has been set to generate a local dial tone. If so, the CPU 34 outputs 350 Hz and 440 Hz signals on its appropriate output ports at 1904 to generate the dial tone from the local tone and current generator 60 (FIG. 2). A check is then made at 1906 to determine if a local current interruption occurs as the user generates a dial pulse by dialing with rotary dialing equipment. If no dial pulses have been generated, a check is made at 1908 to determine if a dual tone multifrequency key has been pressed by the user. If no DTMF key is detected, a check is made at 1910 to determine if a ringing signal is being applied to the local station If not, the task returns to 1904 to continue generating the dial tone The task thus remains in a loop 1904–1910 until dialing or receipt of a ring signal occurs When any of these events occurs, the task branches to 1912 where the "GENERATE DIAL TONE" flag is cleared.

The lower portion of the local tone generation subtask generates the busy signal for the local station. A busy signal consists of a tone of a predetermined frequency operated in a 50% duty cycle of one-half second off and one-half second on. In the local tone generation subtask, the off-time and on-time durations are monitored by respective off-cycle and on-cycle timers The task first checks at 1914 to determine if a flag has been set to generate the local busy signal If so, the task checks the status of the off-cycle timer at 1916 to determine if the busy signal is in the off cycle. If not, the status of the on-cycle timer is checked at 1918 and if the on-cycle timer is not running either, a check is made at 1920 to determine if the on-cycle timer was running during the previous execution of the local tone generation subtask. If the on-cycle timer was previously running but now has timed out, the off-cycle timer is started at 1922 and the update timers subtask is called at 1924. If the on-cycle timer is running, thereby indicating that the busy signal is in the on portion of the cycle, the CPU 32 applies a signal of an appropriate frequency to the local tone and current generator (FIG. 2) at 1926 to generate the busy signal. If the on-cycle timer was found at 1918 to be not running, nor was the on-cycle timer running during the previous execution of the task as detected at 1920, the on-cycle timer is started at 1928 to generate the busy signal on the subsequent execution of the local tone generation subtask. In summary, before calling the update timer subtask at 1924, the status of the on and off cycle timers are checked and started at the appropriate intervals and the busy signal tone is generated during the on cycle.

Figure 33:
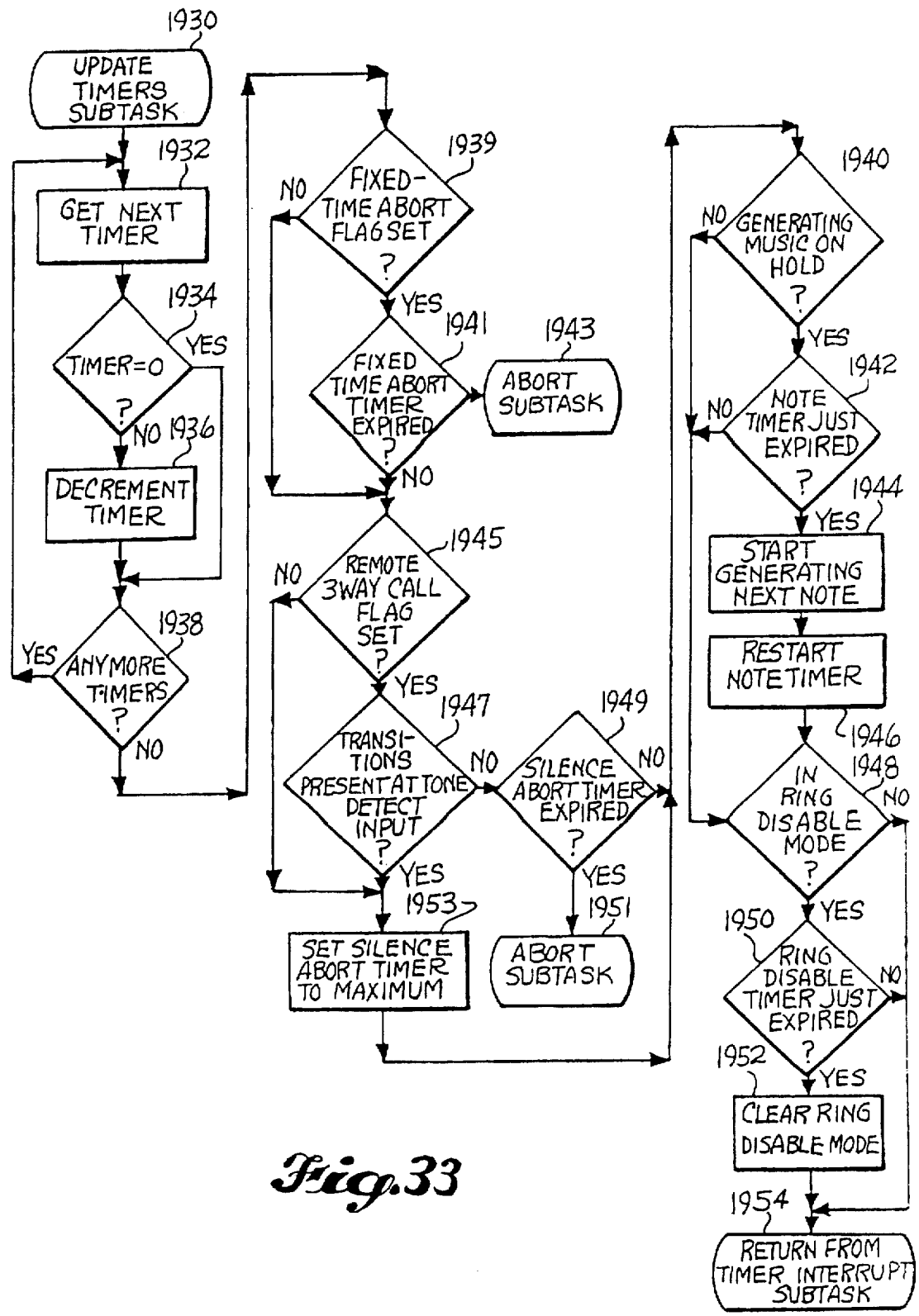

The update timer subtask is entered at 1930 as illustrated in FIG. 33. This task updates all of the software timers such as the off-cycle timer, the on-cycle timer, the ring disable timer, the auto retry timers, page delay timers, etc. The next timer to be updated is accessed at 1932 and a check is made at 1934 to determine if the timer is already at a zero value If not, the timer's value is decremented at 1936 and a check is made at to determine if any more timers need be accessed. If so, the task returns to 1932 When the last timer has been accessed, a determination is made at 1939 as to whether the "FIXED-TIME-ABORT" flag is set. If not, the task progresses to 1945. If it is set at 1939, then the task determines whether the fixed time abort timer has expired at 1941, and if so the task enters the ABORT subtask at 1943. If the fixed time abort timer has not expired, or if the "FIXED-TIME-ABORT" flag was not set, then the task progresses to 1945, and determines whether the "REMOTE-3-WAY-CALL" flag is set, indicating the "MONEY-SAVER" feature is being used. If so, then the task checks at 1947 for transitions at the tone detect input indicating voice is present. If voice is present, or if the "REMOTE-3-WAY-CALL" flag was not set, then the task progresses to 1953 where the SILENCE ABORT TIMER is set to its maximum value, before progressing to 1940. If voice is not present, as detected at 1947, then the task progresses to 1949, to determine if the SILENCE ABORT TIME has expired. If it has expired, indicating a pre-determined amount of time without conversation, then the abort subtask is called at 1951. Otherwise, if the SILENCE ABORT TIMER has not expired, then the task progresses to 1940. A check is made at 1940 to see if the music on hold feature has been called for.

If so, a check is made at 1942 to determine if the timer for the music on hold feature has just expired. If so, the next note of the music is generated at 1944 and a timer keeping track of the duration of the note is restarted at 1946. If music on hold is not being generated or after the note timer has been restarted at 1946, a check is made at 1948 to see if the ring disable mode has been selected. If so, the task examines the status of the ring disable timer at 1950 to determine if the ring disable timer has expired since the previous execution of the update timer subtask. If so, the ring disable mode is cleared at 1952 and the return from timer interrupt subtask is called at 1954. The return from timer interrupt subtask is also called at 1954 if the ring disable mode has not been selected or if the ring disable timer has not expired since the previous execution of the task.

Figure 34:
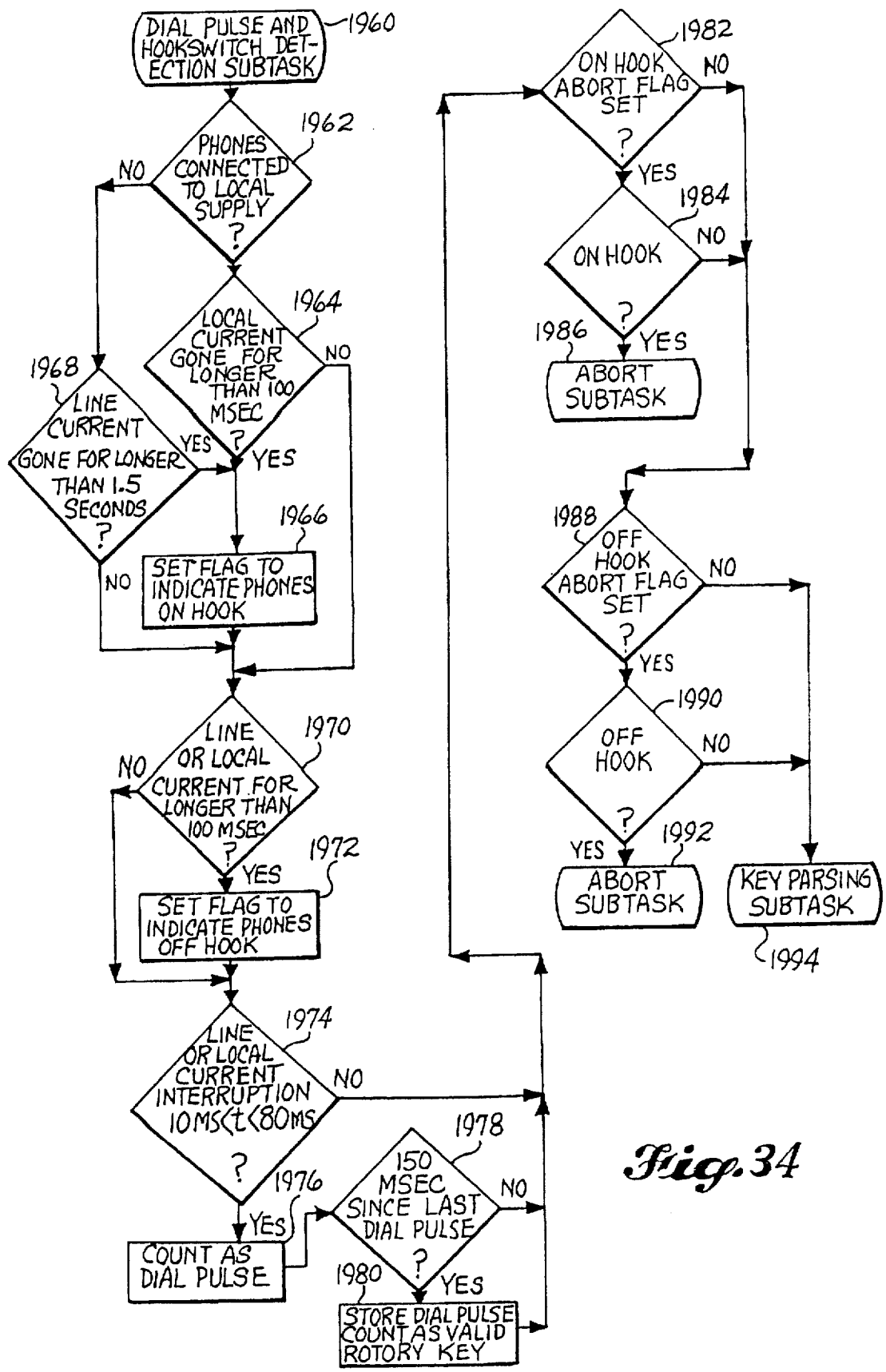

The dial pulse and hook switch detections subtask illustrated in FIG. 34 measures current interruptions and determines if the local station is performing a rotary dialing function or has gone off-hook or on-hook. The task is entered at 1960 and a check is made at 1962 to determine if the local station is connected to the local tone and current generator or to the trunk lines. This check is necessary to determine from what source a current interruption should be monitored. The local station is connected to the local tone and current generator, a check is made at 1964 to determine if the local current has been absent for longer than 100 milliseconds in order to perform a debounce function. If the current has been gone for longer than 100 milliseconds, a flag is set at 1966 to indicate that the local station is on-hook If the subtask determines at 1962 that the local station is connected to the telephone line, the output of the line current detector (FIG. 2) is checked at 1968 to determine if the line current has been absent for more than 1.5 seconds If so, the on-hook flag is once again set at 1966.

After the on-hook flag is set at 1966 or a determination is made at 1968 that line current has not been absent for more than 1.5 seconds, the subtask checks at 1970 to see if the line or local current has been present for longer than 100 milliseconds If so, a flag is set at 1972 to indicate that the local station is off-hook If line or local current is present for more than 100 milliseconds, a check is made at 1974 to see if the line current interruption had a duration of more than 10 milliseconds but less than 80 milliseconds Insofar as a line current interruption of between 10 and 80 milliseconds would occur as a result of a dial pulse, detection of a current interruption in this range causes a dial pulse to be counted at 1976. Insofar as the interdigit time between digits is normally greater than 150 milliseconds, a check is then made at 1978 to determine if 150 milliseconds has elapsed since detection of the previous dial pulse If so, the dial pulse count is stored as a valid rotary dial digit at 1980.

If the local current interruption does not fall within any of the ranges recognizable as being on-hook, off-hook or a dial pulse, the subtask proceeds to 1982 where a check is made of the "ON-HOOK ABORT" flag to determine if it has been set. If so, the subtask checks at 1984 to determine if the local station is currently on-hook and, if so, calls the "ABORT" subtask at 1986. If the "ON-HOOK ABORT" flag has not been set or the flag has been set but the local station is off-hook, a check is made at 1988 to determine if the "OFF-HOOK ABORT" flag has been set. If so, the task checks at 1990 to determine if the local station is off-hook. If so, the abort subtask is called at 1992. If the "OFF-HOOK ABORT" flag is not set or the flag is set but the local station is not off-hook, the key parsing subtask is called at 1994.

Figure 35C:
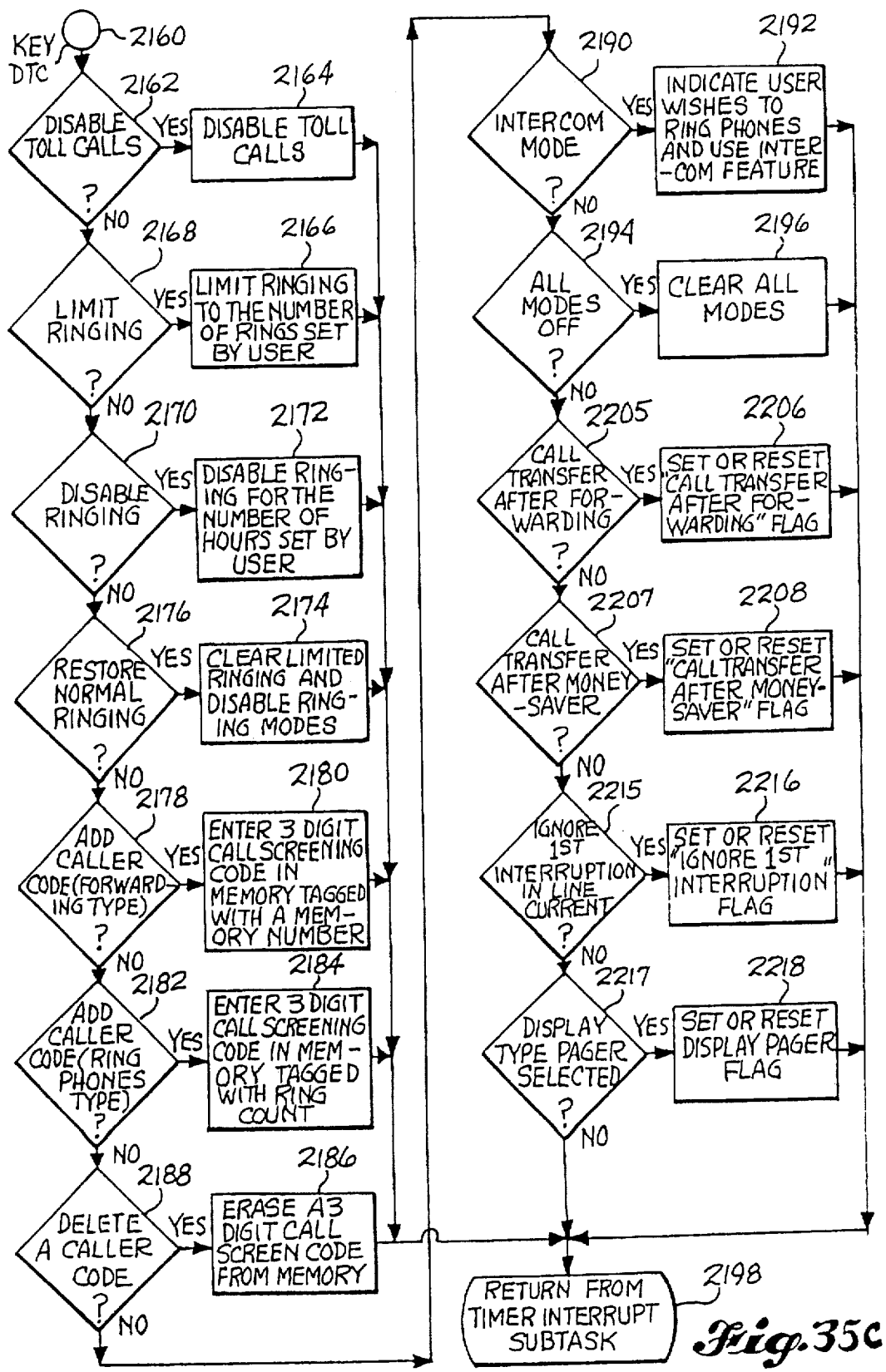

The key parsing task, illustrated in FIG. 35, decodes the sequence of dialing pulses or tones generated by the local station or from a remote location over the telephone lines. The key parting subtask is entered at 2000 and a check is first made at 2002 to determine if a flag has been set at 1564 of FIG. 19 to enable parsing of user key strokes. If so, a decision is made at 2004 whether the key currently being dialed is a different key than was being dialed during the previous execution of the key parsing subtask. If not, the task returns at 2006 to the main task that was being executed when the timer interrupt subtask occurred. Similarly, if the "KEY PARSING" flag has not been set, the return from timer interrupt subtask is called.

Assuming that the "KEY PARSING" flag has been set and a new key has been entered, a check is made at 2008 to determine if the key sequence is valid. If the key sequence is not a sequence that can be validly dialed by the local station, the subtask checks at 2010 to determine if a remote task is being performed. If so, a further check is made at 2012 to determine if the sequence of digits ended in "the # symbol". If the sequence of digits does end in the "#" symbol, the user is dialing a remote station from a remote location in accordance with the money saving feature described above. Accordingly, the digits dialed by the user are loaded into the dialing buffer at 2014 and the subtask then returns to the main task at 2000. Similarly, if the key sequence is not valid and the control system is not operating in a remote task mode, the digits so dialed are loaded into the dialing buffer and the task returns through 2006.

If the key sequence dialed by the user does match a valid sequence, a check is made at 2016 to determine if the key sequence has been completed, i.e., the entire number has been dialed. If not, the task returns through 2006 to the main task previously being executed. As each digit of the sequence is dialed, a return through 2006 to the main task occurs until the key sequence has been completed when the entire number has been dialed. The subtask then proceeds to check each of several functions that can potentially be designated by the key sequence. Accordingly, the task checks at 2018 to see if a remote access code is being programmed If so, a further check is made at 2020 to determine if the key designating a programming function has been pressed during the last fifteen minutes in order to ensure that the access code does not program the control system unless the program switch has previously been pressed. If the programming switch has not previously been pressed, an error tone is generated at 2022 which is applied to the local station. The subtask then returns through 2006 to the main task. If, however, he program switch was pressed before the remote access code was entered, a new remote access code is entered into the CPU memory at 2024.

In a similar manner, a check is made at 2026 to determine if a new remote ring count is being entered and, if so, the new ring count is entered at 2028 The tone dialing mode is set at 2030 if tone dialing is being programmed at 2032 and pulse dialing is set at 2034 if this dialing mode is being programmed at 2036 A desk or wall mount mode is detected at 2038 and set at 2040. A toll access code to allow selective use of long distance dialing is detected at 2042 and entered at 2044. In the event that the user desires to delete all caller codes from memory, an appropriate key sequence is detected at 2046 thereby causing the codes to be cleared from memory at 2048 The control unit's memory can be set to default values at 2050 if this request is detected at 2052 If the user enters a key sequence to program the answering machine delay corresponding to the length of the answering machine message, the key sequence is recognized at 2054 and the new delay is entered into memory at 2056. Similarly, a key sequence to program the page alert delay is recognized at 2058 and the delay is programmed at 2066. In each case, the programming function must be preceded by pressing the key for the program switch and this check is made at a step indicated generally at 2068.

Finally, if the key sequence does not correspond to any of the preceding programming functions, a check is made at 2070 to determine if there has been an error in entering the key sequence. If there has been an error, the error tone is generated at 2022 and the subtask returns to the main task through 2006. Otherwise, the task progresses to a key memory (KEY MEM) portion at 2072. The subtask will also return to the main task after the programming request has been implemented through 2074.

The key memory portion of the key parsing subtask is entered at 2080. A key sequence designating a memory dialing function is detected at 2082 to transfer the stored number to the dialing buffer at 2084. A telephone number is stored in memory at 2086 upon detection of that programming function at 2088. In the event that the user wishes to recall a telephone number from the central office memory dialing, the corresponding key sequence is detected at 2090 and the function is implemented at 2092. Similarly, in the event that the user wishes to program a central office memory with a telephone number, the appropriate key sequence is detected at 2094 and the page alert mode on or off is detected at 2098 and the page alert mode is toggled from one to off or vice versa at 2100. At 2102, a key sequence to select the call forwarding mode is detected and the call forwarding mode is turned on at 2104. Similarly, a key sequence for the call screening mode with normal ringing is detected at 2106 and this mode is turned on at 2108. A key sequence to select call screening with a selected number of rings, i.e., to allow the call screening code to designate the number of rings, is detected at 2110 and this function is implemented at 2112. A key sequence to turn the answering machine on and off is detected at 2114 and the answering machine is switched on or off at 2116. After any of the programming functions 2084–2116 have been performed, the subtask returns through 2118 to the main task that was being interrupted when the interrupt subtask commenced.

In the event that the key sequence does not designate any of the foregoing programming functions, additional functions are sequentially checked. Thus, the subtask checks at 2120 to determine if the remote mode should be switched on or off and, if the key sequence selects this programming function, the remote mode is switched on or off at 2122. A last number redial is selected at 2124 and the telephone number in the dialing buffer is retained at 2126. An attempt to redial a busy or unanswered number occurs at 2128 if the key sequence to perform this function is detected at 2130. An incoming call is placed on hold at 2132 if the key stroke for this function is detected at 2134. In the event that the user wishes to enable or disable the memory storage function, an appropriate key sequence is dialed and detected at 2136 and the memory storage feature is switched either on or off at 2138. The store memory mode is selected at 2140 and, if this mode is selected, the current operating modes are stored in memory at 2142. The current mode stored in memory can be recalled at 2144 if that programming function is detected at 2146. Combinations of operating modes, such as call forwarding, page alert, answering machine and simulated call screening, can also be stored in memory These combinations are identified by respective codes that can be dialed locally from the local station or remotely from an external location to select predetermined combinations of operating modes. This feature makes the operation of the system simpler and faster.

The control system can be programmed to allow unlimited toll calls at 2148 by dialing a key sequence corresponding to this programming function which is detected at 2150. Similarly, the user can dial a key sequence which is detected at 2152 to enable the control system to dial a single toll call at 2154. After any of the foregoing programming functions 2122–2154 have been completed, the subtask returns to the main task through 2156.

If the key sequence dialed by the user is not recognized in any of the foregoing selection steps, the subtask proceeds to the KEY DTC portion of the subtask at 2158. This portion, which is entered at 2160 first detects at 2162 whether the user is attempting to prevent the control system from making toll calls and, if so, the toll call feature is disabled at 2164. Local station ringing can be limited to a predetermined number of rings at 2166 if the key sequence corresponding to that function is detected at 2168 Similarly, a key sequence to disable ringing is detected at 2170 and ringing of the local station for a predetermined time is then prevented at 2172. This disable ringing feature is cleared at 2174 if the corresponding key sequence is detected at 2176. In the event that the user wishes to enter a call screening code associated with a memory dialing location, an appropriate key sequence is dialed and detected at 2178 so that the three digit call screening code is tagged with a memory number at 2180. Similarly, a three-digit, call-screening code to designate a predetermined ringing cadence of the local station is detected at 2182 and implemented at 2184. A three-digit, call-screening code can be deleted from memory at 2186 if a key sequence requesting this programming function is detected at 2188. The intercom mode, allowing the user to ring the local station a predetermined number of times, is detected at 2190 and the control system is programmed to perform this function at 2192. The user is able to dial a key sequence to turn all modes off. This key sequence is detected at 2194 to clear all operating modes at 2196. A "CALL-TRANSFER-AFTER-FORWARDING" flag may be set or reset at 2206 if so selected by an appropriate key sequence at 2205. A "CALL-TRANSFER-AFTER-MONEY-SAVER" flag may be set or reset at 2208 if so selected by an appropriate key sequence at 2207. An "IGNORE-FIRST-INTERRUPTION" flag may be set at 2216 if so selected by an appropriate key sequence at 2215 A "DISPLAY-PAGER" flag may be set or reset at 2218, if so selected by an appropriate key sequence at 2217. After any of the programming functions 2164–2196, 2205–2208, or 2215–2218 have been implemented, the subtask returns to the main task previously being executed through 2198.

The abort task, entered at 2200, is illustrated in FIG. 36 The abort subtask causes an immediate return from the interrupt being executed to the on-hook task regardless of what task was being executed when the interrupt started The subtask consists of a single step in which the stack in the CPU 34 designating the next main task to be executed is modified so that the next task that is, in fact, executed is the on-hook task illustrated in FIG. 6 The subtask then returns to the on-hook task through 2204 since that is the main task that the stack designates for returning from the interrupt.

All of the proceeding interrupt subtasks were subtasks that were initiated by the interrupt timer every 500 microseconds. As mentioned above, the power fail interrupt subtask, illustrated in FIG. 37, is executed when the control system detects the removal of power from the control system in a reset condition. The power fail interrupt task is entered at 2210 and return to the main task occurs through 2112 if the power fail condition ceases within 500 microseconds. In the interim, the task implements a 500 microsecond pause at 2214 to suspend execution of any program for sufficient time to allow the CPU to reset.

Figure 38B:
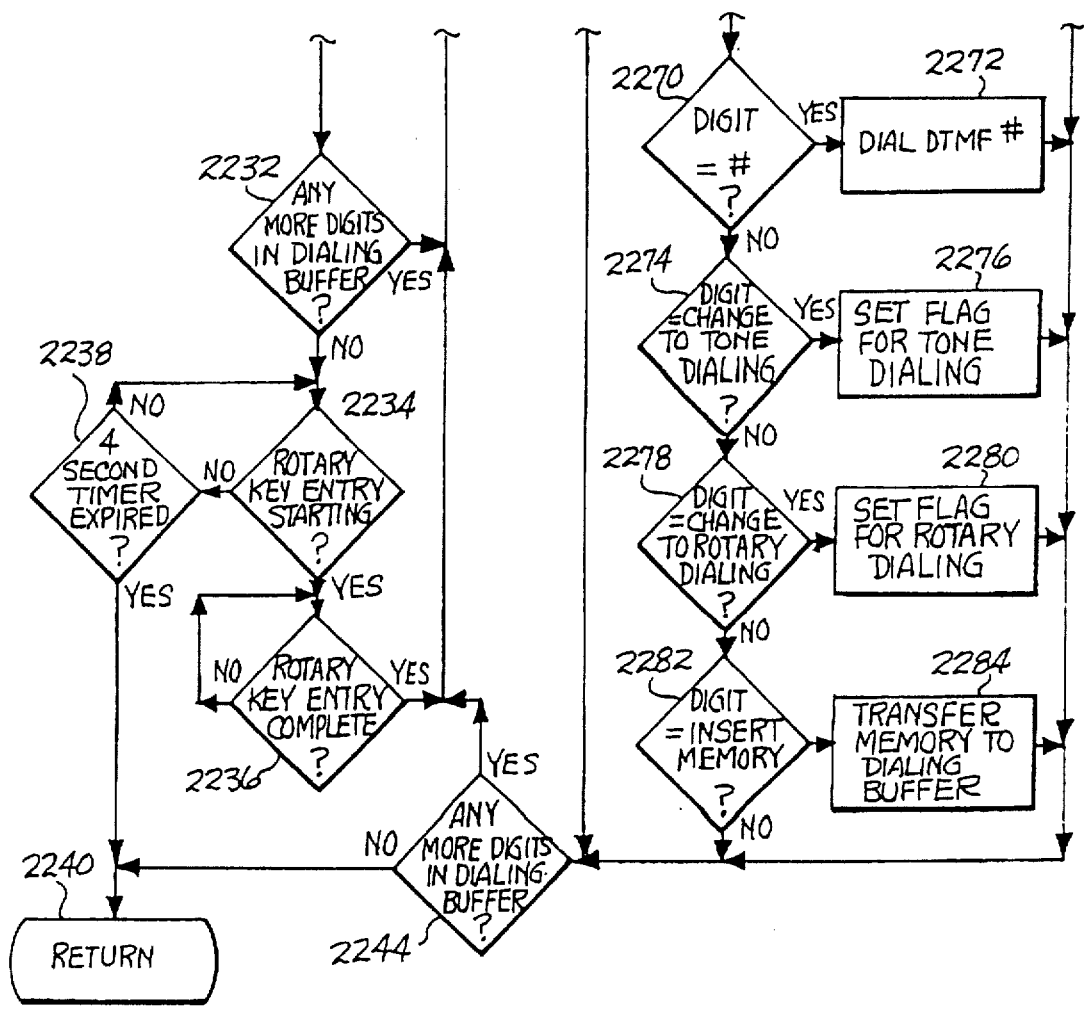

The dialing task illustrated in FIG. 38 causes the control system to dial telephone numbers on the telephone lines in performing a number of operating functions. The task is entered at 2220 and a 4-second timer is started at 222. A digit is then retrieved from the dialing buffer at 224 and a determination is made at 2226 whether the retrieved digit is a numeric digit from 0–9. If so, the task checks at 2228 to see if a flag designating that the digit is to be dialed with dial pulses is set. If so, current interruptions occur for each dial pulse with the number of dial pulses identifying the digit. A check is then made at 2232 to determine if there are any more digits in the dialing buffer If more digits are to be dialed, the task returns to 2222 to restart the 4-second timer and repeat the above-described steps. When all of the digits have been dialed in dial pulse format, a check is made at 2234 to determine if the user is entering a new dial pulsed digit. If so, the task remains in a loop at 2236 until the rotary dialing is completed and then returns to 2222 to restart the 4-second timer. If the task determines at 2234 that a new digit has not started, the status of the 4-second timer is checked at 2248. If the four second period has not elapsed since the timer was started, a check of the dialing progress is once again made at 2234. If, within the four second period after the timer is started at 2222 rotary dialing has not commenced, the task returns at 2240 to the main task that previously called the dialing task. When the rotary digit entered by the user is complete as detected at 2236, the 4-second timer will once again be started at 2222. However, when there are no more digits in the dialing buffer, at some point rotary key entry will not be started at 2234 and the four second period will have elapsed as detected at 2238 so that the task will return through 2240.

The foregoing explanation assumes that the digit to be dialed was a numeric, digit and it was to be dialed in rotary dialing format In the event that the rotary dial flag or a rotary dial input is not detected at 2228, the task branches to 2242 to cause the dual tone multifrequency generator to dial the digit in the appropriate dual tone multifrequency signal. A check is then made at 2244 to determine if there are any more digits in the dialing buffer If so, the task returns to 2222 to start the 4-second timer and the next numeric digit is dialed with the appropriate dual tone multifrequency signal until all of the digits in the dialing buffer have been dialed. At that point, the task returns through 2240.

In the event that the digit in the dialing buffer is not a numeric digit, the task branches to 2250 where a check is made to determine if the digit in the dialing buffer represents a hook flash. If so, a hook flash is generated at 2252 by momentarily placing the control system on-hook. In certain instances, a pause must occur during the dialing of a number such as, for example, to wait for a dial tone when obtaining an outside line on a PBX system. A digit requesting a two-second pause is identified at 2254 and the pause is implemented at 2256. A digit can also specify a request to wait for a dial tone and this digit is detected at 2258 with the system remaining in a loop at 2260 until the dial tone is detected. Similarly, a digit detected at 2262 can cause the task to remain in a loop at 2264 until any tone is detected A "*" is detected at 2266 in order to cause the dual-tone multifrequency generator to generate the DTMF signal corresponding to a "*" at 2268. Similarly, the "#" recognized at 2270 causes the DTMF signal for the "#" to be generated at 2272. A digit can also be dialed to set a flag to specify that subsequent numbers should be dialed with tone dialing. This digit is detected at 2274 and the flag is then set at 2276. Similarly, a predetermined digit, detected at 2278 causes the rotary dialing flag to be set at 2280. This flag is detected at 2228 to cause dialing to occur using dial pulses. Finally, a digit, recognized at 2282, may be used to transfer a telephone number stored in memory to the dialing buffer. This function is accomplished at 2284. In this manner, several telephone numbers can be linked to each other and by using the appropriate function codes portions of the number can be dialed with dial pulses and the other portions dialed with DTMF signals. This is useful, for instance, when using alternative long distance carriers where a local access number, a customer identification code and a telephone number must all be dialed, possibly in different formats and in response to different supervisory signals The memory linking feature allows all of the foregoing operations to occur automatically by dialing a relatively few digits, typically two or three.

Although the inventive features described herein have been explained in the context of an add-on unit for a single line residential or business telephone, it will be understood that the invention is not limited to this concept. For example, the inventive system could be used as an integral part of a radio paging terminal or central office exchange to provide some or all of the features of the control system described herein to a large number of subscribers.

We claim:

1. A system for reporting to a central station information associated with an apparatus and identifying information relating to a purchaser of the apparatus, the apparatus having a port for connection to a communications circuit, said system comprising:

inhibit means for rendering said apparatus partially inoperable until at least some of the identifying information relating to the purchaser has been entered into said apparatus;

storage means for storing the identifying information relating to the purchaser; and communication means for automatically causing said apparatus to contact said central station via said communications circuit and, after said central station has responded to said contact, outputting the identifying information relating to the purchaser and the information associated with the apparatus thereby informing the central station of the information associated with the apparatus and the identifying information relating to a purchaser of the apparatus.

2. The system of claim 1 wherein said identifying information relating to the purchaser comprises a network address associated with the purchaser.

3. The system of claim 1 wherein said apparatus has a serial number and said identifying information associated with the apparatus comprises the serial number of the apparatus.

4. The system of claim 1 wherein said communication means contacts said central station by dialing a telephone number associated with said central station.

5. The system of claim 1 wherein said apparatus is a telephone switching control device and wherein said port is for connection to a Public Switched Telephone Network.

6. The system of claim 1 wherein said communication means contacts said central station by contacting a network address associated with said central station.

7. The apparatus of claim 1 wherein said inhibit means is subsequently disabled whereby said apparatus is fully operational during subsequent uses thereof without a need to re-enter said identifying information.

8. A method of obtaining a list of customers who have acquired a product comprising the steps of:
(a) allowing a customer to enter identifying information after acquiring the product into an apparatus associated with the product, said apparatus and said product having, in combination, a CPU and a port for connection to a communications network; and
(b) in response to the entry of said identifying information, contacting an address accessible via said communications network and transferring said identifying information via said port.

9. The method of claim 8 wherein said identifying information comprises a network address of the customer.

10. The method of claim 9 wherein the step of transferring said identifying information via said port further includes transferring additional information associated with said product.

11. The method of claim 10 wherein said additional information comprises a serial number of said product.

12. The method of claim 10 wherein said identifying information comprises a telephone number of the customer.

13. The method of claim 12 wherein said additional information comprises a serial number of said product.

14. A product which assists in collecting information at a central station regarding an acquiring party of the product after the product has been acquired by the party, said product, in cooperation with a CPU, (i) being responsive to an entry of information pertaining to the acquiring party; (ii) retrieving a programmed network address of said central station; (iii) connecting to said network address; and (iv) transferring said information pertaining to the acquiring party of the product to said central station.

15. The product of claim 14 wherein the product, in cooperation with the CPU, also transfers to said central station additional information regarding the product.

16. The product of claim 14 wherein said network address is a telephone number and said product connects to said network address by placing a telephone call thereto, and after said telephone call is answered, said product transfers said information pertaining to the acquiring party of the product to said central station.

17. The product of claim 16 wherein the telephone call is placed to said telephone number automatically after the entry of information pertaining to the identity of the acquiring party of said product.

18. A system for reporting to a central station identifying information associated with a person or entity who previously acquired an apparatus, the apparatus having a port for connection to a telephone line, said apparatus being initially at least partially disabled, the apparatus being programmed to (i) detect the entry of the identifying information from a user, the user supplying information regarding the person or entity who previously acquired the apparatus and, after receipt of said identifying information, (ii) initiate a network connection to the central station, (iii) report the entered identifying information to the central station and (iv) further enable said apparatus.

19. The system of claim 18 wherein the network connection to the central station is initiated by placing a telephone call to said central station.

20. The system of claim 19 wherein said identifying information comprises a telephone number of the user.

21. A system for collecting a customer list at a station, said system identifying for a first time customers who have acquired certain products, said system comprising:
a central station which is accessible from a communications network at an address; and
remote portions of the system incorporated in said products to permit each product to cooperate with the system, said portions enabling each product to (i) allow a customer, who has previously acquired said product, to input certain information regarding the customer into a device operatively associated with the product, (ii) initiate at least an indirect network connection with the station, (iii) report, for a first time the information to the station via said network connection;
said central station (a) responding to connections from a plurality of products, and (b) collecting said information from each product to establish said customer list.

22. The system of claim 21 for collecting a customer list at a station, wherein each product reports, for a first time, data regarding the product along with said information regarding the customer, thereby establishing new knowledge associating each customer with the product they acquired.

23. The system of claim 22 wherein said information regarding the customer comprises a telephone number of the customer and said communications network comprises a telephone system, and wherein the product initiates said network connection by making a telephone call to the station.

24. The system of claim 23 wherein said data comprises a serial number associated with the product.

25. Software running on a processor which is operatively coupled with an interface to a communications network, said software (i) allowing entry, by a user, of information regarding a party who acquired said software, (ii) generating data associating said party with said software, and (iii) transmitting at least some of the data associating said party with said software during a use of said software to a preprogrammed network address via said interface, said software, during subsequent use thereof, functioning without a necessity of transmitting data associating the party with the software to said network address.

26. The software of claim 25 wherein the software is programmed to be at least partially inoperative until said information is in fact entered.

27. The software of claim 26 wherein said information comprises a network address of the party.

28. The software of claim 25 wherein said preprogrammed network address is a telephone number.

29. The software of claim 25 wherein said transmitting to a preprogrammed network address via said interface is performed automatically.

30. The software of claim 25 wherein said software is at least partially inoperative until the information has been entered and data has been transmitted to said network address, and thereafter said software is normally operable.

31. An apparatus comprising:
   (a) a CPU;
   (b) a telephone interface for connection with a switched telephone network, said interface being operatively controlled by said CPU under control of a program; and
   (c) means for rendering said apparatus at least partially inoperable until data is entered by a user of said apparatus, said apparatus thereafter being normally useable by either said user or by other users without the need to enter further data;
   (d) said program including means for collecting the data entered by said user and for communicating the data to a predefined party via said telephone interface.

32. The apparatus of claim 31 wherein said means for rendering said apparatus at least partially inoperable provides additional features to said user after the data is collected.

33. A method of reporting to a central station receipt of a product acquired by a user thereof, said method comprising:
   (a) allowing the user to enter identifying information regarding the user via a data entry device after the user has acquired said product;
   (b) after the user has entered said identifying information, automatically contacting the central station via a communications network and transferring said identifying information to said central station via said communication network; and
   (c) recording, at said central station, information reflecting that the user previously acquired said product and made an initial use thereof.

34. The method of claim 33 wherein said identifying information comprises a network address of the user.

35. The method of claim 34 wherein said network address comprises a telephone number of the user.

36. The method of claim 33 wherein the step of transferring said identifying information via said network further includes transferring additional identifying information associated with said product.

37. The method of claim 36 wherein said additional identifying information comprises a serial number of said product.

38. The method of claim 36 wherein said identifying information comprises a network address of the user.

39. The method of claim 38 wherein said network address comprises a telephone number of the user.

40. A method for initially registering with a central station a product previously acquired by a user thereof, said method comprising:
   (a) allowing the user initially using a product previously acquired by the user to enter identifying information regarding the user via a data entry device;
   (b) contacting the central station via a communications network;
   (c) transferring said identifying information to said central station via said communication network; and
   (d) initially registering with the central station the identifying information regarding the user and initially associating said identifying information with said product.

41. The method of claim 40 wherein said identifying information comprises a network address of the user.

42. The method of claim 41 wherein said network address comprises a telephone number of the user.

43. The method of claim 41 wherein the step of transferring said identifying information via said network further includes transferring additional identifying information associated with said product.

44. The method of claim 43 wherein said additional identifying information comprises a serial number of said product.

45. A method for initially registering with a central station a product previously acquired by a user thereof, said method comprising:
   (a) allowing the user to enter identifying information regarding the user by using a data entry device;
   (b) in response to use of the product, contacting the central station via a communications network and transferring said identifying information to said central station via said communications network; and
   (c) receiving the identifying information regarding the user at the central station and initially associating the identifying information with said product.

46. The method of claim 45 wherein said identifying information comprises a network address of the user.

47. The method of claim 46 wherein said network address comprises a telephone number of the user.

48. The method of claim 46 wherein the step of transferring said identifying information via said network further includes transferring additional identifying information associated with said product.

49. The method of claim 48 wherein said additional identifying information comprises a serial number of said product.

50. A system for reporting to a central station identifying information associated with an apparatus and identifying information previously unknown at said central station relating to a user of the apparatus, the apparatus having a port for connection to a communications circuit, said system comprising:
   inhibit means for rendering said apparatus partially inoperable until at least some of the identifying information relating to the user has been entered into said apparatus;
   storage means for storing the identifying information relating to the user; and
   communication means for automatically causing said apparatus to contact said central station via said communications circuit and, after said central station has responded to said contact, outputting at least some of the identifying information relating to the user and at least some of the identifying information associated with the apparatus thereby initially associating at the central station the apparatus with the new information outputted relating to the user of the apparatus.

51. The system of claim 50 wherein said identifying information relating to the user comprises a network address associated with the purchaser.

52. The system of claim 50 wherein said apparatus has a serial number and said identifying information associated with the apparatus comprises the serial number of the apparatus.

53. The system of claim 50 wherein said communication means contacts said central station by dialing a telephone number associated with said central station.

54. The system of claim 50 wherein said communication means contacts said central station by contacting a network address associated with said central station.

55. The system of claim 50 wherein said apparatus is a telephone switching control device and wherein said port is for connection to a Public Switched Telephone Network.

56. A system for collecting information regarding an acquiring party of a product, said information being heretofore unknown by a station and being collected at said station, said product, in cooperation with a CPU, (i) being responsive to entered information pertaining to the acquiring party; (ii) retrieving a previously stored network address of said station; (iii) communicating with said station via said network address, and (iv) transferring the entered information to said station.

57. The programmed system of claim 56 wherein the station is contacted automatically after the entry of information pertaining to the identity of the acquiring party of said product.

58. The programmed system of claim 56 wherein the programmed system also transfers to said station additional identifying information regarding the product.

59. A method of collecting information regarding an acquiring party of a product, said information being heretofore unknown by a station and being collected at said station, said method comprising (i) sensing entered information pertaining to the acquiring party; (ii) retrieving a previously stored network address of said station; (iii) communicating with said station via said network address, and (iv) transferring the entered information to said station.

60. A method of obtaining information regarding parties who have acquired a product comprising the steps of:
 (a) allowing an acquiring party to enter identifying information after acquiring the product via a data input device operatively coupled with the product, said product having a CPU and a port for connection to a communications network; and
 (b) contacting an address accessible via said communications network and transferring said identifying information via said port.

61. The method of claim 60 wherein said identifying information comprises a network address of the party.

62. The method of claim 60 wherein the step of transferring said identifying information via said port further includes transferring additional identifying data associated with said product.

63. The method of claim 62 wherein said identifying information comprises a telephone number of the party.

64. The method of claim 63 wherein said additional identifying data comprises a serial number of said product.

65. The method of claim 62 wherein said additional identifying data comprises a serial number of said product.

66. A method for collecting information regarding a party who has previously acquired a product, said information being heretofore unknown by a station and being collected at said station after said party has acquired said product, said product, after being acquired by said party and in cooperation with a CPU, being responsive to entered information pertaining to the acquiring party, said method comprising the steps of retrieving a previously stored network address of said station, communicating with said station via said network address, and transferring at least some of the entered information to said station.

67. The method of claim 66 wherein said network address is a telephone number and wherein the step of communicating with said station occurs via said telephone number.

68. The method of claim 66 wherein the transferring step includes transferring information regarding said product to said station.

69. The method of claim 68 wherein the product has a serial number and wherein the information regarding said product which is transferred to said station includes said serial number of said product.

70. The method of claim 68 wherein the product is rendered initially at least partially disabled until the information pertaining to the acquiring party has been transferred to said station.

71. A method of collecting data, said data including (i) information regarding the identity of the purchaser of a product which has been purchased at a point of purchase and (ii) information regarding the product, said method comprising the steps of:
 (a) inputting information regarding the identity of the purchaser of the product via a data input device operatively associated with said product, the inputting of the information occurring after said product has been removed from said point of purchase and after said product has been associated with said data input device; and
 (b) thereafter transmitting the inputted information regarding the identity of the purchaser of the product and information regarding the product to a data collection station via a communications network.

72. The method of claim 71 wherein said communications network is a switched telephone network and wherein the step of transmitting the inputted information to said data collection station includes dialing a telephone number of said data collection station.

73. The method of claim 71 wherein the product has a serial number and wherein the information regarding said product which is transmitted to said data collection station includes the serial number of said product.

74. The method of claim 71 wherein the product is rendered initially at least partially disabled until the information regarding the identity of the purchaser of the product has been transmitted to said data collection station.

75. A method of making a list which, for a first time, associates data related to acquirers of a product with information relating to the product itself, said method comprising the steps of:
 (a) receiving data relating to one of the acquirers after said one of the acquirers has the product; and
 (b) transmitting at least some of the data relating to said one of the acquirers together with information relating to the product itself to a central station.

76. The method of claim 75 further including the step of at least partially disabling said product until steps (a) and (b) are performed.

77. The method of claim 75 further including the step of at least partially disabling said product until at least step (a) is performed.

78. A product which, in use, receives identifying information regarding its owner after the owner has acquired possession of the product and then reports said identifying information to a central station for updating a customer list.

79. A product as claimed by claim 78 wherein a network address for the central station is incorporated in the product before the product is acquired, and said product reports said identifying information to the central station by making a network connection to said central station using said network address.

80. A product as claimed by claim 79 wherein the network address comprises a telephone number.

81. A product as claimed by claim 78 wherein the product receives the identifying information by to the acquirer inputting information at a data entry device.

82. A product which in use is operatively coupled with an interface to a communications network, said product: (i) allowing entry, by a user, of information regarding a party who acquired said product, (ii) generating data associating said party with said product, and (iii) transmitting at least some of the data associating said party with said product during a use of said product to a preprogrammed network address via said interface, said product, during subsequent uses thereof, functioning without a necessity of transmitting data associating the party with the product to said network address.

83. The product of claim 82 wherein the product is at least partially inoperative until said information has been entered.

84. The product of claim 83 wherein said information comprises a network address of the party.

85. The product of claim 83 wherein said preprogrammed network address is a telephone number, and wherein said transmitting is performed automatically.

86. A software routine to assist in acquisition of customer registration information previously unknown at a central station, said routine when incorporated into a software product which in use is operatively coupled to a communications network enabling said software product to (i) allow a user to enter information regarding a party who previously acquired said software product, (ii) initiate an at least indirect network connection with said station, and (iii) transmit data to said station including at least some of said information regarding said party, said routine thereby providing data whereby said central station can register said party as a customer for a first time.

87. The software routine of claim 86 wherein said data further comprises data regarding the software product.

88. The software routine of claim 87 wherein a function of the routine at least partly disables the software product in which said routine is incorporated until said information is in fact entered.

89. The software routine of claim 87 wherein said information comprises a network address of the party.

90. The software routine of claim 87 wherein said network connection comprises a telephone connection to the central station at a preprogrammed telephone number.

91. The software routine of claim 87 wherein steps (ii) and (iii) are performed automatically after step (i) is completed.

92. The software routine of claim 87 wherein at least until it is communicated to said routine that said information is no longer correct, said routine does not perform steps (i), (ii), and (iii) after they have been completed a first time.

93. A product which assists in acquisition of customer registration information previously unknown at a central station, said product in use being operatively coupled to a communications network and to a data entry device, said product in combination with the network and the data entry device comprising (i) an input mechanism enabling a user to enter information regarding a party who previously acquired said product, (ii) a connection mechanism which initiates at least an indirect network connection with said station, and (iii) a transmission mechanism which transmits data to said station including at least some of said information regarding said party and some data regarding the product, said product thereby providing data whereby said central station can register said party for a first time as having acquired the product.

94. The product of claim 93 wherein at least some functions associated with the product are disabled until said information is in fact entered.

95. The product of claim 94 wherein said network connection is initiated automatically after said information is entered.

96. The product of claim 95 wherein said network connection comprises a telephone connection to a preprogrammed telephone number of the central station.

97. A product which, in use, receives identifying information regarding a purchaser of the product after the purchaser has taken possession of the product and then reports said identifying information regarding the purchaser to a central station for inclusion in a customer list.

98. A product as claimed by claim 97 wherein the product reports said identifying information to the central station by making a network connection to said central station using a preprogrammed network address for said central station.

99. A product as claimed by claim 98 wherein the preprogrammed network address comprises a telephone number.

100. A product as claimed by claim 99 wherein the product is rendered at least partially inoperative until said identifying information is received.

101. A product as claimed by claim 100 wherein, in subsequent use after the identifying information has been received and reported to said central station, product operation does not depend on further input of said identifying information.

102. A product as claimed by claim 98 wherein said preprogrammed network address is incorporated into said product prior to the purchaser taking possession of said product.

103. A product as claimed by claim 97 wherein the product receives the identifying information in response to a user inputting information at a data entry device.

104. A product as claimed by claim 97 wherein said use is an initial use of the product purchased by the purchaser.

105. A product as claimed by claim 104 wherein, in subsequent use, said product functions without reporting said identifying information to said central station.

106. A product as claimed by claim 97 wherein, in subsequent use, said product functions without reporting said identifying information to said central station.

107. A product as claimed by claim 97 wherein the product further reports product identifying information to the central station.

108. A product as claimed by claim 107 wherein the product identifying information is a serial number.

* * * * *